United States Patent [19]
Inoue et al.

[11] Patent Number: 5,251,285
[45] Date of Patent: Oct. 5, 1993

[54] METHOD AND SYSTEM FOR PROCESS CONTROL WITH COMPLEX INFERENCE MECHANISM USING QUALITATIVE AND QUANTITATIVE REASONING

[75] Inventors: Haruki Inoue, Katsuta; Motohisa Funabashi, Sagamihara; Masakazu Yahiro; Yoshiyuki Satoh, both of Hitachi, all of Japan

[73] Assignees: Hitachi, Ltd., Tokyo; Hitachi Engineering Co., Ltd., Ibaraki, both of Japan

[21] Appl. No.: 712,104

[22] Filed: Jun. 7, 1991

Related U.S. Application Data

[62] Division of Ser. No. 328,520, Mar. 24, 1989, Pat. No. 5,051,932.

[30] Foreign Application Priority Data

Mar. 25, 1988 [JP] Japan .................................. 63-69577

[51] Int. Cl.$^5$ .............................................. G06F 15/00
[52] U.S. Cl. ........................................ 395/10; 395/11; 395/61; 395/775; 395/900; 395/906; 395/908; 395/910; 364/160
[58] Field of Search ..................... 395/10, 11, 61, 900, 395/906, 908, 910, 775; 364/160

[56] References Cited

U.S. PATENT DOCUMENTS

| | | | |
|---|---|---|---|
| 4,939,680 | 7/1990 | Yoshida | 395/60 |
| 4,965,743 | 10/1990 | Malin et al. | 395/60 |
| 5,025,499 | 6/1991 | Inoue et al. | 364/165 |

OTHER PUBLICATIONS

The Handbook of Artificial Intelligence; Chapter XXI: Qualitative Physics; vol. 4; pp. 325–413; Dec. 1989.

*Primary Examiner*—Allen R. MacDonald
*Attorney, Agent, or Firm*—Antonelli, Terry, Stout & Kraus

[57] ABSTRACT

A prediction control of a process containing a non-linear behavior is effected by predicting a transition of process quantities (control quantities) of an object to be controlled a predetermined time period after the current time to provide predicted values and by determining manipulation quantities of at least a control effector in accordance with a difference between the predicted values and predetermined target values of the controlled object. A quantitative operation is carried out arithmetically identifying a process as a linear behavior, and a fuzzy inference or qualitative operation, including a fuzzy rule based on empirical knowledge, is carried out for simulating a process, wherein for input process information and current manipulation quantities to be maintained, both operations parallelly determine predicted values of control quantities. A process behavior determination is arithmetically carried out to determine whether the process linearly behaves (i.e. the normal state or the state dominant to statistic distribution) or not (i.e. the extreme transition state such as a transient response, or an indeterminate state) from the specified process information on the basis of a process behavior determination rule. As a result, a predicted value acquired by the quantitative operation is selected in response to a determination of a linear behavior, and a predicted value acquired by the fuzzy inference operation is selected in response to a determination of a non-linear behavior.

10 Claims, 43 Drawing Sheets

F I G. 1
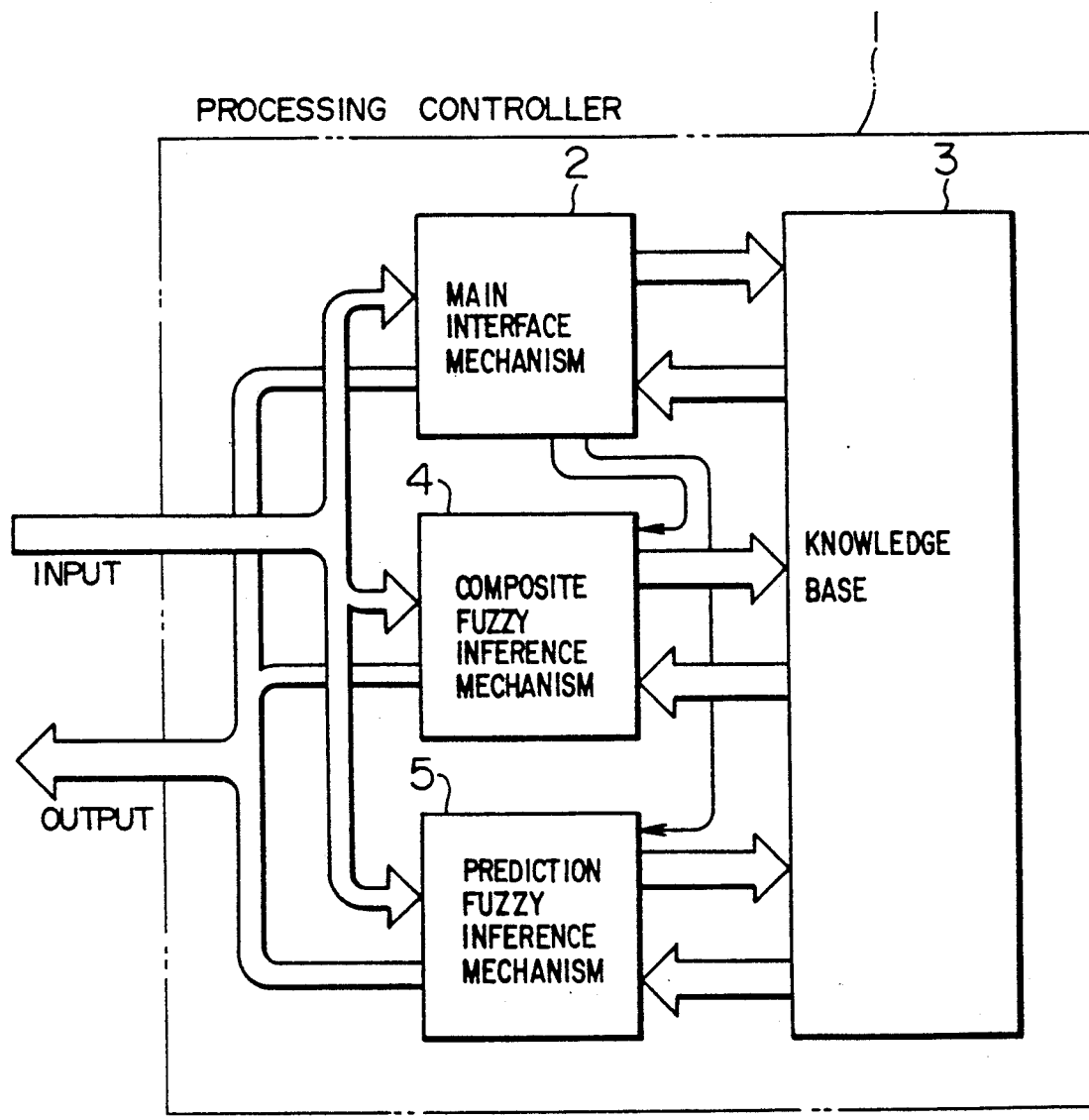

F I G. 15
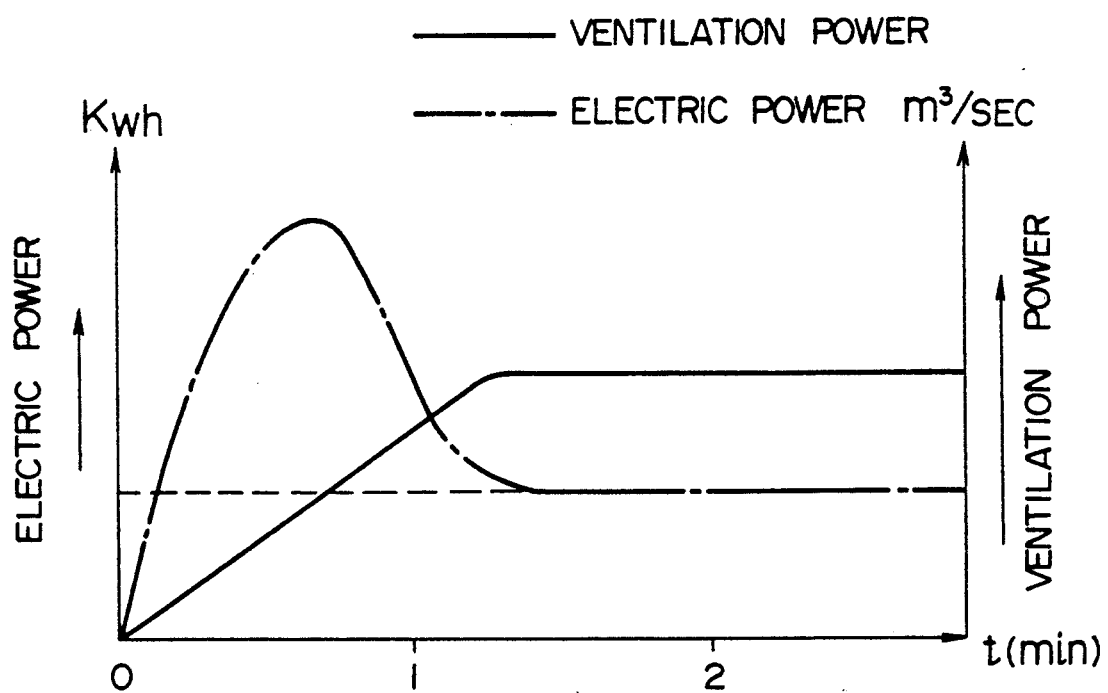

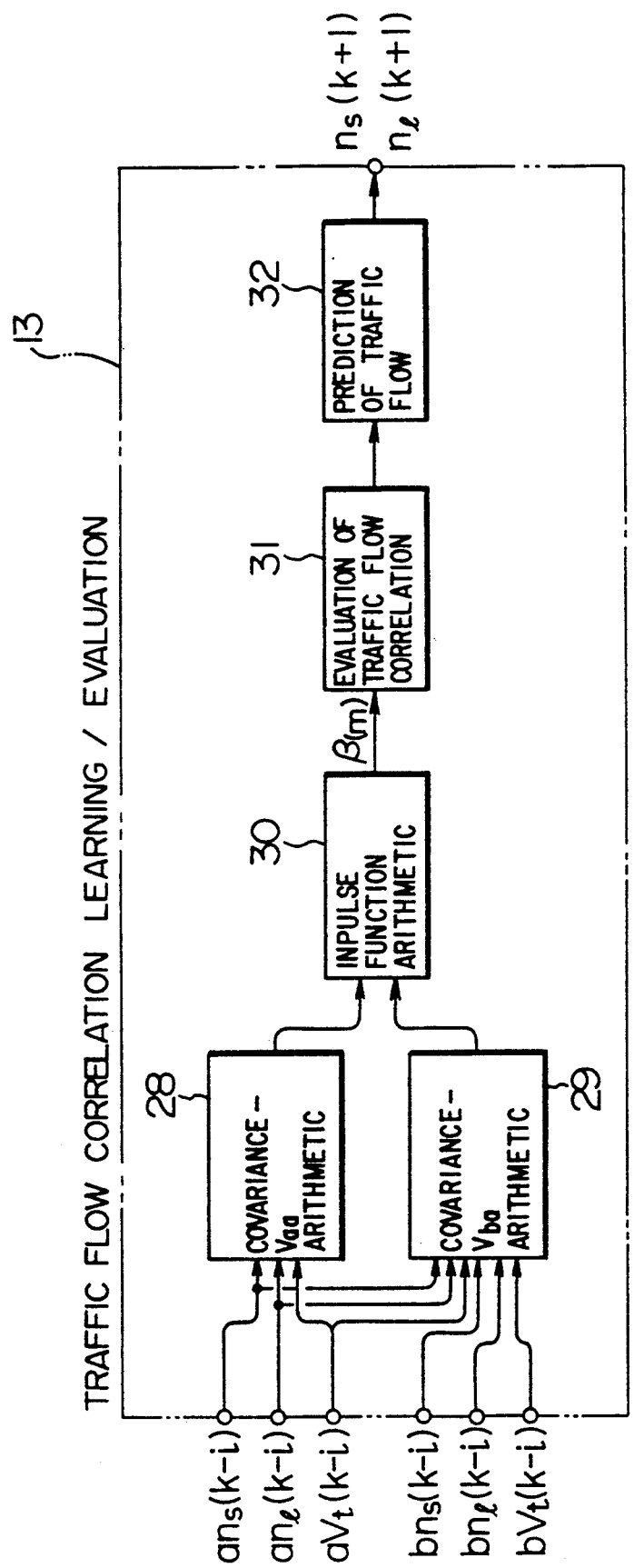
F I G. 20

F I G. 33

| RULE NOS. | IF (CONDITIONAL PART) | THEN (CONCLUSION PART) | CERTAINTY LEVEL |
|---|---|---|---|
| 1 | TRAFFIC ≥ CARS/min, TRAFFIC CHANGE DURING LATEST 15 min IS OF ONE DIRECTION AND CAR SPEED IS FROM 30Km/h TO 70Km/h | →VN (TRAFFIC PREDICTION ACCURACY IS GOOD) | 0.8 |
| 2 | TRAFFIC ≥ CARS/min AND CAR SPEED ≤ 20Km/h | →VN (TRAFFIC PREDICTION ACCURACY IS GOOD) | −0.5 |
| 3 | TRAFFIC PREDICTION ACCURACY IS GOOD (>0.5) AND NATURAL AIRFLOW ≥ 5 m/sec | →VN (PUT IMPORTANCE ON PREDICTION BY QUANTITATIVE MODEL) | 0.7 |
| 4 | TRAFFIC PREDICTION ACCURACY IS GOOD (>0.6), TWO OR MORE SENSORS ARE OPERATING, INTER-SENSOR OUTPUT DIFFERENCE ≥ 5ppm, AND TRAFFIC CHANGE DURING LATEST 30 min AND CHANGE OF MEASURED VALUE ARE OF SAME ONE DIRECTION | →VN (PUT IMPORTANCE ON PREDICTION BY TREND-TYPE MODEL) | 0.8 |
| ---- | ---- | ---- | ---- |
| 123 | MODEL HAVING PREDICTION SATISFYING "PUT IMPORTANCE ON PREDICTION BY QUANTITATIVE MODEL (>0.7)" "PUT IMPORTANCE ON PREDICTION BY TREND-TYPE MODEL (>0.6)" "PUT IMPORTANCE ON PREDICTION BY QUALITATIVE MODEL (>02)" AND ENSURING MAXIMUM CERTAINTY →? MODEL | →VN (ADOPT PREDICTION BY ? MODEL) | 1.0 |

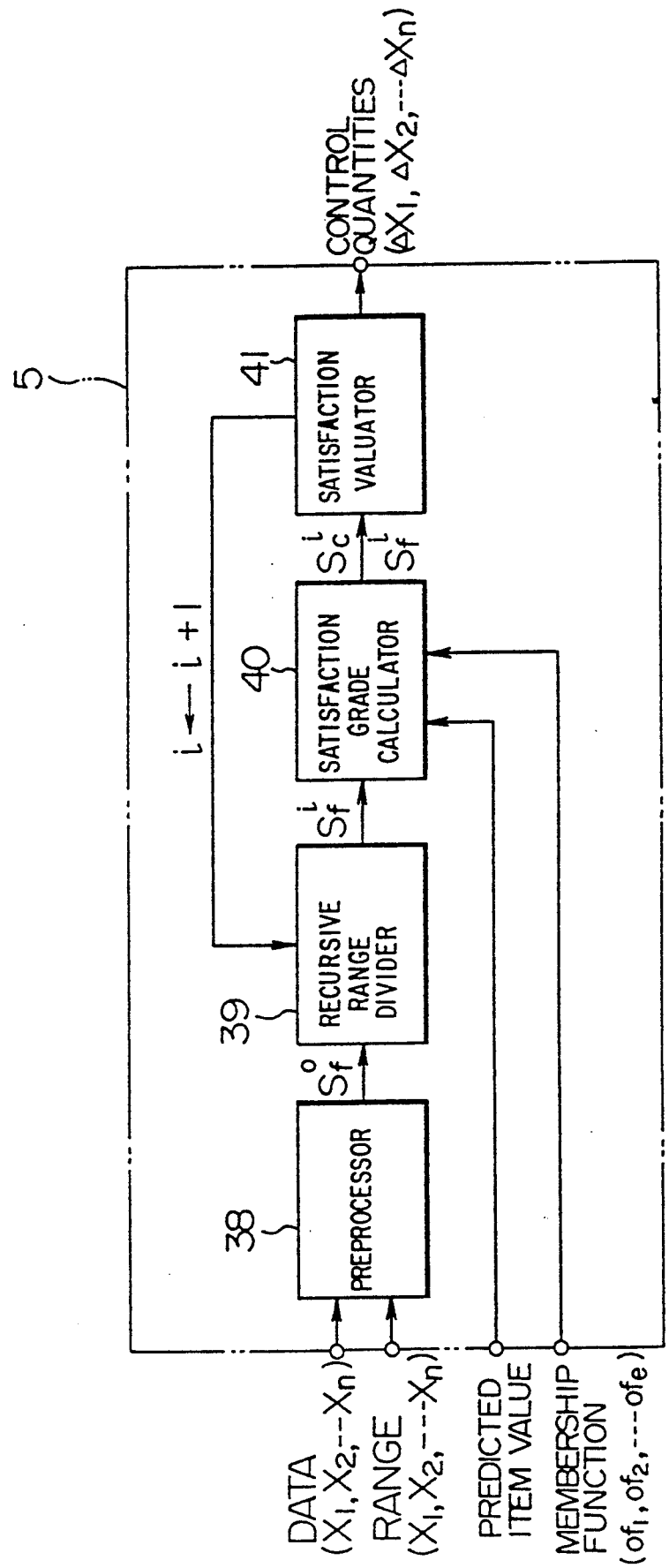

| MANIPULATION QUANTITIES | | | FITNESS VALUE OF OBJECTIVE EVALUATION MEMBERSHIP FUNCTION | | | | | | | SATIS-FACTION DEGREE | $10^{-1}$ | |
|---|---|---|---|---|---|---|---|---|---|---|---|---|
| | | | QCO | | QVI | | P | QC | BP | | 3 | 4 |
| ΔJF | ΔCL1 | ΔCL2 | VG | G | VG | G | | | | | | |
| +2 | +70 | +70 | | | | | * | * | | inop | | |
| +2 | +70 | +60 | | | | | * | * | | inop | | |
| +2 | +70 | +50 | 20 | 85 | 30 | 75 | 9 | 2 | 34 | 0.234 | | |
| +2 | +70 | +40 | 33 | 80 | 45 | 70 | 13 | 4 | 30 | 0.300 | | |
| +2 | +70 | +30 | 46 | 75 | 50 | 64 | 20 | 10 | 27 | 0.360 | | |
| +2 | +70 | +20 | 54 | 65 | 64 | 60 | 23 | 14 | 25 | 0.424 | | |
| +2 | +70 | +10 | 60 | 57 | 75 | 54 | 28 | 25 | 24 | 0.462 | | |
| +2 | +70 | ±0 | 54 | 40 | 62 | 45 | 30 | 30 | 17 | 0.423 | | |
| +2 | +70 | −10 | 42 | 35 | 54 | 40 | 32 | 27 | 12 | 0.380 | | |
| +2 | +70 | −20 | 28 | 32 | 42 | 35 | 37 | 20 | 5 | 0.334 | | |
| +2 | +70 | −30 | 24 | 27 | 32 | 32 | 40 | 12 | 3 | 0.309 | | |
| +2 | +70 | −40 | 22 | 21 | 26 | 25 | 41 | 5 | 1 | 0.286 | | |
| +2 | +70 | −50 | | | | | * | * | | inop | | |
| +2 | +70 | −60 | | | | | * | * | | inop | | |
| ⋮ | ⋮ | ⋮ | ⋮ | ⋮ | ⋮ | ⋮ | ⋮ | ⋮ | ⋮ | ⋮ | | |
| +2 | +50 | +70 | | | | | * | * | | inop | | |
| +2 | +50 | +60 | | | | | * | * | | inop | | |
| +2 | +50 | +50 | 42 | 70 | 41 | 32 | 18 | 12 | 50 | 0.320 | | |
| +2 | +50 | +40 | 47 | 63 | 62 | 50 | 24 | 17 | 45 | 0.401 | | |
| +2 | +50 | +50 | 65 | 52 | 70 | 60 | 32 | 22 | 40 | 0.485 | | |
| +2 | +50 | +20 | 53 | 42 | 63 | 52 | 34 | 23 | 27 | 0.440 | | |
| +2 | +50 | +10 | 45 | 37 | 42 | 42 | 37 | 26 | 20 | 0.405 | | |
| +2 | +50 | ±0 | 32 | 32 | 34 | 32 | 39 | 31 | 12 | 0.342 | | |
| ⋮ | ⋮ | ⋮ | ⋮ | ⋮ | ⋮ | ⋮ | ⋮ | ⋮ | ⋮ | ⋮ | | |
| −2 | −70 | −20 | 0 | 1 | 3 | 2 | 93 | 6 | 2 | * | | |
| −2 | −70 | −30 | 0 | 1 | 3 | 2 | 95 | 4 | 1 | * | | |
| −2 | −70 | −40 | 0 | 1 | 1 | 1 | 98 | 3 | 0 | * | | |
| −2 | −70 | −50 | | | | | * | * | | inop | | |
| −2 | −70 | −60 | | | | | * | * | | inop | | |
| −2 | −70 | −70 | | | | | * | * | | inop | | |

(Annotations: REDUCED PLANE)

GRADE = (20*QCO·VG + 5*QCO·G + 20*QVI·VG + 5*QVI·G + 40*P + 5*QC + 5*BP) / 100

| MANIPULATION QUANTITY | | | FITNESS VALUE OF OBJECTIVE EVALUATION MEMBERSHIP FUNCTION | | | | | | | SATIS-FACTION DEGREE | $10^{-1}$ | |
|---|---|---|---|---|---|---|---|---|---|---|---|---|
| ΔJF | ΔCL1 | ΔCL2 | QCO | | QVI | | P | QC | BP | | 4 | 5 |
| | | | VG | G | VG | G | | | | | | |
| +2 | +70 | +40 | 33 | 80 | 45 | 70 | 13 | 4 | 30 | 0.300 | | |
| +2 | +70 | +37 | 34 | 79 | 47 | 69 | 13 | 4 | 30 | 0.305 | | |
| +2 | +70 | +34 | 35 | 77 | 49 | 68 | 13 | 6 | 30 | 0.311 | | |
| +2 | +70 | +31 | 37 | 74 | 54 | 67 | 14 | 8 | 29 | 0.327 | | |
| +2 | +70 | +28 | 39 | 72 | 57 | 65 | 15 | 10 | 29 | 0.340 | | |
| +2 | +70 | +25 | 43 | 70 | 60 | 63 | 16 | 12 | 29 | 0.357 | | |
| +2 | +70 | +22 | 48 | 69 | 65 | 62 | 19 | 14 | 29 | 0.389 | | |
| +2 | +70 | +19 | 54 | 67 | 69 | 60 | 20 | 16 | 28 | 0.412 | | |
| +2 | +70 | +16 | 59 | 65 | 75 | 58 | 23 | 20 | 28 | 0.446 | | |
| +2 | +70 | +13 | 67 | 62 | 78 | 57 | 27 | 24 | 28 | 0.484 | | |
| +2 | +70 | +10 | 60 | 57 | 75 | 54 | 28 | 25 | 24 | 0.462 | | |
| +2 | +70 | +7 | 57 | 50 | 72 | 51 | 29 | 26 | 21 | 0.448 | | |
| +2 | +70 | +4 | 56 | 45 | 67 | 50 | 29 | 27 | 20 | 0.433 | | |
| +2 | +70 | +1 | 55 | 42 | 63 | 47 | 29 | 29 | 18 | 0.420 | | |
| +2 | +67 | +40 | 30 | 80 | 41 | 69 | 15 | 3 | 30 | 0.293 | | |
| +2 | +67 | +37 | 34 | 79 | 47 | 67 | 17 | 5 | 30 | 0.321 | | |
| +2 | +67 | +34 | 37 | 77 | 53 | 65 | 19 | 8 | 30 | 0.346 | | |
| +2 | +67 | +31 | 41 | 75 | 57 | 64 | 21 | 11 | 30 | 0.370 | | |
| +2 | +67 | +28 | 45 | 72 | 62 | 63 | 22 | 15 | 29 | 0.392 | | |
| +2 | +67 | +25 | 50 | 70 | 65 | 61 | 23 | 17 | 29 | 0.411 | | |
| +2 | +67 | +22 | 57 | 67 | 69 | 60 | 24 | 20 | 29 | 0.436 | | |
| +2 | +67 | +19 | 62 | 65 | 74 | 58 | 26 | 24 | 29 | 0.464 | | |
| +2 | +67 | +16 | 68 | 63 | 79 | 57 | 30 | 26 | 29 | 0.502 | | |
| +2 | +67 | +13 | 65 | 60 | 80 | 55 | 31 | 27 | 29 | 0.500 | | |
| ⋮ | ⋮ | ⋮ | ⋮ | ⋮ | ⋮ | ⋮ | ⋮ | ⋮ | ⋮ | | | |
| ±0 | +40 | +16 | 25 | 32 | 33 | 25 | 43 | 35 | 21 | 0.345 | | |
| ±0 | +40 | +13 | 21 | 27 | 21 | 22 | 46 | 37 | 18 | 0.320 | | |
| ±0 | +40 | +10 | 15 | 24 | 20 | 17 | 47 | 40 | 17 | 0.307 | | |
| ±0 | +40 | +7 | 12 | 21 | 14 | 14 | 50 | 42 | 13 | 0.297 | | |
| ±0 | +40 | +4 | 10 | 15 | 12 | 11 | 52 | 44 | 12 | 0.293 | | |
| ±0 | +40 | +1 | 7 | 12 | 10 | 7 | 54 | 46 | 7 | 0.286 | | |

REDUCED PLANE

FIG. 46
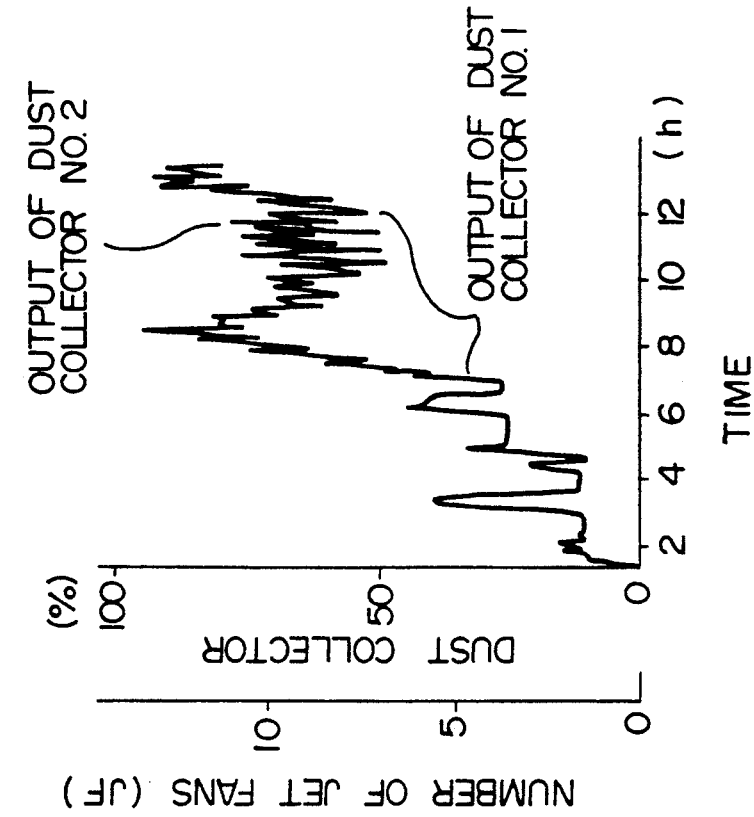
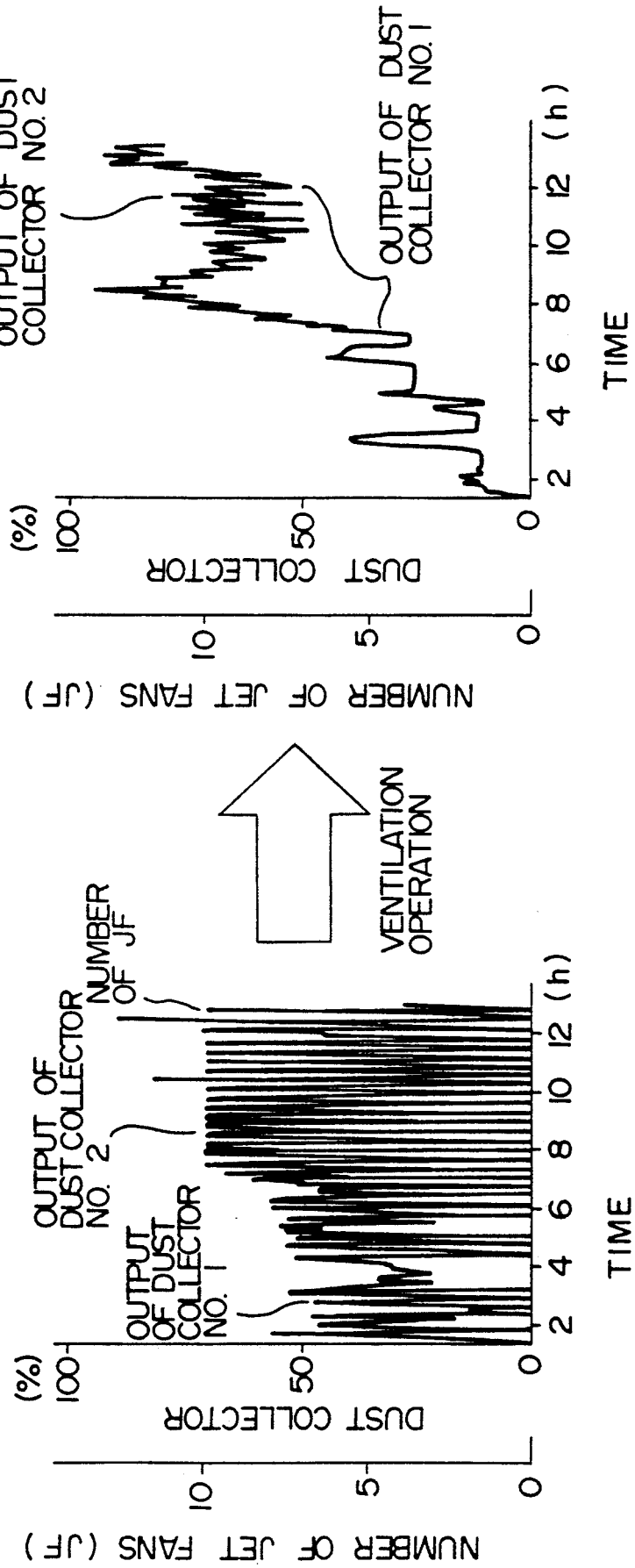

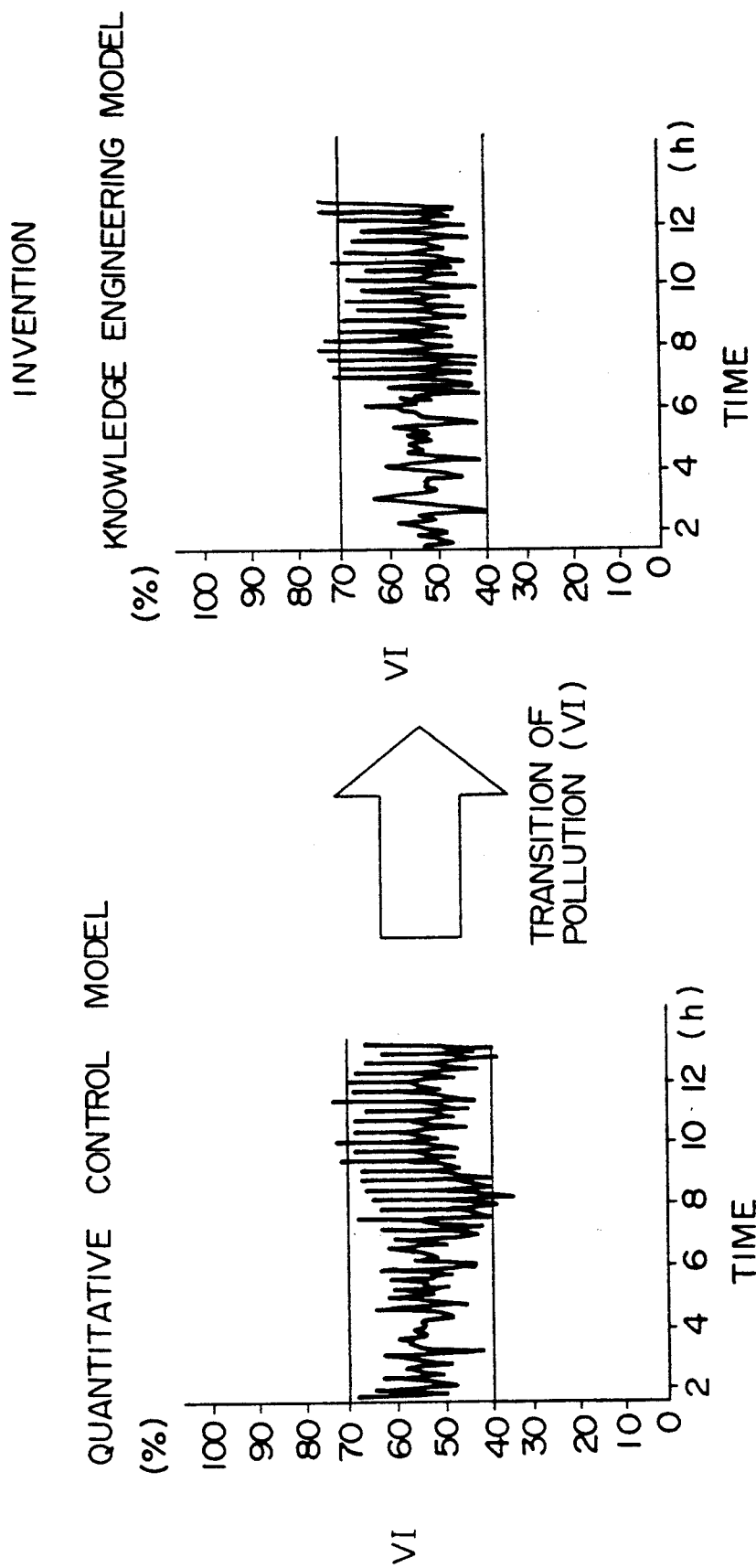

METHOD AND SYSTEM FOR PROCESS CONTROL WITH COMPLEX INFERENCE MECHANISM USING QUALITATIVE AND QUANTITATIVE REASONING

CROSS-REFERENCE TO RELATED APPLICATION

This application is a division of our U.S. application Ser. No. 328,520, filed Mar. 24, 1989, now U.S. Pat. No. 5,051,932, issued on Sep. 24, 1991.

BACKGROUND OF THE INVENTION

The present invention generally relates to a process control method. More particularly, the invention is directed to a process control system for controlling a process exhibiting both linear and non-linear behaviors by a combination of control quantities of control effectors including a plurality of digital or analogue quantities.

In recent years, approaches for application of the fuzzy theory to actual processes on a real time basis have been vigorously studied in the field of control techniques and some practical applications are reported. The basic concept of this fuzzy theory is based on the stand point that "a theoretical system established definitely can not exceed a certain boundary or circumscription", and thus the behavior of an actual process subject to a control of concern which includes inevitably non-linear elements can not be controlled in a perfectly satisfactory manner only with the control method which relies on mathematical expressions representing physical models. Introduction and application of the fuzzy theory to control systems may be explained by the fact that because of very large scale and complex implementation of modern control systems, an extreme difficulty is encountered in making available the accurate information required for the processing executed by the computer at the present state of the art. As the scale of the control system becomes larger, the number of the non-linear elements increases correspondingly, making it impractical or impossible to describe the process accurately with the mathematical expressions. Under the circumstances, fuzziness accompanying the action taken by an operator partaking in a process control system is assuming an important role in the process control.

In the following, some examples of the control systems relying upon the conventional control procedure based on mathematical models and the applied fuzzy theory will be discussed to make clear the problems to be coped with by the present invention.

As a typical example of a conventional control system based on mathematical models and including a large number of non-linear elements and lots of fuzziness, let's consider a longitudinal flow type ventilation control system adopted in the management of a huge tunnel having a great length.

Construction of rapid transit roadways fluorishing in these years are attended with constructions and use of the long tunnel in an increasing number. Also in the future, it is expected that the number of the long tunnels will increase for many reasons such as need for exploitation of the shortest route to a destination, difficulty in acquisition of the site for the construction and progress in civil engineering technology.

In connection with operation and use of the tunnel for the transit roadway, ventilation equipment is indispensably required in order to protect the car drivers from the danger of exhaust gases and ensure the safety of persons engaging in maintenance. In conjunction with the ventilation for the long tunnel, it is noted that although the transverse type ventilation system employing ventilation ducts installed in the extending direction of the tunnel have been employed in many cases in view of high performance of the ventilation, the longitudinal type ventilation system including a combination of jet fans (blowers) and dust/dirt collectors is taking on the leading role in recent years because of low costs for installation and facility of the maintenance.

In either one of the ventilation systems mentioned above, the most important problem is how to satisfy the requirements imposed on the running cost of the ventilation equipment on one hand and the quality of ventilation on the other hand, which requirements or conditions however are in a reciprocal relation. Heretofore, problems of non-linearity (uncertainty) involved in the prediction of a turbulent diffusion phenomenon and a pollution genesis mechanism inherent to the tunnel ventilation process have been dealt with only by linear control relying on mathematical models. Accordingly, the satisfactory result of the control can be obtained only when the ventilation process exhibits linearity. If otherwise, the control process can not afford a satisfactory result.

FIG. 2 of the accompanying drawings is a conceptual view illustrating control factors in a longitudinal type long tunnel ventilation control system. Jet fans or blowers 7 and dust collectors 8 constituting parts of the ventilation equipment controlled by a control apparatus 1 are indispensable members playing an important role in retaining the concentration of pollution gases such as CO, $NO_s$, $SO_x$ and others noxious to the human body and smog harmful to the safety of the drive. Since the electric power consumed by these jet fans and the dust collectors occupies a large proportion of the electric power consumption of the whole equipment, there exists an insistent demand for the efficient operation of these facilities. In other words, the tunnel ventilation control has to satisfy simultaneously two contradicting requirements, i.e. safety and economy, as mentioned above. As a control system adopted in the practical application for coping with the above requirements, there can be mentioned a so-called traffic flow prediction feed-forward control system.

FIG. 3 of the accompanying drawing is a view for illustrating the principle underlying the traffic prediction feed-forward control system mentioned above. For expressing the tunnel ventilation process in the form of a mathematical model, the tunnel is divided into n sections by taking into consideration the conditions such as slope, positions where the ventilation machines are installed and others. On the condition, the state within each section for ventilation can be expressed by a difference equation mentioned below.

$$X(k+1) = \exp(-Q(k)) \cdot X(k) + (1 - \exp(-Q(k))) \cdot \frac{P(k)}{Q(k)} \quad (1)$$

where $X(k+1)$ represents an average concentration of pollution within a ventilation section of concern at a time point $K(t=kT)$, $P(k)$ represents an amount of pollution generated within the ventilation section of concern during a period $k(kT \leq t \leq = (k+1)T)$, and $Q(k)$ represents ventilation airflow within the ventilation section of concern during a period $k(kT \leq t \leq (k+1)T)$.

When a standard or reference pollution quantity generated within the tunnel of concern is represented by P* with Q* representing a reference ventilation flow quantity for maintaining a reference pollution concentration X* corresponding to the quantity P*, there can validly be derived from the expression (1) the following expression:

$$Q^* = P^*/X^* \tag{2}$$

For determining a corrected ventilation when the concentration of pollution X(k) and the generated pollution quantity P(k) at the current time point k deviate from the respective reference quantities, variations between the actual quantities and the associated reference quantities are defined as follows:

$$\begin{cases} \Delta X(k) \triangleq (X(k) - X^*)/X^* \\ \Delta Q(k) \triangleq (Q(k) - Q^*)/Q^* \\ \Delta P(k) \triangleq (P(k) - P^*)/P^* \end{cases} \tag{3}$$

By substitution of the expressions (3) in the expression (1) and through linear approximation in the neighborhood of the reference quantity, there can be obtained the following system equation;

$$\Delta X(k+1) = \exp(-Q^*) \cdot \Delta X(k) - \tag{4}$$

$$(1 - \exp(-Q^*))(\Delta Q(k) - \Delta P(k))$$

In the above equation, considering $\Delta X(k)$ as representing a state variable, $\Delta Q(k)$ as representing a control variable and $\Delta P(k)$ as representing an input variable, there can be realized a quantitative expression for the system. However, what it expressed by this equation is only a few parts of the process behaviors, as will hereinafter be made clear. For configuring the control system, it is required at the next stage to introduce an objective function. At this juncture, it is presumed that the object of the ventilation control mentioned above is to decrease the electric power consumption to a minimum while maintaining the concentration of pollution at the reference or standard level as far as possible. This presumption can be expressed in the form of a function as follows:

$$J = \sum_{k=1}^{\infty} (F_X \Delta X^2(k+1) + F_Q \Delta Q^2(k)) \tag{5}$$

In the above expression, the first term of the left-hand side concerns the safety and the second term concerns the economy, wherein $F_X$ and $F_Q$ are the coefficients for adjusting the weight assigned to these terms, respectively. In accordance with a known linear regulator theory, the corrected ventilation airflow $\Delta Q^\circ(k)$ which minimizes the objective function given by the expression (5) can be determined from the system equation as follows:

$$\Delta Q^\circ(k) = G_X(k) \cdot \Delta X(k) + \Delta G_P(k) \cdot P(k) \tag{6}$$

where $G_X(k)$ and $G_P(k)$ represent feedback gains for $\Delta X(k)$ and $\Delta P(k)$, respectively.

A control system realized through repetition of the linear approximation procedures described above is shown in FIG. 4. Assuming in this control system that the concentration quantity (the level of the concentration) X(k) at a time point k can be determined accurately on the basis of a pollution sensor, it is believed that the improvement of the control accuracy will then depend only on the improvement of accuracy with which the traffic at a time point (k+1) can be predicted, because $$P(k) = \sum_{j=1}^{m} c_j \cdot n_j(k) \tag{7}$$

where $c_j$ represents the amount of pollution generated by one motor vehicle of type j, and $n_j(k)$ represents the traffic amount (the number of motor vehicles) during the period $k(kT \leq =t \leq =(k+1)T)$ on the assumption that the amount of pollution as generated is in proportion to the number of motor vehicles or cars transited during the period k. In this conjunction, prediction of the car transit number (i.e. the number of the cars transited during the period k) can be carried out, for example, by installing traffic counter sensors (hereinafter also referred to as the TC in abridgement) at the entrance and the exit of a tunnel, respectively, and by taking advantage of the fact that a linear relation exists in covariance among the time-series traffic data for the tunnel section of concern. Now, examples of the actually performed control based on the traffic prediction feed-forward control principle will be described by reference to FIGS. 5 to 7 of the accompanying drawings.

FIG. 5 shows transitions in the traffic and pollution quantities, respectively, during an elongated control period, i.e. when the ventilation airflow is made approximately constant. As will be seen from the graphs, there exists high correlation between the traffic quantity and the amount of pollution as produced. Further, the graphs show that the environment standard value (80 ppm in the case of the illustrated example) has been exceeded several times, indicating a low quality or performance of the ventilation (degraded safety). On the other hand, in the case of the control illustrated in FIG. 6 where the traffic prediction feed-forward control has been performed for a period of ten minutes, the concentration value of CO converges to the objective value. Further, it can be seen that the electric power consumption is also improved when compared with the example shown in FIG. 5.

FIG. 7 illustrates, by way of example, the situation existing in the middle of the night where the traffic rate is low during a period of the same duration. Although it is obvious from the graphs that the ventilator operation is not required because the traffic is low absolutely, the ventilator is thrown into operation several times, consuming a large amount of electric power. The actual operation of the system adopting the traffic prediction feed-forward control will be what is mentioned below. On the basis of the empirical knowledge, operator usually takes the following procedures:

(1) In the middle of the night, the operator changes over the automatic operation control to manual operation control on the basis of judgment of the total traffic quantity and the rate of change thereof. This manual operation control is continued to the rush-hour time in the morning.

(2) In case the change in the traffic flow is remarkable even in the daytime, such as on a holiday, the control is changed over to the manual operation control.

(3) On a rainy day, the manual operation control is performed at a lower value than the controlled ventilation quantity outputted from the automatic control operation system, so forth.

As will be seen, specific operations are performed through intervention by the operator in accordance with various rules established empirically by the operator. Considering the traffic control in terms of a general process control, there exist such situations in which the process behaves linearly, utterly non-linearly and partially linearly, respectively. This can be explained by the fact that the non-linear components in the various controls have heretofore been attempted to be handled by a linear equation as the external disturbance elements. Accordingly, when the external disturbance becomes a leading factor in the process behavior, there arises the necessity for another system description. In general, the control system such as the tunnel ventilation control includes many elements or components which are fuzzy for the description of the control. Besides, these elements compete with one another for the control of the process behavior from time to time. For these reasons, the quantitative expressions of these disturbance elements are very difficult.

FIG. 8 shows in a network diagram the main causes or factors for the pollution produced within a tunnel as confirmed by resorting to all the conceivable means such as simulation, actual measurements and others. As can be seen in the figure; the number of the causes or factors affecting the environment by producing pollution amounts are more than twelve, inclusive of the medium factors. All of these factors are of such a nature that they behave linearly at one time and non-linearly at another time. Besides, these factors may bear relation to one another at one time while no relation can be found at another time.

FIG. 9 shows in a network diagram similar to FIG. 8 the factors or causes participating in the ventilation. As can be seen in the figure, a weather phenomenon such as natural airflow plays an important role as well.

As will now be appreciated from the foregoing description, the serious problem of the hitherto known ventilation control system based on a mathematical model can be seen in that the ventilation control system can no longer be used tolerably except for the period during which all the factors behave linearly, as is discussed in detail in an article entitled "A New Ventilation Control For Long Road Tunnel" contained in a collection of articles and reports published in the Japan Society of Civil Engineers, No. 265 (1977).

In contrast to the control based on a mathematical model as described above, the fuzzy control is characterized in that the behaviors of factors affecting a process are expressed in terms of fuzzy quantities, wherein the final control quantities to be outputted are derived by transforming the fuzzy values having proper acceptance into quantitative values. However, the fuzzy control known heretofore suffers from shortcomings mentioned below.

First, a large number of items exist for the fuzzy evaluation, wherein evaluation for deriving a conclusion (operation control quantity) from the items is not only impractical but also difficult to understand.

Another disadvantage lies in that the fuzzy control may become more ineffective than the control based on a linear control model, depending on the situations, because the control based on the fuzzy quantities are applied even to such process phase which can be controlled with a high accuracy by the conventional linear model based control. This can be explained by the tendency that a process subject to the control is grasped definitely either as a process oriented for fuzzy control or as the process suited for linear control. The prior art fuzzy control is disclosed in detail, for example, in JP-A-58-19207 and JP-A-59-204707.

It is safe to say that processes in the real world are, more or less, extremely complicated combinations of linear behaviors and non-linear behaviors and thus it is impossible to realize an optimum control for all the situations with one definite control procedure.

SUMMARY OF THE INVENTION

It is therefore an object of the present invention to overcome the problems which the hitherto known linear control has encountered in controlling the non-linear behaviors of a process as well as the problem of the known fuzzy control in respect to accuracy and inference, by providing a control method capable of controlling optimally and automatically a process subject to the control in a consecutive manner.

Another object of the present invention is to provide a design procedure and a system for carrying out the above-mentioned control method.

A further object of the present invention is to overcome the problems of the conventional tunnel ventilation control described above and provide a tunnel ventilation control method as well as a system therefor which are capable of controlling optimally and continuously a tunnel operation process in such manner that the power consumption of the ventilators can be decreased to a minimum while reducing the intra-tunnel pollution so as to satisfy the environment standard.

Other objects of the invention will be made apparent as this description proceeds.

The above objects of the invention can be achieved by judging dynamically the behaviors of a process by means of a control processing system including a complex fuzzy inference mechanism, a forward fuzzy inference mechanism and a predicting fuzzy inference mechanism, whereby the optimum continuous control regarded heretofore as being impossible with the conventional control can be readily realized by the inference with the aid of optimum control models.

The present invention is generally characterized by the features which follow:

(1) An inference main mechanism in which a linear control system is provided for dealing with the linear behaviors of a process while a qualitative inference control system is prepared for processing the non-linear behaviors of the process, wherein decision as to linear/-non-linear behaviors is realized by a forward fuzzy inference performed on the basis of empirical knowledge;

(2) a complex fuzzy inference mechanism for a many-faceted grasp of process behaviors by examining compositely the different types of factors through cooperation with the qualitative inference mentioned in the above paragraph (1);

(3) a predicting fuzzy inference mechanism for determining operations of the control effectors by examining compositely the different control objectives on the basis of the result of decision made for the process behaviors mentioned in the paragraph (1); and (4) a process control method for performing automatically a continuous control in correspondence to the behaviors of a process with the aid of a complex inference mechanism including the mechanisms (1), (2) and (3) mentioned above.

BRIEF DESCRIPTION OF THE DRAWINGS

FIG. 1 is a schematic diagram showing a general arrangement of a process control system according to an embodiment of the present invention;

FIGS. 15 to 18 and FIG. 46 are views for illustrating inference networks, respectively;

FIGS. 19 to 21 and FIG. 47 are views for illustrating quantitative pollution predictions, respectively;

FIGS. 33 and 34 are views for illustrating an overall decision of prediction values and a forward fuzzy inference, respectively; and FIGS. 35 to 45 are views for illustrating a situation-adaptive control quantity determination and a predicting fuzzy inference.

DESCRIPTION OF THE PREFERRED EMBODIMENTS

Figure 2:
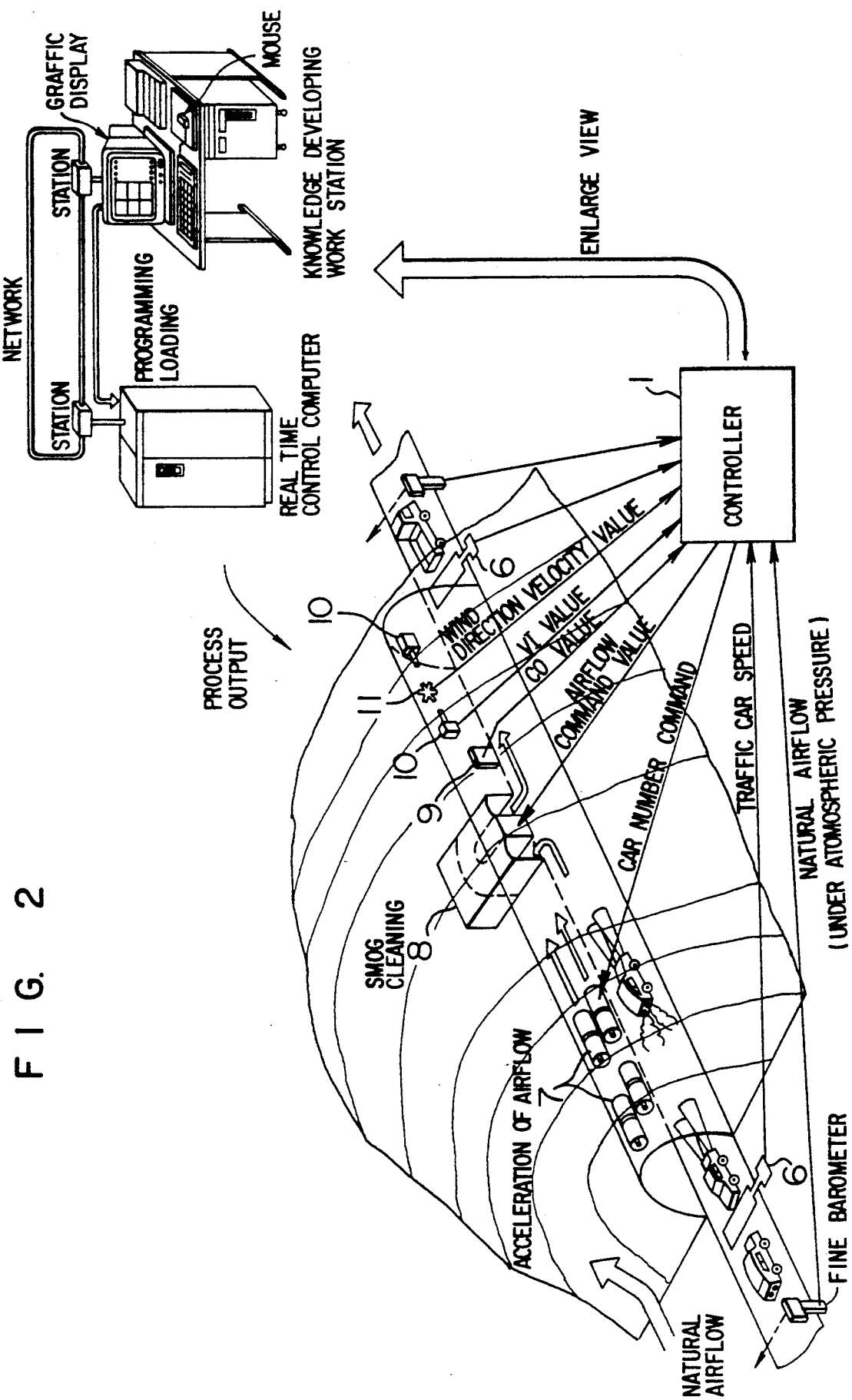
FIGS. 2 to 12 are views for illustrating tunnel ventilation systems, prior art control procedure and controls as performed.

A process control method and a system for carrying out the same with a complex inference mechanism according to an embodiment of the present invention will be described below in the order of the design procedure sequence.

(1) Analysis Of Factor Correlation

Factors concerning the behaviors of a process of concern are extracted and the characteristics of these factors are analyzed. The factors may include those susceptible to the quantitative expression (linear factors), those which permit only a partial quantitative expression and these which permit no quantitative expression at all (non-linear factor). A factor network can be prepared through this procedure.

(2) Behavior Analysis For Each Factor

Behaviors of the individual factors are measured and analyzed through simulation or by empirical experience or the like to thereby evaluate the situations which behave linearly and those which do not behave linearly.

(3) Process Behavior Analysis

When a linear control has been precedently performed for a process of concern, knowledge about the linearity and non-linearity of the process behaviors are extracted from the result (control accuracy) of the performed control. Otherwise, the knowledge is extracted through measurement or simulation.

(4) Structurization Of Control System

(i) Determination and Design of the Control System

For each of the linear or non-linear behaviors of the process subjected to control, an optimum model is adopted. For a process phase exhibiting a linear behavior, a linear-regulator type control scheme is adopted, while for the process phase including locally non-linear factor(s), fuzzy control is employed.

On the other hand, for a process phase exhibiting a non-linear behavior, the fuzzy control or a rule-based control performed on the basis of a set of empirical knowledge is adopted. According to an aspect of the present invention, a complex fuzzy inference procedure for inferring straightforwardly one item (e.g. predicted pollution in the tunnel ventilation control) for evaluation from a number of items is employed.

(ii) Design of Process Behavior Decision Rule Group

A set or group of knowledge rules for judging synthetically the control quantities or intermediate hypothesis (e.g. predicted pollution level) obtained with the individual models for the linear or non-linear behaviors mentioned in the above paragraph (i) are designed. This decision rule set is so arranged as to perform the forward fuzzy inference for the situations including behaviors of factors for each model and flow of overall process or the conditions which are utterly out of synchronism with the process, to thereby select or synthesize the optimum rules.

When a process of concern is complex, the procedures (i) and (ii) mentioned above are repeatedly executed.

(iii) Design of Rule Group for Determining Control Quantities

The final decision of the control operation quantities is performed with the aid of the prediction type fuzzy inference according to the present invention. Through this inference, evaluation for determining whether a combination of control operation quantities including a plurality of analogue quantities can satisfy simultaneously a plurality of objectives which are evaluated with the fuzzy quantities can be performed at a high speed, whereby the combination capable of assuring the maximum degree of satisfaction is determined.

Figure 10:
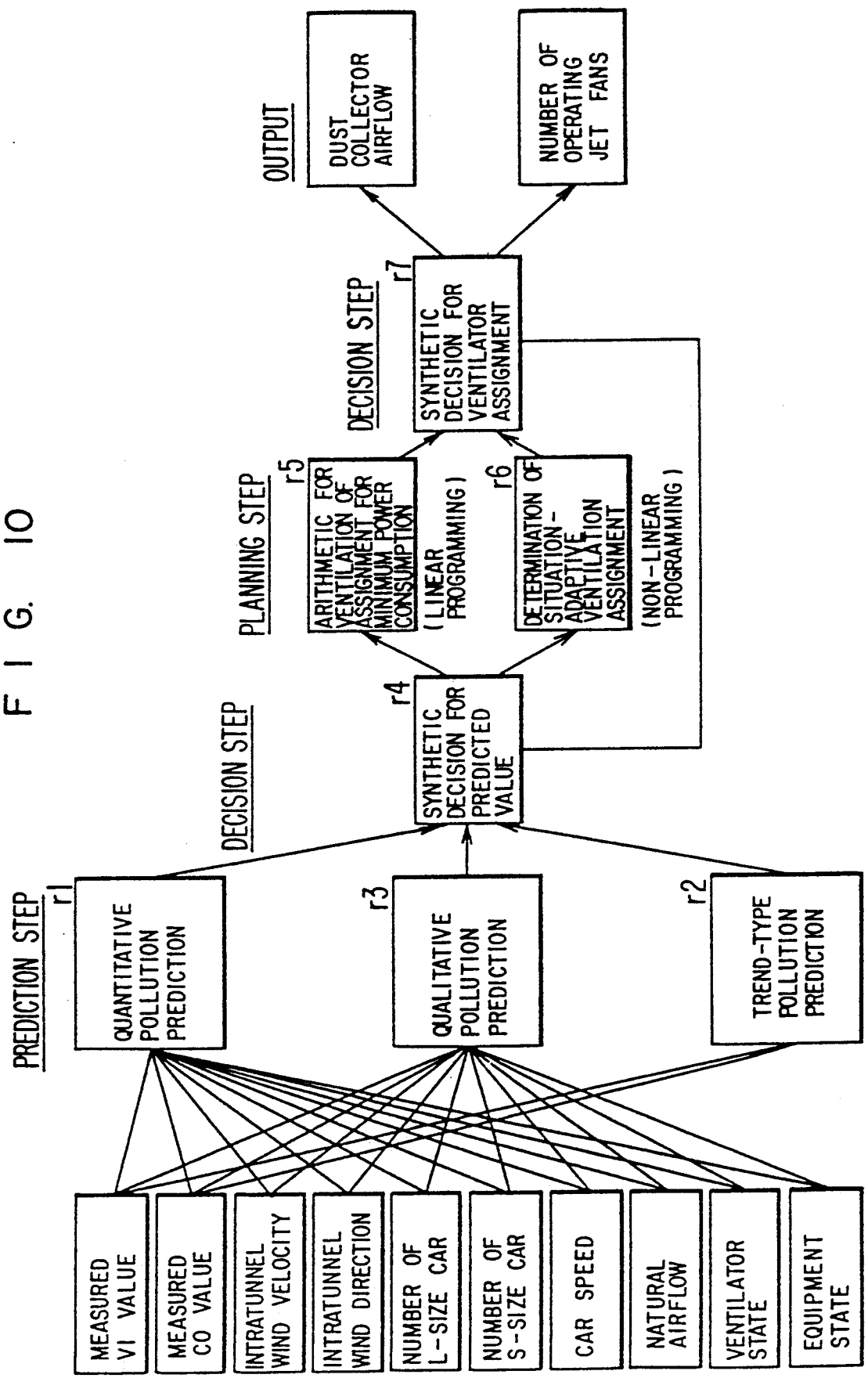

The inventive process control system of the arrangement described above operates through steps shown in FIG. 10. More specifically, the control system includes two steps of prediction and programming (planning), wherein in the prediction step, two prediction models, i.e. the prediction models of quantitative operation type and quantative inference type, operate in parallel with each other, wherein the prediction value decided to be better of the two prediction values resulting from the operations based on the above-mentioned two models through a process diagnosis model of forward fuzzy inference type is selected. In the programming or planning step to which the prediction value as selected is inputted, two models of the quantitative operation type and the predicting fuzzy type, respectively, operate in parallel with each other and the process quantity assignment is determined on the basis of one of the results of the two programming models mentioned above which has been decided better than the other by the process diagnosis model, wherein the decision of the process control quantity assignment is realized at a high speed through steps of a preprocess, a recurrent range division, arithmetic determination of the grades of satisfaction and the evaluation, respectively.

In the following, an embodiment of the present invention will be described in detail in conjunction with a longitudinal type tunnel ventilation control system, only by way of example.

FIG. 2 shows schematically an example of tunnel structure together with control factors. In the figure, a reference numeral 1 denotes a process control apparatus. In association with the process control apparatus 1, there are provided a variety of sensors for detecting and outputting the process state information. They are traffic counters 6 installed at the entrance and the exit of the tunnel for measuring items relating to the traffic flow such as the number n of large size cars, the number $n_s$ of small size cars, car speed V and others and integrating or averaging the measured events every predetermined period T to be outputted, a CO meter 9 for measuring the concentration of carbon monoxide (CO), a VI meter 10 for measuring smog transmissivity, and a wind velocity/direction meter (anemometer) 11 for measuring the velocity and the direction of the wind (airflow) on the driveway within the tunnel. Further, the weather information and the traffic regulation information which are out of synchronism with the tunnel process are inputted to the process control apparatus 1 by way of a transmission controller.

Further installed are a plurality of jet fans (JF) 7 each generating a constant flow of air and a plurality of dust collectors 8 each adapted to produce a continuously variable flow of air and at the same time to reduce the smoke.

In a control operation mode, the control apparatus 1 issues a start/stop command to each of the jet fans or JFs 7 and issues an airflow command to the dust collectors 8 as a continuous quantity to thereby adjust the ventilation within the tunnel.

Figure 3:
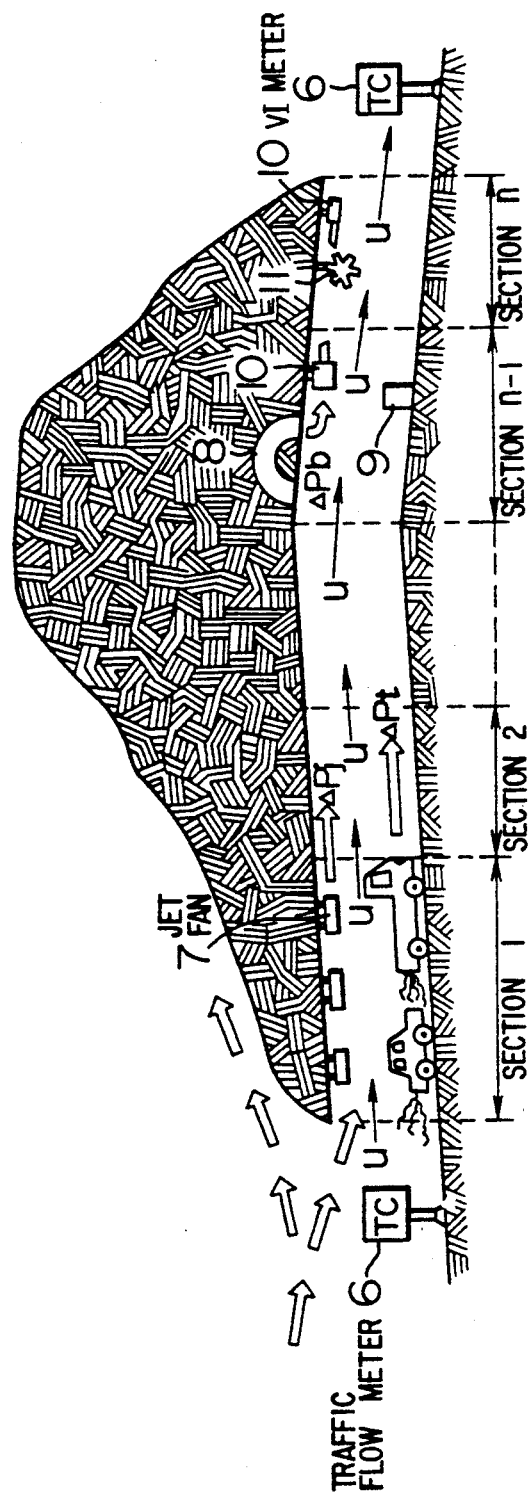
Figure 4:
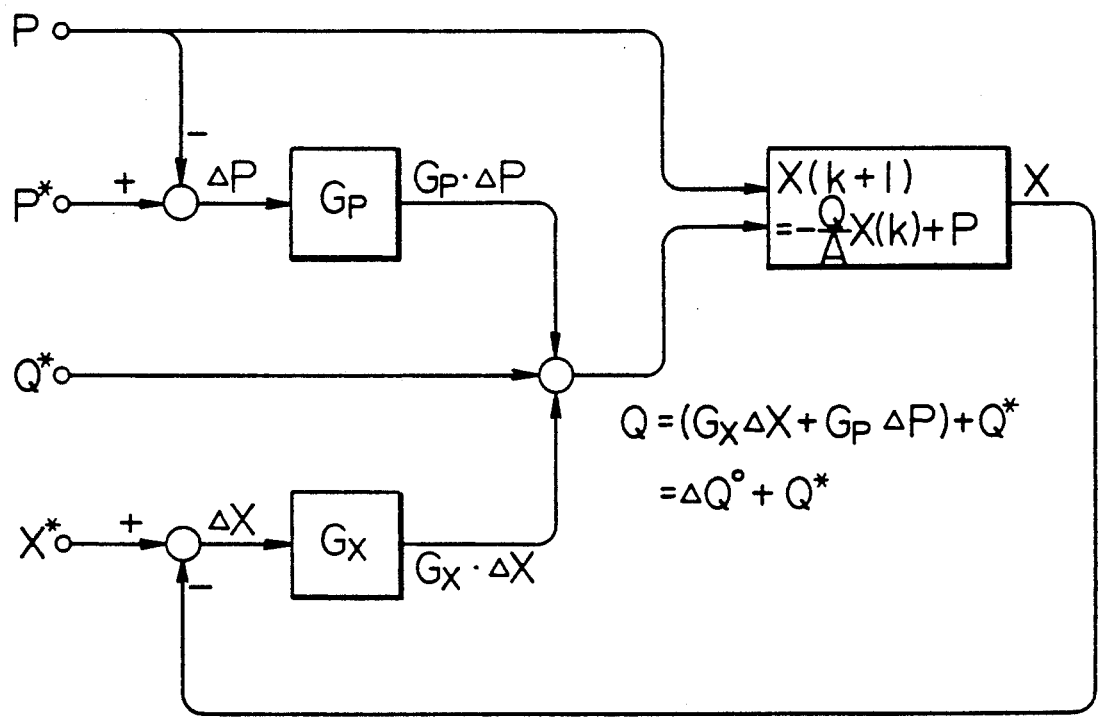
Figure 5:
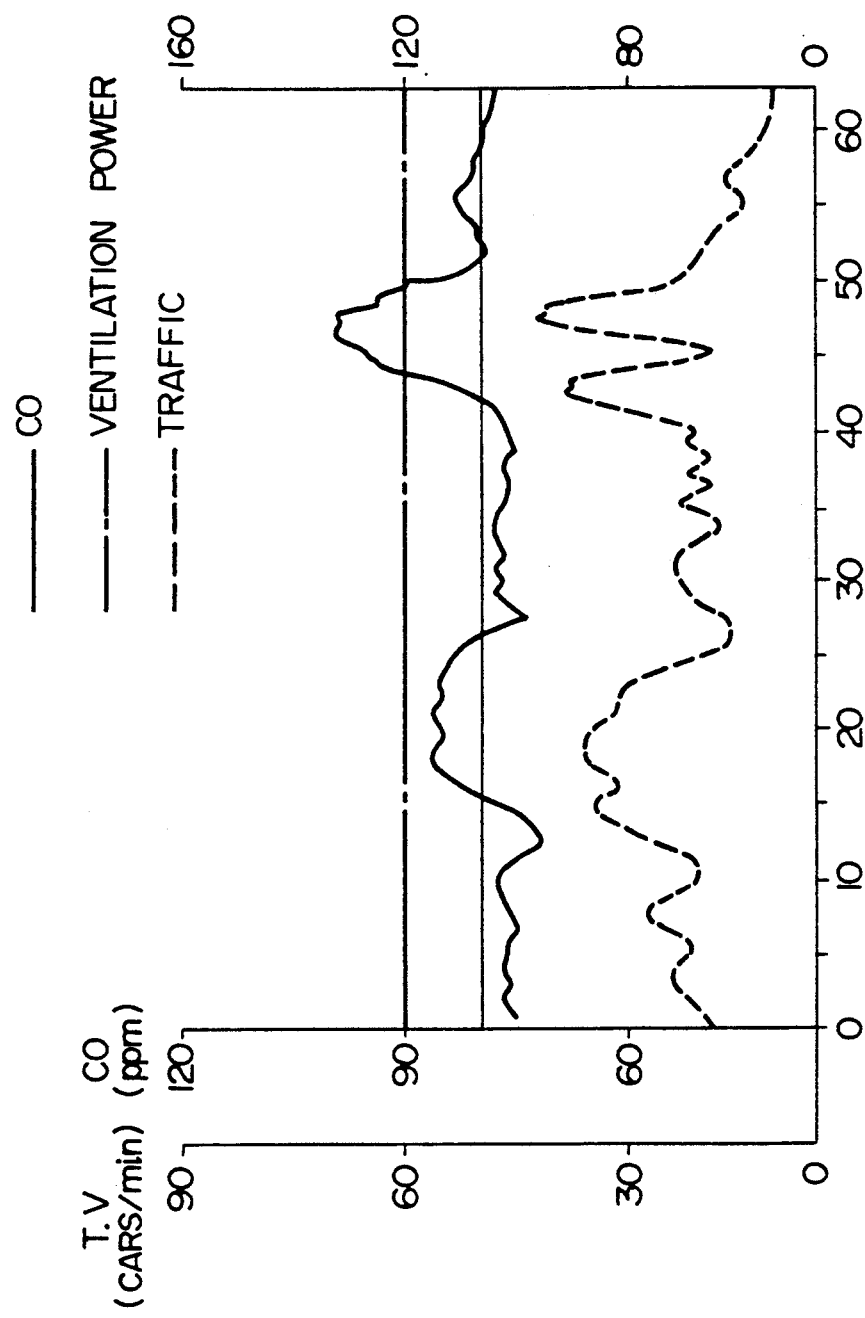
Figure 6:
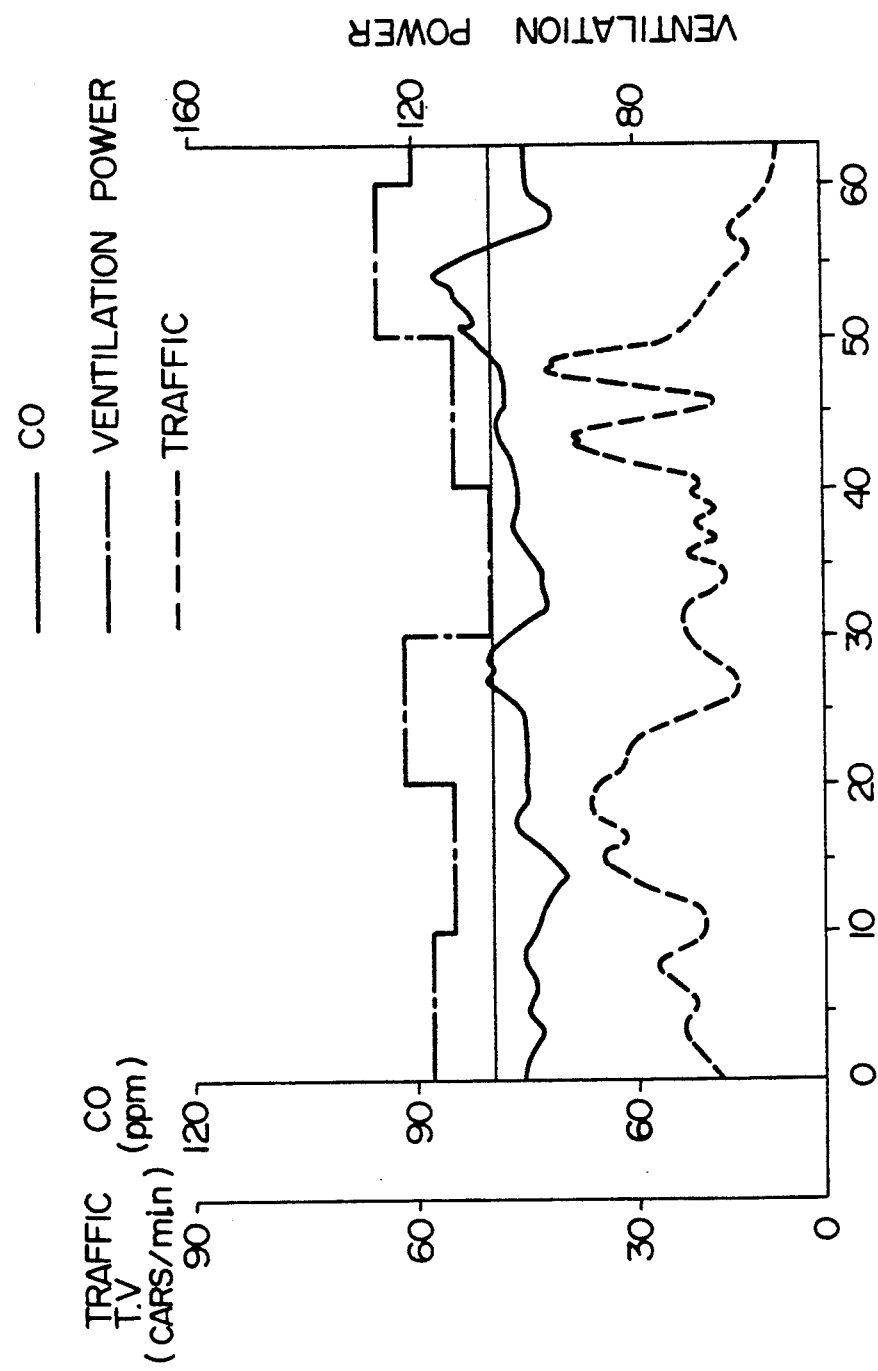
Figure 7:
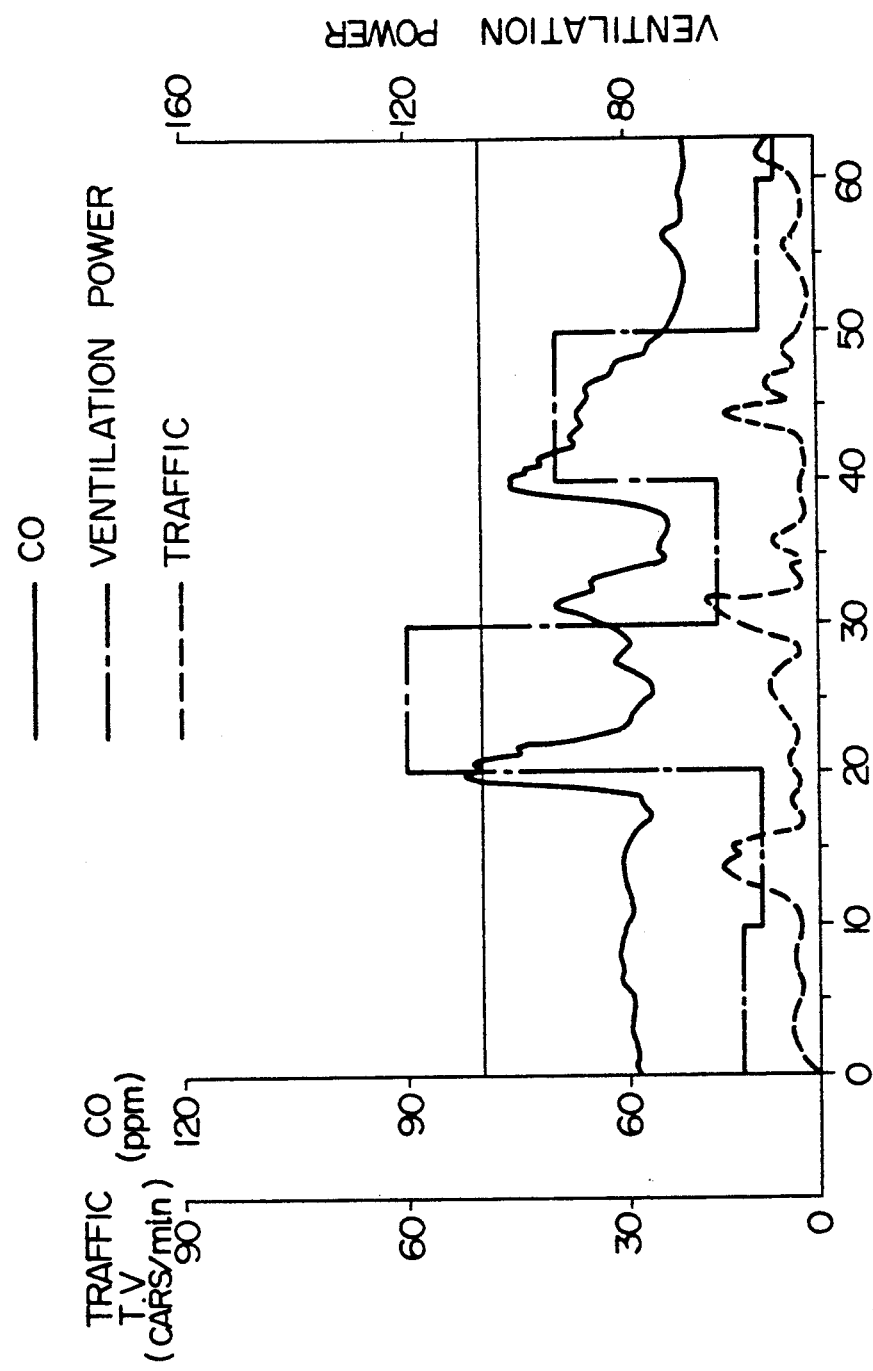

FIG. 3 is a view showing a longitudinal section of the tunnel structure shown in FIG. 2. With the aim to realize a fine control, the tunnel is subdivided into a number n of sections in dependence on the length of the tunnel, the slope of the road and location of the ventilation machines for the control purpose. In FIG. 3, u represents a wind velocity (m/s) on the driveway, $\Delta P_t$ represents an increase in pressure due to the piston effect as brought about by the running cars, $\Delta P_j$ represents an increase (mm $A_g$) in pressure due to operation of the jet fans 7, and $\Delta P_b$ represent an increase in pressure (mm $A_g$) due to the operation of the dust collectors 8.

Figure 11:
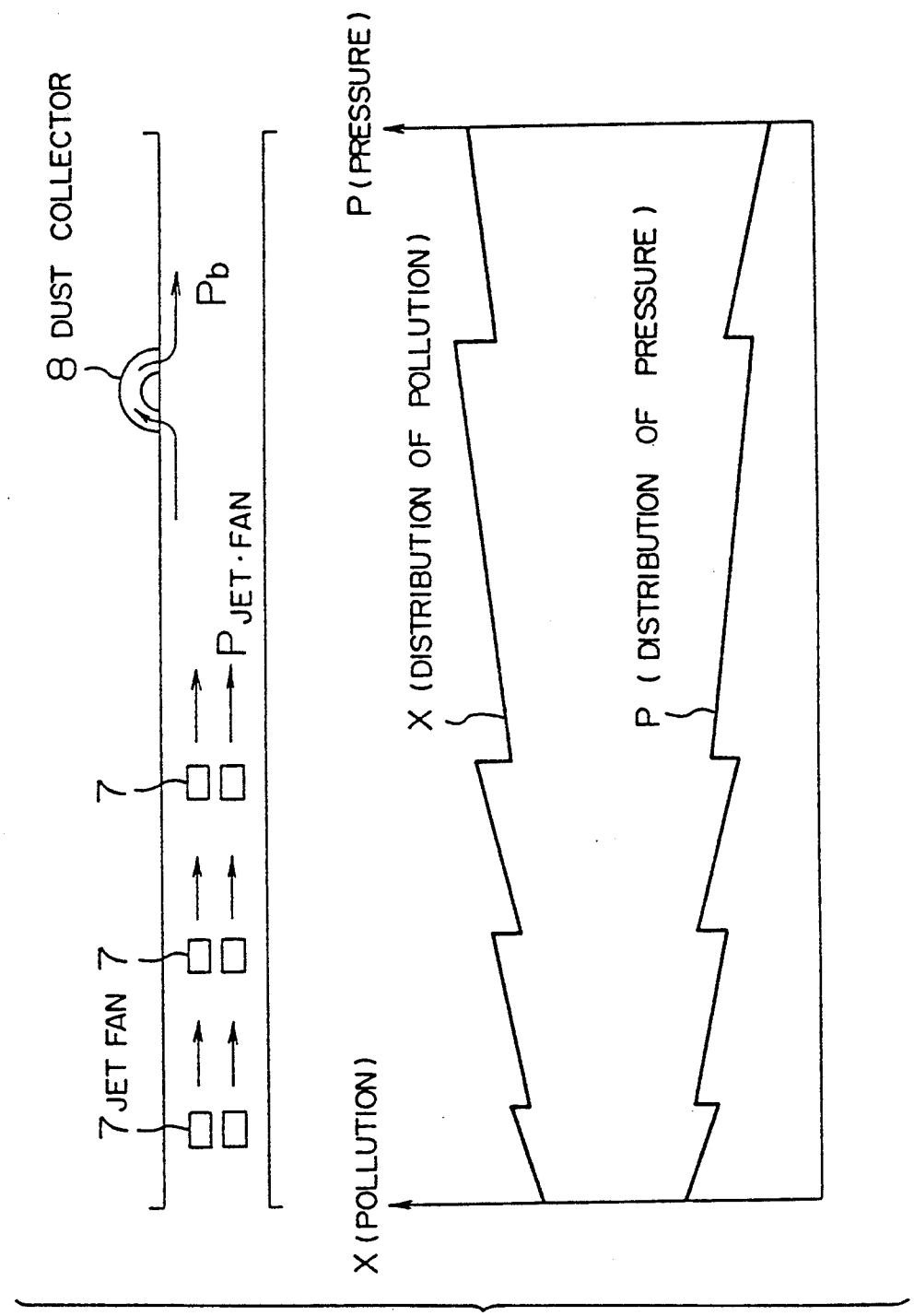
Figure 12:
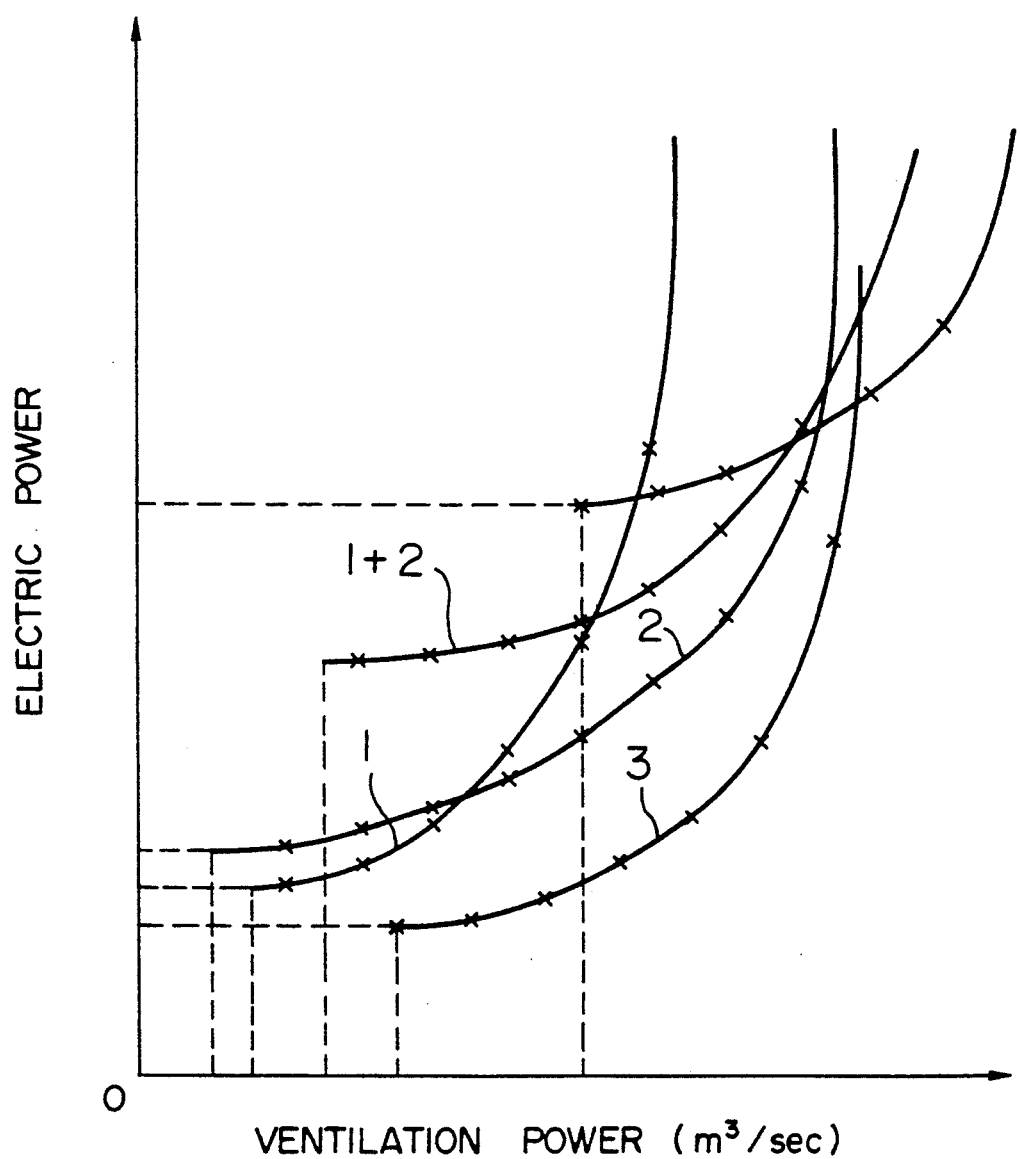

FIG. 11 illustrates a distribution of pollution and a distribution of pressure within the tunnel in the operating state of the tunnel ventilation equipment described above. A high pressure means a high ventilation power and hence a low pollution. It will be seen that the distribution of pollution is a function of the distribution of pressure. Pressure and pollution distribution curves X and P have stepwise nodes at positions corresponding to the locations where the ventilation machines are installed.

FIGS. 5 to 7 and FIGS. 12 to 15 show the measured data for analyzing the various behaviors which the tunnel ventilation process exhibits and the results of the control performed with the aid of a conventional linear control model. On the basis of these data and/or empirical knowledge, there are obtained a predicted pollution factor correlation diagram and an intra-tunnel wind velocity (ventilation power) factor correlation diagram illustrated in FIGS. 8 and 9, respectively. On the basis of these correlation diagrams, the pollution level can be determined qualitatively.

Figure 8:
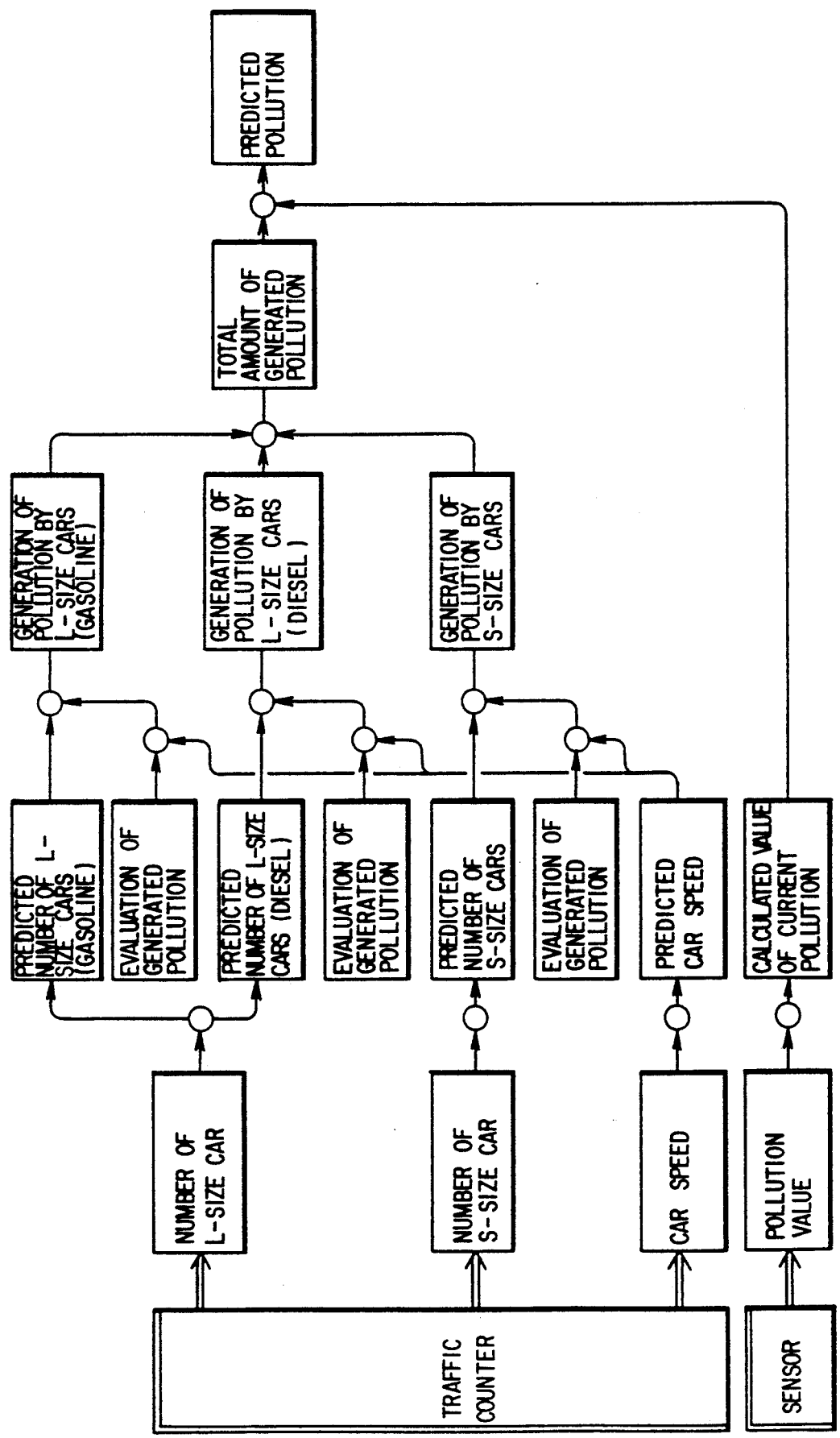

More specifically, FIG. 8 shows an implication network showing a factor correlation for inferring or estimating a total pollution quantity over a period from a time point K (t=kT) to a time point (k+1) (t=(k+1)T).

Figure 9:
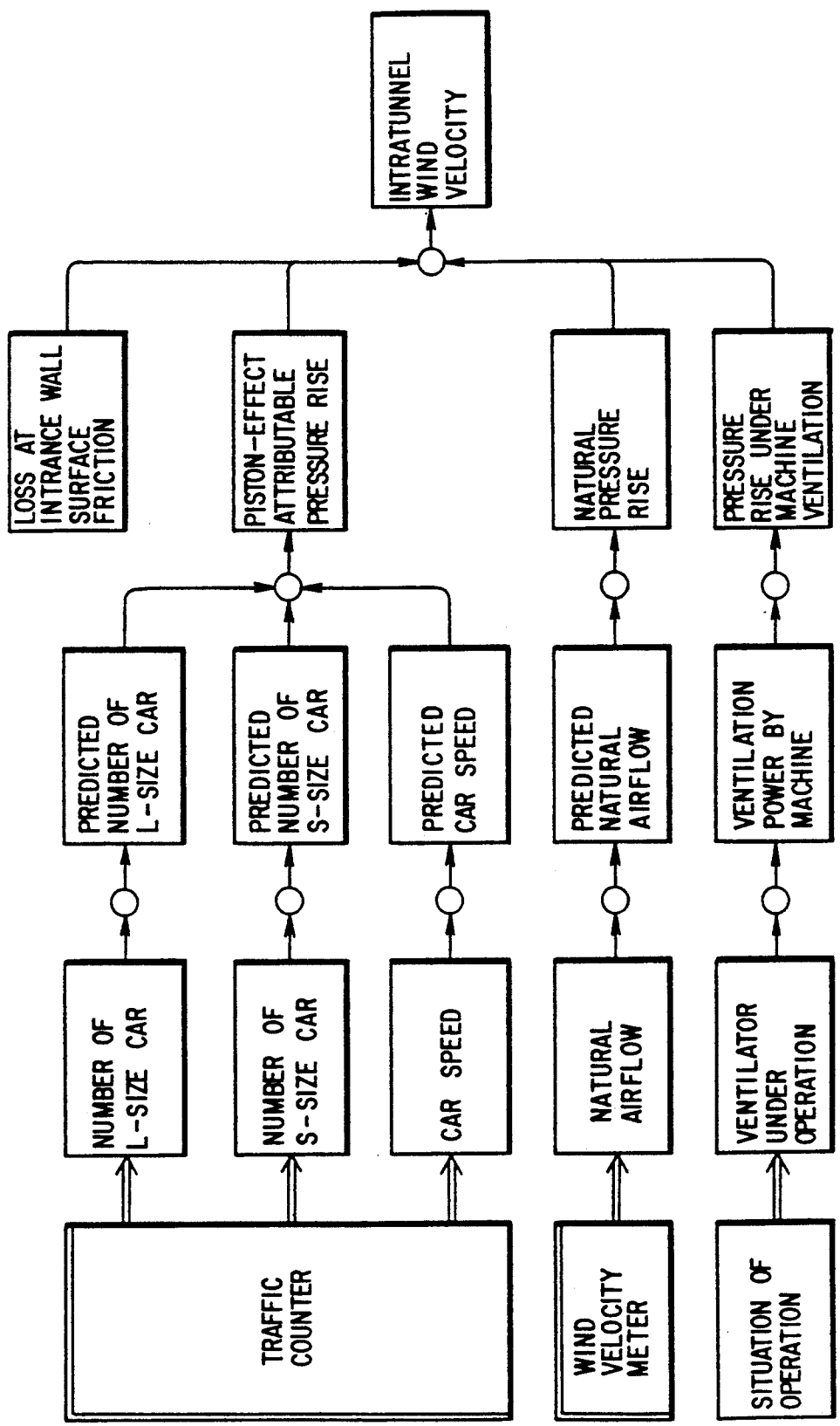

Similarly, FIG. 9 shows an implication network for estimating the intra-tunnel wind (airflow) velocity at a time point (k+1) (t=(k+1)T). Accordingly, the pollution level at the time point (k+1) may be conceptually grasped in terms of a difference between the total pollution quantity and the intra-tunnel wind velocity, wherein a mechanical ventilation quantity corresponding to the deviation of the difference from a target (aimed) value for the control represents the control operation quantity.

With the aid of the implication networks mentioned above, a final control system is structurized on the process control system 1 including the complex inference mechanism shown in FIG. 1 through the procedure of behavior analysis on a factor basis and through the procedure of the process behavior analysis.

Referring to FIG. 1, a numeral 2 denotes that main inference mechanism which receives as the inputs thereto the process data directly, compares the process data values selectively with knowledge data stored in a knowledge base 3, determines the process behavior through the forward fuzzy inference by reference to the production rule set based on the empirical rules and manages the whole system including the other inference mechanisms and the knowledge base 3. The latter stores the universally valid facts, production rules including subjective empirical rules prepared by the expert, meta rules describing synthesized flows of the inference, algorithm methods in the form of mathematical expressions and membership functions for reference by the fuzzy inference mechanism. A numeral 4 denotes a complex fuzzy inference mechanism for inferring directly the conclusions evaluated previously with fuzzy quantities from the measured values of the plural factors or the intermediate (interim) hypotheses. A numeral 5 denotes a predicting fuzzy inference mechanism which is adapted to perform calculation of the fitness of plural control objectives evaluated previously as the fuzzy quantities from combinations of plural digital or analogue operation quantities by utilizing the items predicted by the complex fuzzy inference mechanism to thereby infer such a combination which can ensure the total satisfaction at maximum.

Now, description will be directed to a manner in which a hybrid process including linear and non-linear factors can be controlled with an improved accuracy by the process control system of the structure described above.

Figure 16:
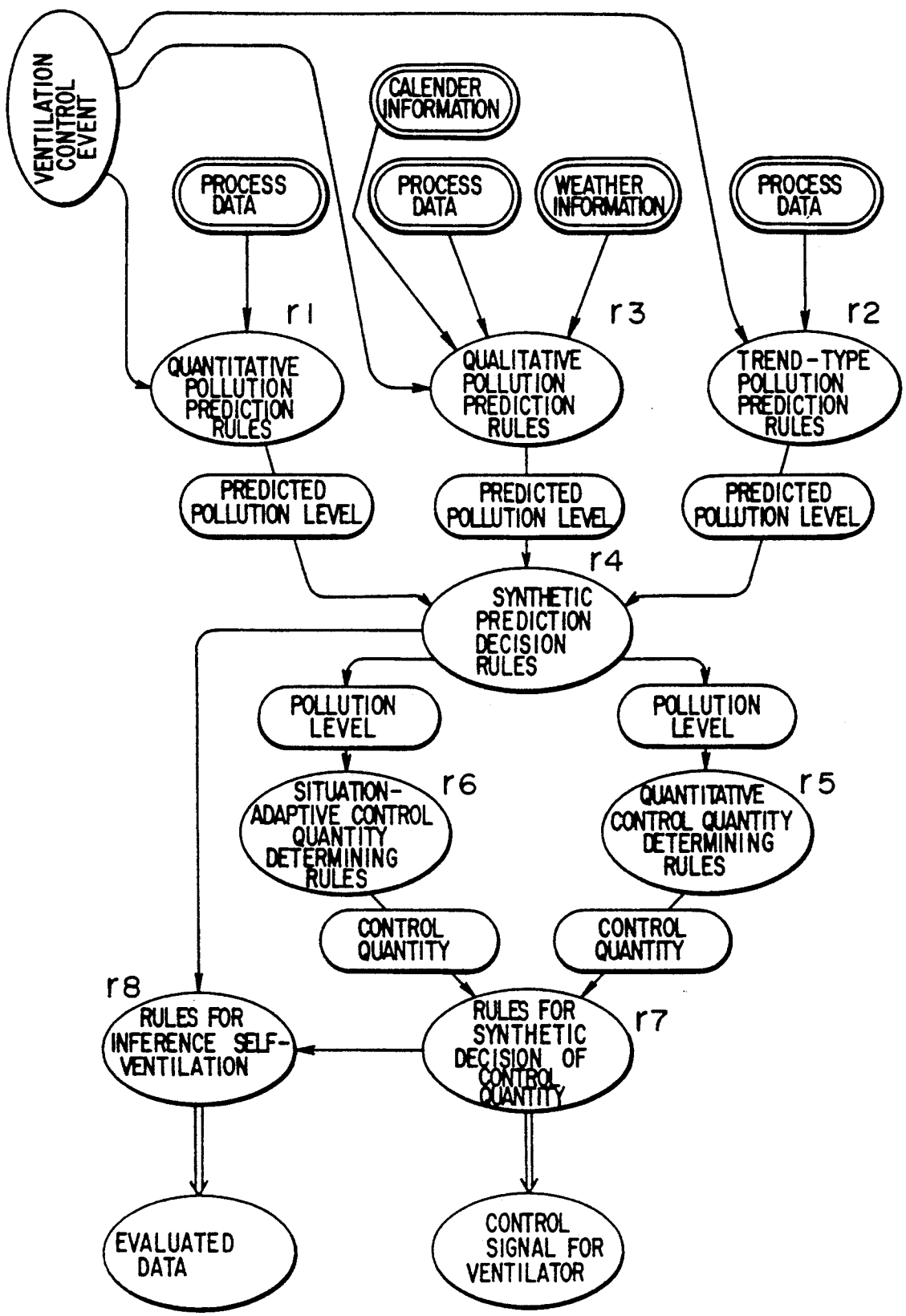

FIG. 16 shows an inference protocol network indicating synthetically correlations of the inferences involved in the tunnel ventilation control. The event of the ventilation control is generated periodically at a time interval T, whereupon the inference is started at this timing. Activated in response to the occurrence of this event, a quantitative type pollution predicting rule group (r1) corresponding to the conventional linear control, a quantitative pollution predicting rule group (r3) for performing prediction for the non-linear process behaviors and a trend-type pollution predicting rule group (r2) serving as the second measures for dealing with the process linear process behaviors are activated, whereupon a pattern matching procedure for making decision as to satisfaction of the given conditions is started. At this juncture, it is to be noted that the unit of "rule group" represents a set of rule knowledge referred to for deriving the conclusion to be determined and that the individual rule groups are so arranged that no common elements are included in the conditional parts and the conclusion parts, being shared among the rules of the rule group. In this way, the unnecessary pattern matching (i.e. decision processing as to satisfaction or dissatisfaction of the condition part of the production rule) can be excluded, whereby the processing speed can correspondingly be increased.

With the three rule groups mentioned above, the process is grasped as the linear or non-linear process, whereby the predicted pollution level is outputted as the conclusion at the time point $(k+1)$ $(t=(k+1) t)$ in the form of the interim hypothesis value satisfying the rule groups. At a time point when any rule of the rule groups can no more satisfy the given conditions, a predicted pollution decision rule group (r4) is activated. With this rule group, the behavior of the whole process at the time point mentioned above is inferred or estimated, to thereby evaluate the interim hypothesis established on the basis of the three rule groups described above. Upon completion of all the pattern matchings involved in the evaluation, the predicted pollution level as selected is outputted again in the form of an interim hypothesis, whereon a quantitative control quantity determining rule group (r5) and a situation-adaptive control quantity determining rule group (r6) are activated. With these two rule groups (r5 and r6), the control operation quantity (displacement from the control quantity at the instant time point) is inferred or estimated in dependence on the process behavior and outputted again as as interim hypothesis.

Finally, a control operation quantity synthetic decision rule group (r7) is activated, whereon the whole process behavior is synthetically judged to determine the final control operation quantity.

Figure 17:
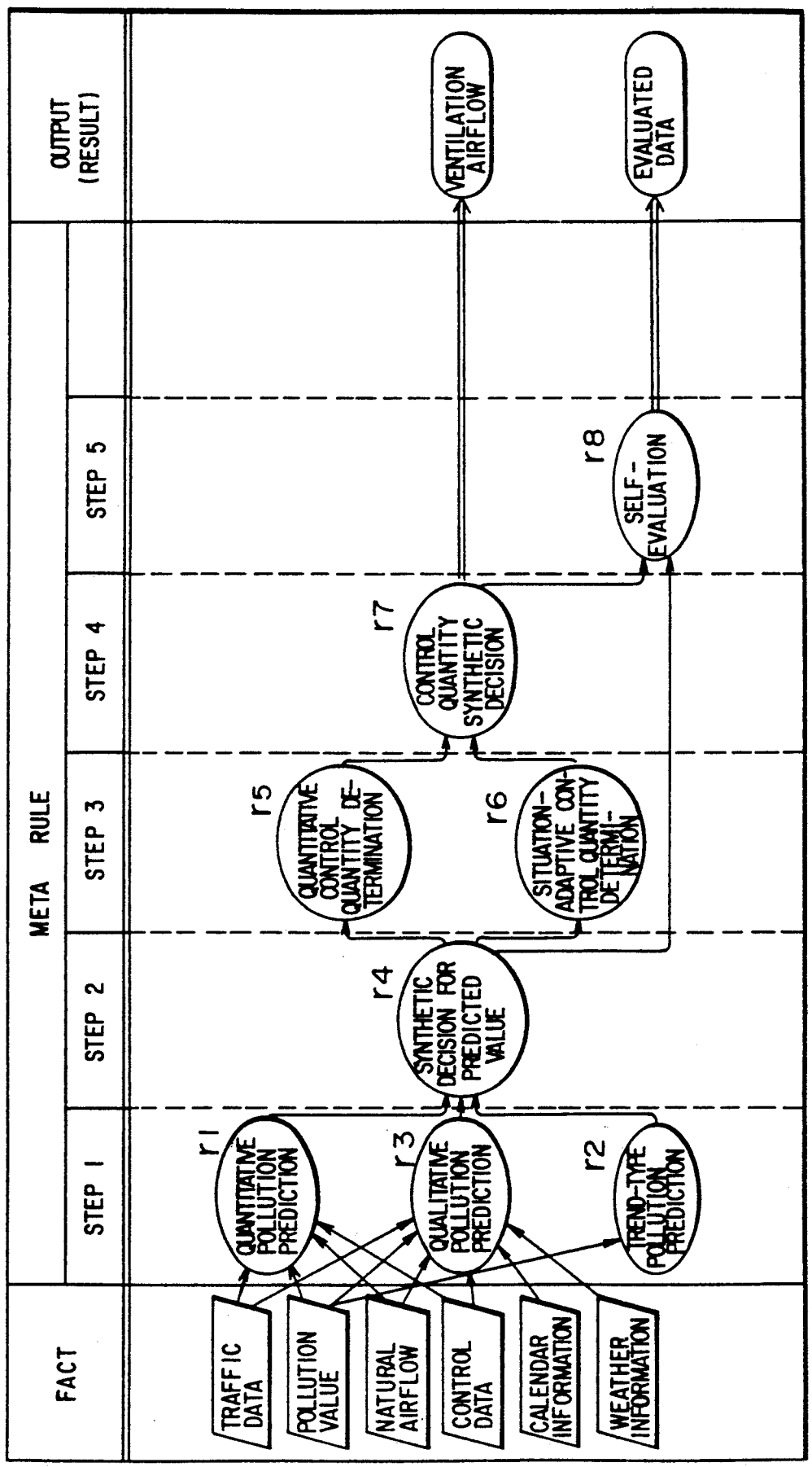

In this manner, an organized flow of the inferences including the processing based on the mathematical model solution algorithms and a flow of expert's thinking process incapable of being expressed in the form of algorithm can be definitely determined for each process of concern. A consolidated or synthesized inference control rule group (meta rule group) resulting from a rewriting of the organized inference flow mentioned above is shown in FIG. 17. This meta rule group is referred to as the inference network, wherein the rules listed in a same column are used at a same step and is assigned with a same priority level for the activation. On the other hand, the rules entered in the rowwise direction are mutually correlated such that the rules most remoted from the conclusion are assigned with the highest priority and so forth.

Next, description will be made of a manner in which the individual rule groups (r1 to ry) grasp the process behaviors, deduce the intermediate or interim hypothesis or make the decisions.

(1r): Quantitative Pollution Predict Rule Group

Figure 18:
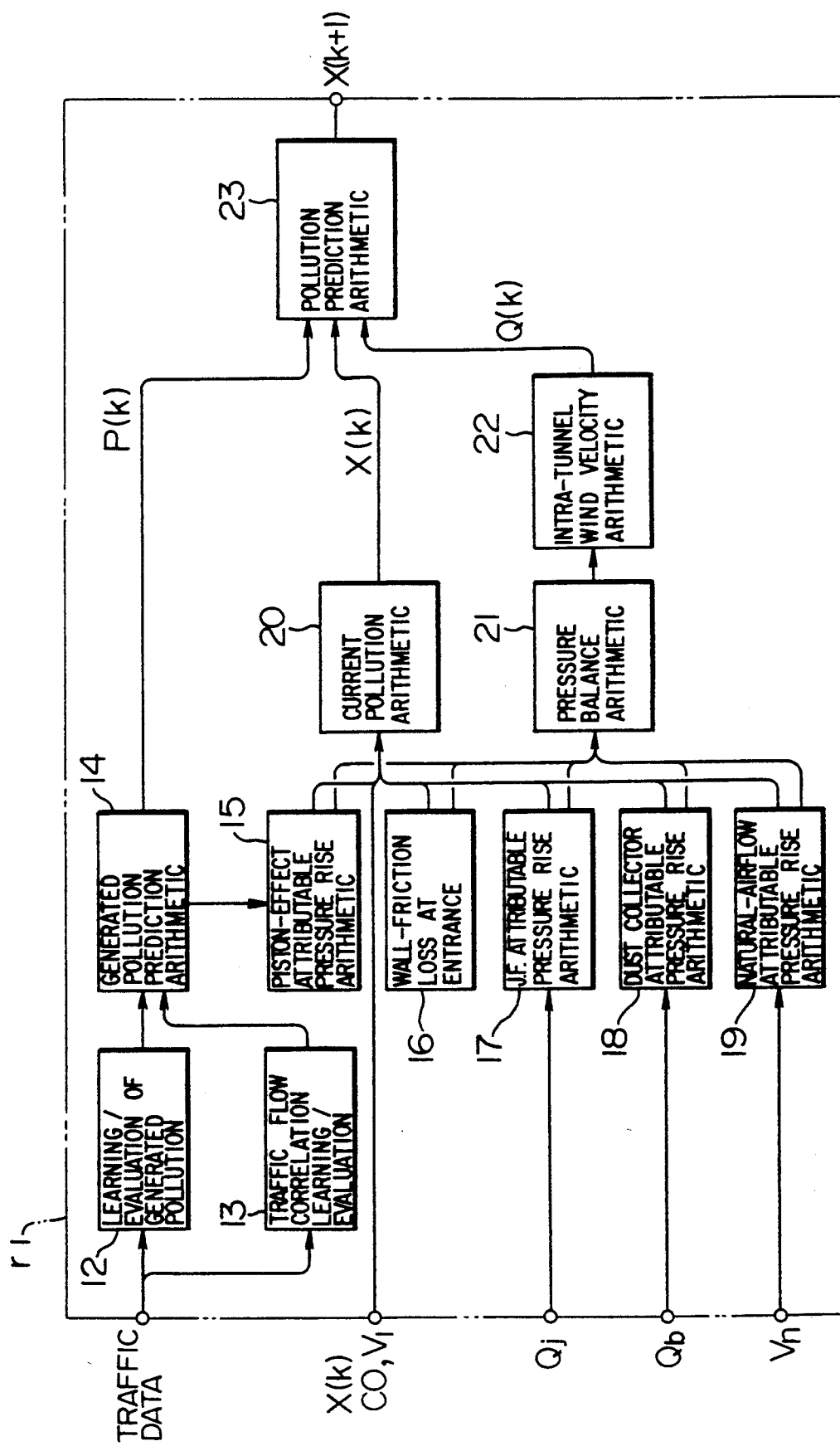

FIG. 18 shows a logical structure of the quantitative pollution predicting rule group (r1) which is adapted to grasp the tunnel ventilation process as a linearly behaving process to thereby predict the pollution level or quantity as the interim hypothesis at the time point $(k+1)$ $(t=(k+1) T)$ with the aid of the mathematical model. As described hereinbefore, when the tunnel ventilation process exhibits the linear behavior, the pollution quantity or level X $(k+1)$ at the time point $(k+1)$ can be expressed as follows:

$$X(k + 1) = \frac{Q(k)}{A} \cdot X(k) + P(k) \quad (8)$$

The first term of the right-hand side of the expression (8) indicates that the ventilation power Q(k) has decreased the pollution during a period from the time point k to $(k+1)$ when compared with the pollution level X(k) at the time point k. The term P(k) of the above expression (8) represents a total sum of the pollution generated during the period from the time point k to the time point $(k+1)$. Accordingly, the expression (8) can be rewritten as follows:

$$X(k+1) = f(Q(k), X(k), P(k)) \quad (9)$$

Since the ventilation power Q(k) can be expressed in terms of the intra-tunnel driveway wind velocity n, $$Q(k) = g(u(k)) \quad (10)$$

For the pollution value of X(k), the measured values of the CO meter and the VI meter, respectively, can be utilized so far as the pollution is uniform within the tunnel with these sensors measuring the respective objectives accurately. On the other hand, the total sum of the pollution P(k) can be expressed as a function of the traffic flow as follows:

$$P(k) = h(n_s(k), n_l(k), d_l V_t) \quad (11)$$

where $n_s(k)$ represents the number of small cars transited during a period from a time point $(k-1)$ to k, $n_l(k)$ represent the number of large size cars transited during the same period, and $d_l(V_t)$ represents the ratio of Diesel cars to the number of large size cars transited at the average running speed of $V_t$ on the assumption that the concept of the large size car covers the Diesel car.

The function g and h in the expressions (10) and (11) can be determined as follows:

(1) Derivation and logical representation of the pollution generation function k This function can be defined by the following expression:

$$\begin{aligned} P(k) &= h(n_s(k), n_l(k), d_l(k)) \\ &= v_s^* n_s(k) + V_{ld}^* n_l(k)^* d_l + \\ &\quad v_{lg}^* n_l(k)^* (1 - d_l) \end{aligned} \quad (12)$$

where $v_s$: amount of pollution produced by one small size car, $v_{ld}$: amount of pollution produced by one Diesel car, and $v_{lg}$: amount of pollution produced by one small size car.

For determining the total sum of pollution P(k), there is required the predicted value of the traffic flow at the time point $(k+1)$ in addition to $v_s$, $v_{ld}$, $b_{lg}$ and $d_l(V_t)$. A produced pollution learning/evaluation logic 12 shown in FIG. 19 serves to determine $v_s$, $v_{ld}$, $v_{lg}$ and $d_l(k)$ while learning the corresponding data in the past.

Figure 19:
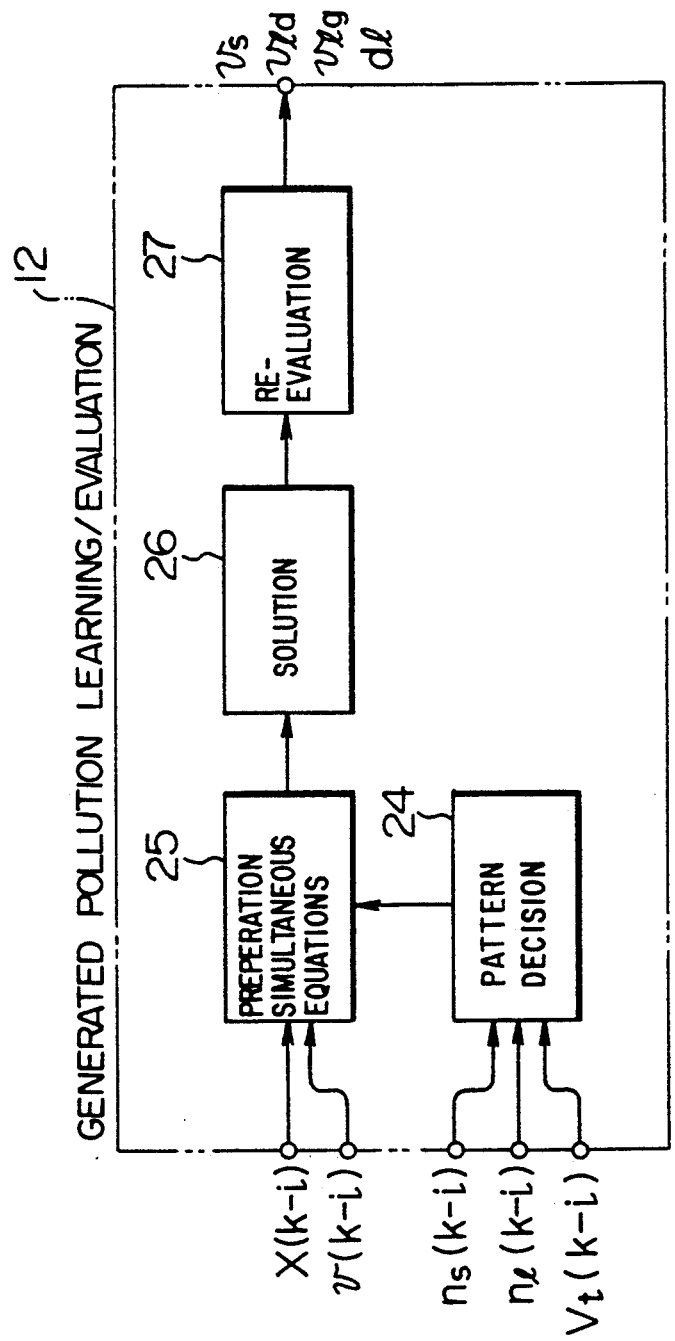

FIG. 19 shows a logic configuration to this end. The produced pollution learning/evaluation logic 12 is supplied as the input thereto with the time-serial data $X(k-i)$ (where i=0, 1, 2, ...) of the pollution values measured in the time sequence from the present to the past, the intra-tunnel wind velocity time-serial data $u(k-i)$ (where i=0, 1, 2, ...) measured similarly by the wind direction/velocity meter as the ventilation information quantity, the measured traffic flow time-serial data $n_s(k-i)$ and $n(k-i)$ measured by the traffic sensor TC and the car speed $V_t(k-i)$, to thereby output the quantities $v_s$, $v_{ld}$, $v_{lg}$ and $l_d$ determined for every car-speed range and the total traffic range. The amount of pollution P(k) generated during the period from a time point (k−1) to the current time point k can be determined in accordance with the following expression:

$$P(k) = (X(k) - X(k-1)) + Q(k) \qquad (13)$$

From the expressions (12) and (13), the following difference equation can be derived.

$$X(k) - X(k-1) + Q(k) = v_s^* n_s(k) + v_{ld}^* n_l(k)^* d_l + \qquad (14)$$
$$v_{lg}^* n_l(k)^* (1 - d_l)$$

The amount of pollution generated by one car remains substantially constant within a given speed range. It is however noted that the amount of pollution of concern undergoes variation in the course of long time lapse in dependence on the types of the cars, the regulations and other factors. Accordingly, by selectively classifying the data on a car-speed basis and correcting from time to time the data by learning, not only high accuracy for the control can be assured but also the data can constantly be updated.

A pattern determination logic 24 serves to determine a pattern based on the car speed $V_t$ and the total traffic flow $(n_s(k) + n_l(k))$ at a time point of concern to thereby activate a simultaneous equation generating logic 25. The latter solves the following simultaneous equations (15) from the time-serial data closest to the determined pattern.

$$X(k) - X(k-1) + Q(k) = v_s^* n_s(k)^* v_{ld} + v_{ld}^* n_l(k)^* d_l + \qquad (15)$$
$$v_{lg}^* n_l(k)^* (1 - d_l)$$

$$X(k - i_1) - X(k - i_1 - 1) + Q(k - i_1) = v_s^* n_s(k - i_1) +$$
$$v_{ld}^* n_l(k - i_1)^* d_l + v_{lg}^* n_l(k - i_1)^* (1 - d_l)$$

$$X(k - i_2) - X(k - i_2 - 1) + Q(k - i_2) = v_s^* n_s(k - i_2) +$$
$$v_{ld}^* n_l(k - i_2)^* d_l + v_{lg}^* n_l(k - i_2)^* (1 - d_l)$$

$$X(k - i_3) - X(k - i_3 - 1) + Q(k - i_3) = v_s^* n_s(k - i_3) +$$
$$v_{ld}^* n_l(k - i_3)^* d_l + v_{lg}^* n_l(k - i_3)^* (1 - d_l)$$

The simultaneous equations are solved by a solution logic 26, whereon the quantities $v_s$, $v_{ld}$, $v_{lg}$ and $d_l$ for every speed range and total traffic flow are reviewed and updated.

From the expression (12), the amount of pollution generated during a period from the instant time point k to a time point (k+1) in the future can be predicted in accordance with the following expression (12'):

$$P(k+1) = v_s^* n_s(k+1) + v_{ld}^* n_l(k+1)^* d_l + \qquad (12')$$
$$v_{lg}^* n_l(k+1)^* (1 - d_l)$$

In this manner, prediction of the traffic flow is possible and is necessary.

When the traffic flow during a predetermined period lies within a predetermined range and when the car speed lies within a predetermined range (more specifically, when a smooth traffic flow takes place without interruption), the linear prediction of high accuracy can be realized by installing traffic counters at the entrance a and the exit b of the tunnel, respectively. More specifically, it is assumed that the time-serial data of the traffic flows at the locations a and b are represented as follows:

$$n_a(i), n_a(i+1), n_a(i+2), \ldots$$

$$n_b(i), n_b(i+1), n_b(i+2), \ldots$$

Further, a number j of unit times are consecutively interconnected to define a period, and the traffic flow during that period is assumed to be given by the following expression:

$$n_a^*(i) = n_a(i) + n_a(i+1) + \ldots + n_a(i+j-1) \qquad (16)$$
$$n_b^*(i) = n_b(i) + n_b(i+1) + \ldots + n_b(i+j-1)$$
$$(i = 1, 2, \ldots)$$

Further, assuming the intra-tunnel space as a black box having the input of $n_a^*(i)$ (where $i = 1, 2, \ldots$) and the output of $n_b^*(i)$ (where $i = 1, 2, \ldots$), then the relation given by the following expression (17) may be considered as existing between the input and the output.

$$n_b^*(i) = \sum_{m=1}^{M} B(m) \cdot n_a^*(i - m) + \epsilon(i) \qquad (17)$$

where B represents an impulse response function, and e represents an error involved in the linear modeling. The term B(m) (where $m = 1, 2, \ldots M$) represents the impulse function which can minimize $$\sum_{i=1}^{I} \epsilon^2(i),$$

where I represents the number of samples. The impulse function B(m) can be determined in accordance with:

$$V_{ba}(l) = \sum_{m=1}^{M} V_{aa}(l - m) \cdot B(m) (l = 1, 2, \ldots, M) \qquad (18)$$

where $V_{ba}(l)$ represents a covariance of $n_b^*(i)$ and $n_a^*(i+1)$ while $V_{aa}(l)$ represents a covariance of $n_a^*(i)$ and $n_a^*(i+1)$.

FIG. 20 shows a traffic flow correlation learning-/evaluation/prediction logic 13 for predicting a linear traffic flow by autonomical learning on the basis of the concept elucidated above. This logic 13 receives as the input thereto the time-serial data of the small-size car number given by $_a n_s(k-i)$, $_b n_s(k-i)$ (where $i = 0, 1, \ldots$), the time-serial data of the large-size car number given by $_a n_l(k-i)$, $_b n_l(k-i)$ ($i = 0, 1, \ldots$) and the car speed time-serial data given by $_a V_t(k-i)$ ($i = 0, 1, \ldots$) each for a unit time at the locations a and b, to thereby output prediction values for the numbers $n_s(k+1)$ and $n_l(k+1)$ of small size and large-size cars, respectively, which will transit through the tunnel during a period from the instant time point $k(t=kT)$ up to a time point $(k+1)(t=k+1)T)$. A covariance $V_{aa}$ determination logic 28 determines arithmetically the covariance $V_{aa}$, while a covariance $V_{ba}$ determination logic 29 determines arithmetically the covariance $V_{ba}$. These covariances determined are inputted to an impulse function determination logic 30 which responds thereto by determining the impulse function B(m) on a car-speed basis. A traffic flow correlation evaluation logic 31 receives the determined impulse function B(m) to compare it with the impulse functions B(m) collected in the past and update the former through an evaluation procedure. In response to the input of the updated impulse function B(m), a traffic flow prediction logic 32 predicts the traffics $n_s(k+1)$ and $n_l(k+1)$ of small-size and large-size cars, respectively, during a time span from the instant time poing k to the time point (k+1) in the future by making use of a relation given by $$n(k+1) = \sum_{m=1}^{M} B(m) \cdot n_d(i-m) \quad (17')$$

Figure 21:
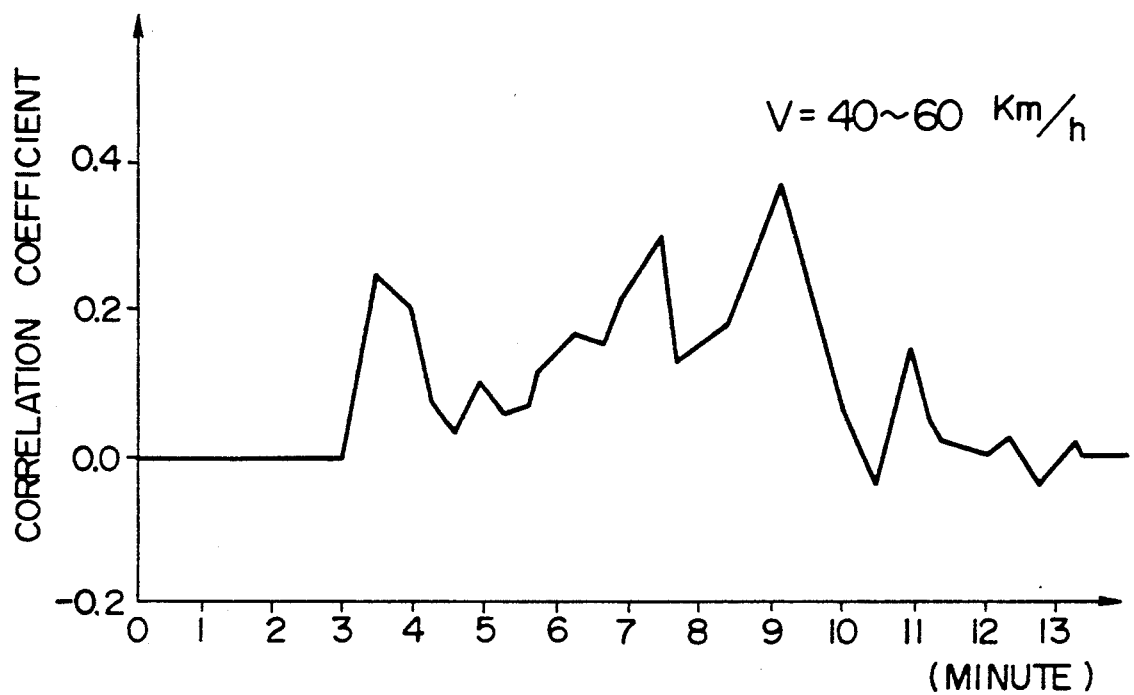

FIG. 21 shows graphically the impulse function learned and evaluated by the logic described above for a car-speed range of 40 to 60 km/h. It will be seen that the minimum transit time, average transit time and the maximum transit time in the tunnel are three minutes, eight minutes and twelve minutes, respectively. The prediction error involved in the procedure for determining and predicting the impulse function by learning is less than several % within the predetermined ranges of the car-speed and the traffic ranges.

(2) Determination and logical structurization of ventilation power function g The ventilation power $Q(k+1)$ at a time point $(k+1)$ $(t=(k+1)T)$ can be determined in accordance with the following expression:

$$Q(k+1) = C \cdot A \cdot L \cdot v(k+1) \quad (19)$$

where
  C: correction coefficient,
  A: sectional area of the tunnel,
  L: overall length of the tunnel, and
  V(k+1): wind velocity at a time point (k+1) (t=(k+1)T).

Prediction based on the expression (19) means ultimately the determination of v(k+1).

The intra-tunnel driveway wind velocity can be determined through sequential developments of mathematical expressions from the condition that the intra-tunnel pressure balance is constant. More specifically, the tunnel is subdivided into n sections, as shown in FIG. 3, whereon a balance equation of the adjacent sections is created. Since the pressure in each section can be determined in dependence on the ventilation machine installed in that section as well as the piston effect mentioned hereinbefore and the natural airflow within that tunnel section, the pressure can be obtained as the solution of the above-mentioned equation. Since the mathematical expressions of concern are known in the art, further description thereof will be unnecessary. It can be seen that the accuracy of the wind velocity on the roadway within the tunnel is affected significantly by the accuracy of the traffic prediction and the behavior of the natural airflow.

In response to the input of the predicted amount of pollution generated and the predicted ventilation power of faculty Q(k) during a period from a time point k to a time point (k+1) as determined logically based on the pollution generation function k and the ventilation power function g and the pollution level or value X(k) at the time point k determined through the current pollution determination logic 20 from the sensor output data, a pollution prediction arithmetic logic determines by taking advantage of the linearity of the individual factors the pollution value X(k+1) at the time point (k+1) in accordance with the following system equation:

$$X(k+1) = -\frac{Q(k)}{A} \cdot X(k) + P(k)$$

(2r): Trend-type Pollution Predicting Rule Group

Figure 23:
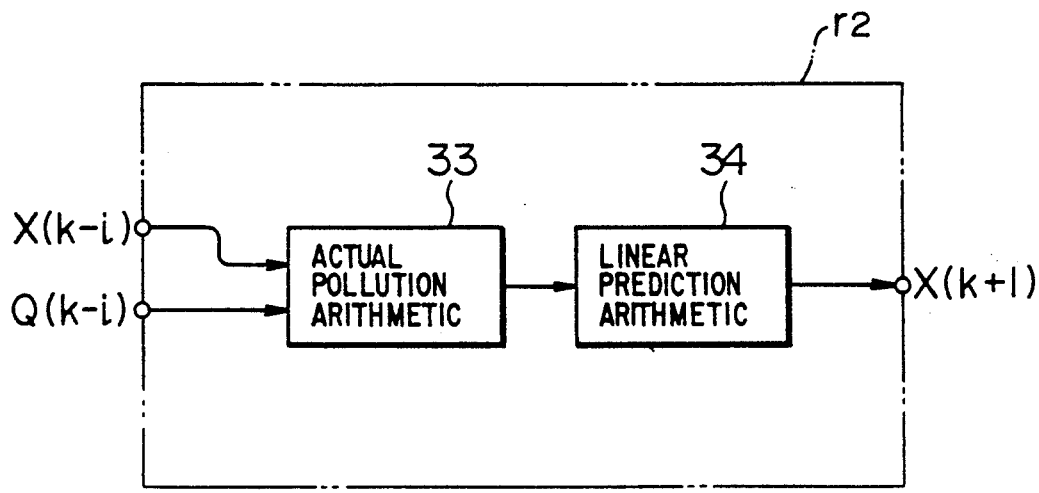
FIGS. 22 and 23 are views for illustrating trend-type pollution prediction.
Figure 22:
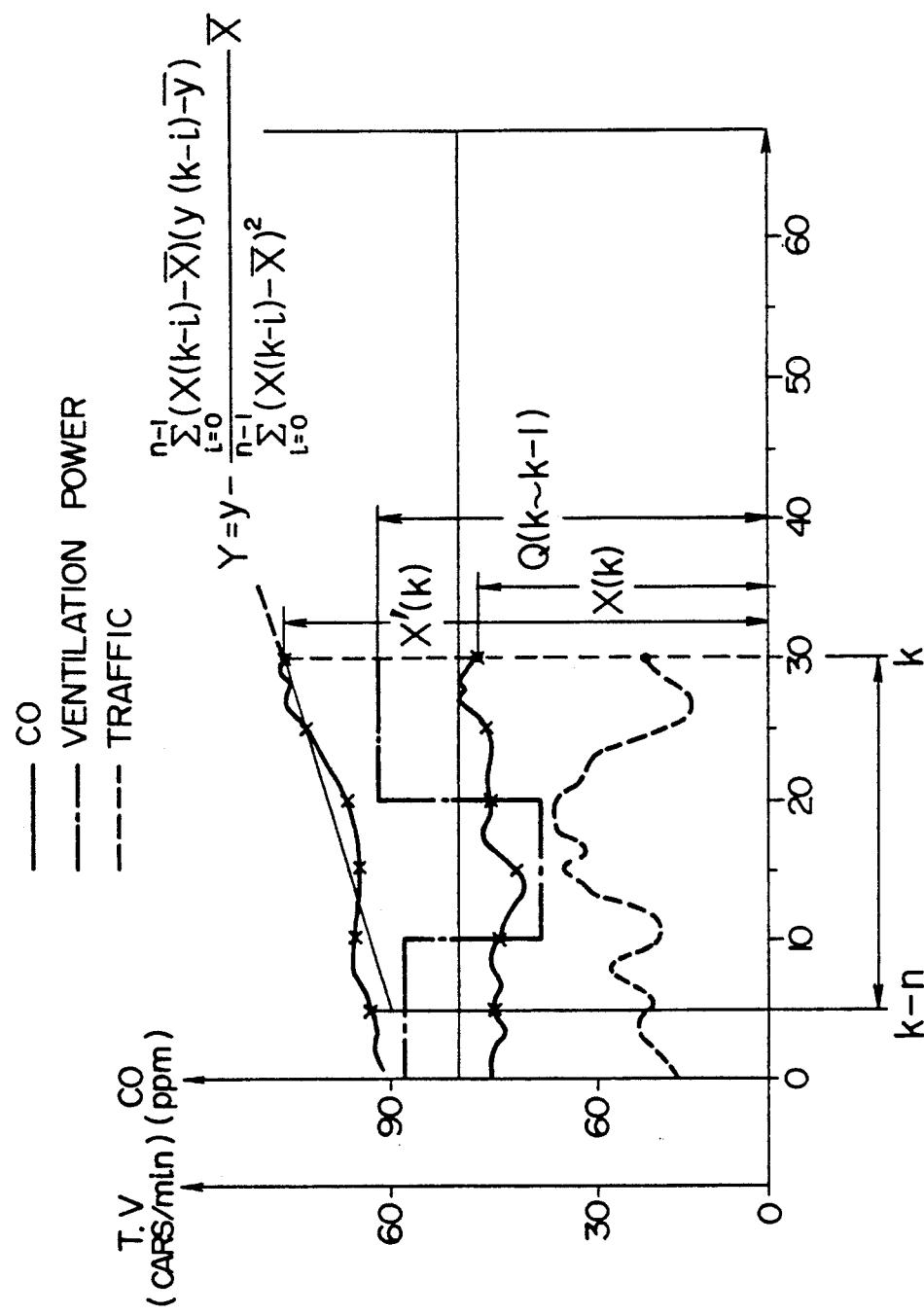

FIGS. 22 and 23 are views for illustrating operation and structure of the trend-type pollution predicting rule group (r2). The rule group (r1) described above is to deduce the predicted pollution value X(k+1) with the aid of the mathematical models by taking advantage of the linear relations existing among the individual factors. In contrast, the trend-type pollution predicting rule group r2 is to predict the levels of CO and VI by finding relevent linear relations in the variation or transition of the process signals CO and VI measured by the respective sensors.

FIG. 23 shows a structure of the rule groups r2 to this end. The trend-type pollution predicting rule group r2 receives as the input thereto the time-serial data of the measured pollution $X(k-i)$ (where i=0, 1, 2, ...) and the time-serial data of the utilized ventilation power $Q(k-i)$, where i=0, 1, 2, ...) to thereby output a predicted pollution value X(k+1) at a time point (k+1) on the assumption that the ventilation is constant up to that time point (k+1).

In FIG. 22, the traffic amount and the pollution parameter (CO-level in the case of the illustrated example) are taken along the ordinate with time being taken along the abscissa. Since the pollution value X(k) is given by $$X(k) = -\frac{Q(k-1)}{A} \cdot X(k-1) + P(k-1)$$

the change or transition in the actual pollution level or value $X^\blacktriangledown(k)$ is given by $$X^\blacktriangledown(k) = X(k) + \frac{Q(k-1)}{A} \cdot X(k-1)$$

on the assumption that the ventilation Q(k−1) during a period from a time point (k−1) to k is zero. When the time-serial data of the real pollution level $X^\blacktriangledown(k-1)$ (where i=0, 1, 2, ...) obtained in this manner exhibits the linear behavior, the actual pollution value $X^\blacktriangledown(k+1)$ at the time point (k+1) can be determined by the actual pollution arithmetic logic 33 through the method of least squares as follows:

$$X^\blacktriangledown(k+1) = \beta \cdot t(k+1) + \alpha$$
$$\alpha = X^\blacktriangledown = B \cdot t$$

$$\beta = \frac{\left( \sum_{i=0}^{n} (t(k-i) - t)(X^\blacktriangledown(k-1) - X^\blacktriangledown) \right)}{\sum_{i=1}^{n} (t(k-1) \, t)^2}$$

where $$t = \left( \sum_{i=0}^{n} t(k-1) \right)/n$$

-continued $$X^\blacktriangledown = \left(\sum_{i=0}^{n} X^\blacktriangledown(k-i)\right)/n$$

The linear prediction arithmetic logic 34 executes arithmetic operation in accordance with the following expression:

$$X(k+1) = X^\blacktriangledown(k+1) - \frac{\alpha(k)}{A} \times (k)$$

whereby the poolution value X(k+1) is outputted.

(r3): Qualitative Pollution Predicting Rule Group

The two rule groups described above are destined to grasp the linear process behaviors for predicting the pollution. In contrast, the qualitative pollution predicting rule group (r3) is so arranged that the process behavior is not grasped definitely either as linear or non-linear behavior but can be coped with flexibly by taking into account the various situations.

Figure 24:
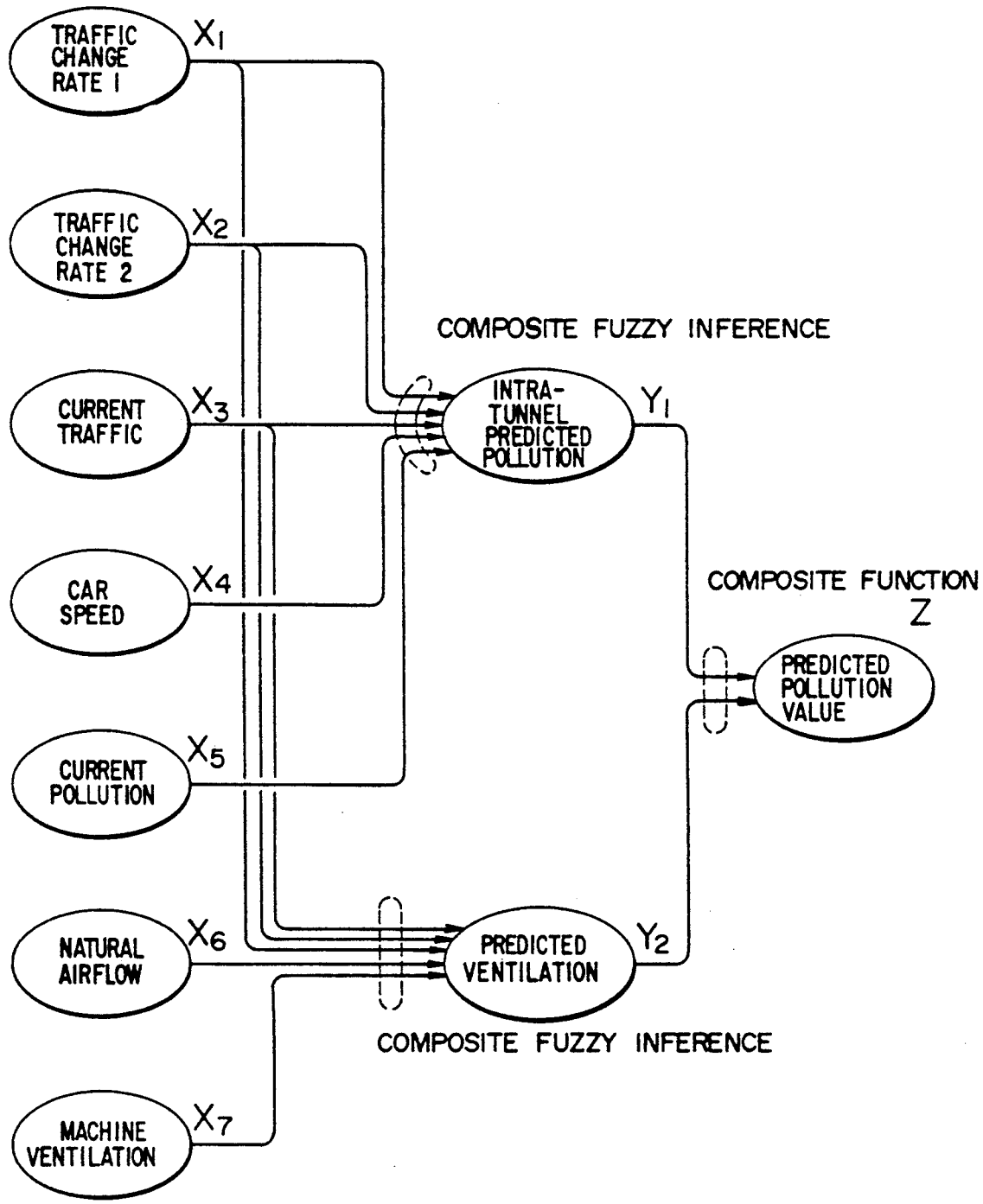
FIGS. 24 and 32 are views for illustrating a qualitative pollution prediction and a complex fuzzy inference mechanism.

FIG. 24 shows a qualitative meaning (implication) network for the pollution prediction at a time point (k+1) (t=(k+1)T). Although this network bears resemblance in appearance to the networks shown in FIGS. 8 and 9, the former is quite different from the latter. The network shown in FIG. 24 is obtained on the basis of empirical rules of the operator, results of the measurement of various data over a long period and simulation, wherein countless factors and external disturbances existing possibly are represented by factor sets $X_1$ to $X_7$, the prediction (inference) being made starting from these factor sets.

In the case of the network shown in FIG. 24, the amount of intra-tunnel pollution $Y_1$ generated during a period from a time point k to a time point (k+1) is inferred directly from five types of factors, i.e. the first traffic flow change rate 1 (trend of change over a long period) $X_1$, the second traffic flow change rate 2 (trend of change in the latest short period) $X_2$, the current traffic amount $X_3$, the car speed $X_4$ and the current polution level $X_5$.

Similarly, the amount of ventilation $Y_2$ during a period from a time point (k+1) is also estimated directly from the above-mentioned factors $X_1$, $X_2$ and $X_3$ and the natural airflow $X_6$, the machine ventilation amount $X_7$ (i.e. amount of ventilation effected by the jet fans and the dust collectors in the case of the illustrated embodiment).

All the factors or items $X_1$, $X_2$, $X_3$, $X_4$, $X_5$, $X_6$, $X_7$, $Y_1$ and $Y_2$ are handled as fuzzy quantities, and the respective membership functions are defined.

According to the teaching of the present invention, this multi-factor inference can be performed by the complex fuzzy inference mechanism 4.

Figure 25:
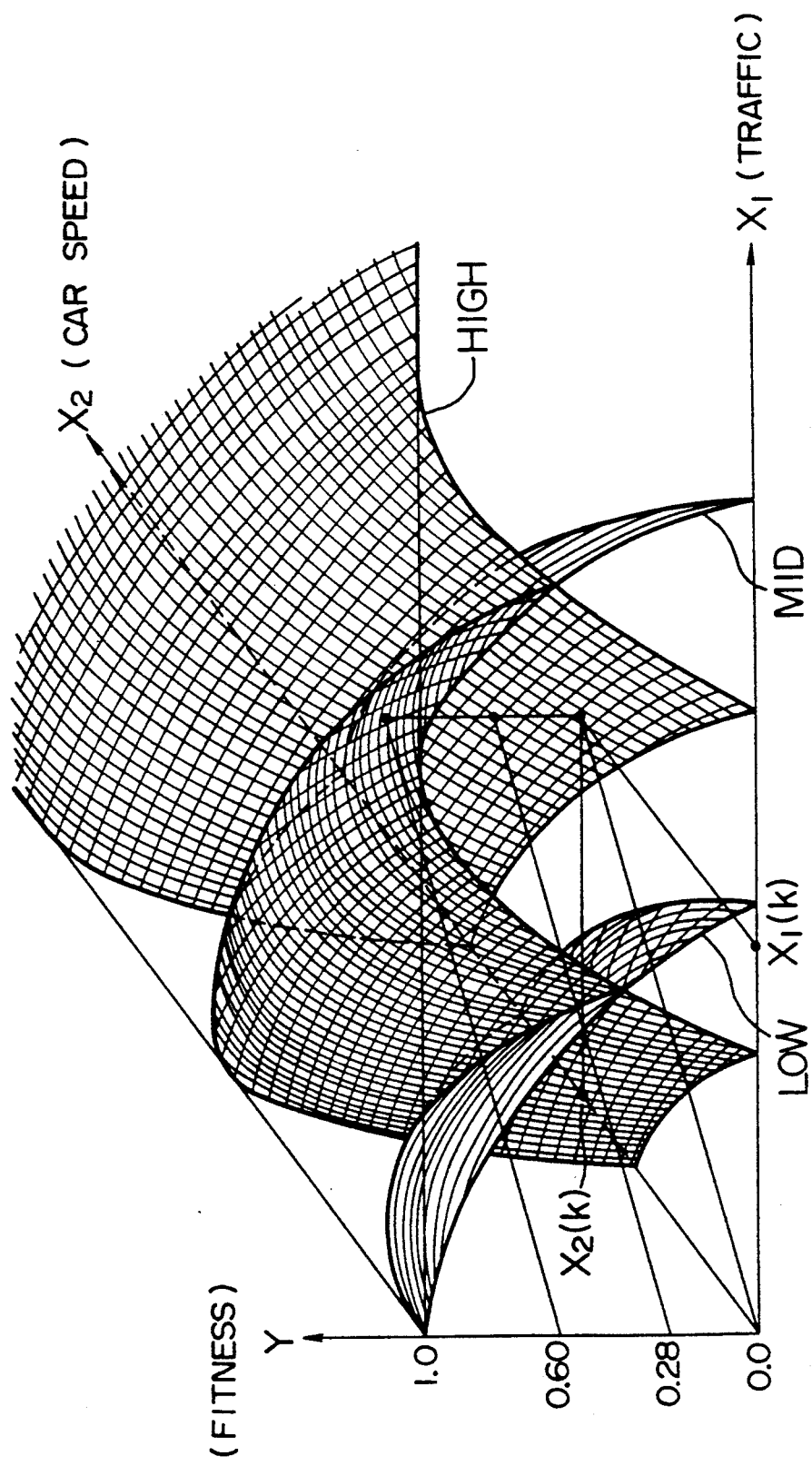

FIG. 25 is a view for illustrating the simplest three-dimensional realization of the complex fuzzy inference, wherein the number of dimensions is equal to the number of the factor minus one. More specifically, the goodness of fit (also referred to simply as the fitness) is defined in the first dimension. According to the fuzzy theory, the fitness index is defined in a range of 0.0 to 1.0, wherein the fitness having the index value closer to 1.0 is evaluated as having higher goodness of fitness. For facilitating the understanding, it is assumed, by way of example, that $X_1$ represents the traffic amount, $X_2$ represents the car speed and Y represents the amount of pollution generated. By fixing the car speed $X_2$ at a certain value, for example, at 60 km/h, there can be obtained three evaluation curves L (low), M (mid) and H (high) for the fitness of the pollution prediction Y as a function of the traffic amount $X_1$. This is equivalent to the plotting of three curves on a three-dimensional space having the axes Y, $X_1$ and $X_2$. Next, the car speed is fixed at 20 km/h and the amount of pollution is evaluated as to the goodness of fit by varying the value of $X_1$. Then, there make appearance three curves. The acquisition of knowledge at that time may be realized, for example, by issuing to questions as follows:

"Traffic snarl is taking place. In what manner does the pollution generated by the traffic at that time change?"

being followed by the second question:

"What car speed is to be meant with the traffic snarl?"

By executing this procedure by changing stepwise the value of the car speed $X_1$, there can be obtained three kinds of curves in the three-dimensional space which correspond to "Low", "Mid" and "High", respectively. Similarly, by acquiring the knowledge about the evaluation for Y by changing $X_2$ with $X_1$ being fixed, there can be obtained a more smooth and natural curved surface.

In the case of illustrated example, the evaluation was made at three stages. However, the underlying concept may equally be applied to finer gradation of the evaluation.

Figure 26:
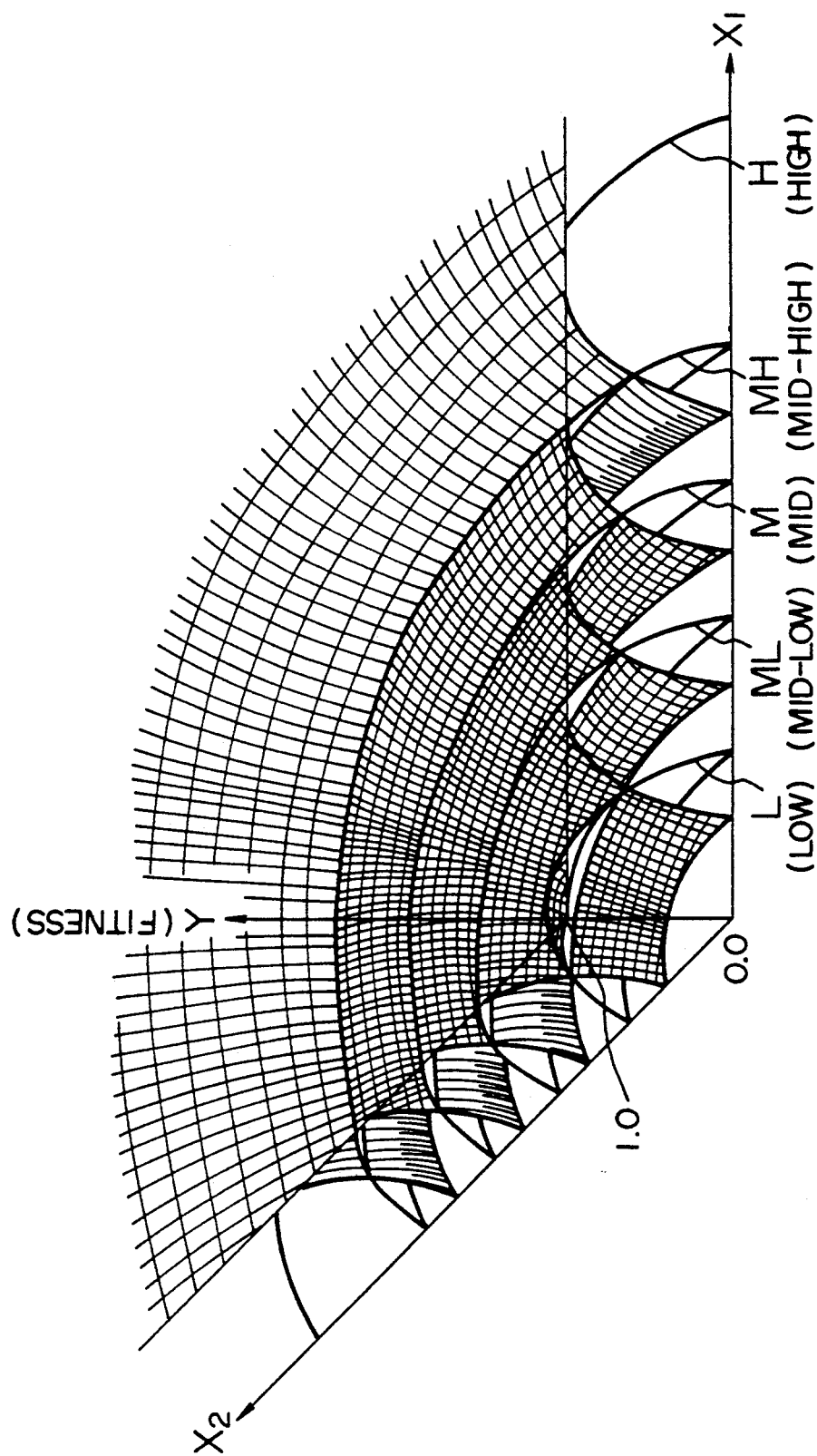

FIG. 26 shows the result of the graphic processing on the three-dimensional space, wherein the evaluation has been made at five stages L (Low), ML (Mid-Low), M (Mid), MH (Mid-High) and H (High).

Figure 27:
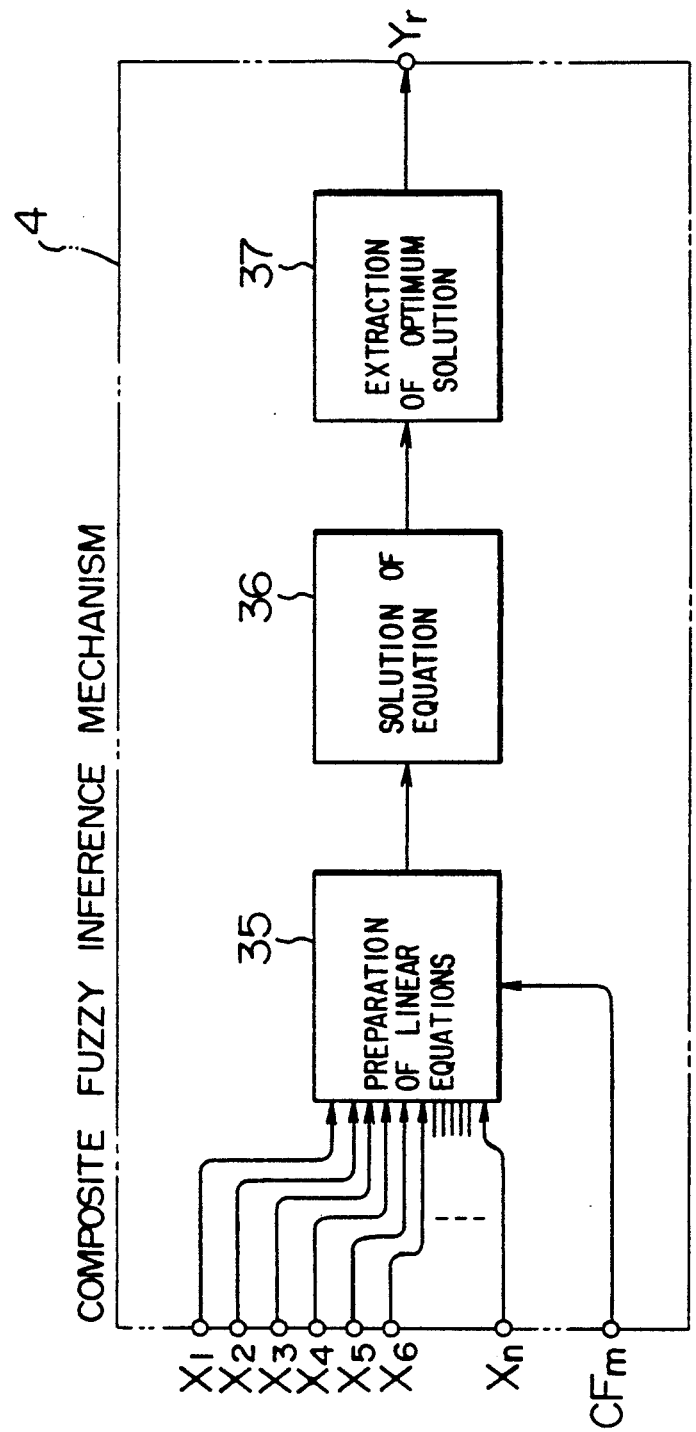

FIG. 27 shows a structure of a complex fuzzy inference mechanism 4 realized on the basis of the concept elucidated above. A reference numeral 4 denotes a device which is activated by the main inference mechanism 2 in response to issuance of a complex fuzzy inference request in the synthetic inference process supplied as inputs with the measured values (or interim hypothesis values) of the plural factors $X_1$, $X_2$, $X_3$, ..., $X_n$ and a complex fuzzy membership function $CF_m$ on the n-dimensional space, to thereby output the optimal approximate value for the fitness. This device or tool includes (1) a step of arithmetically determining discrete fitnesses for the items for evaluation ($Y_1$, ..., $Y_m$) from the above-mentioned factors ($X_1$, ..., $X_n$) and the membership function $CF_m$, (2) a step of generating a linear equation approximating the complex fuzzy fitness curved surface, (3) a solution step of solving the above-mentioned equation, (4) a step of extracting the approximate solution appropriate to the practical application, and (5) a step of centroid arithmetic step for determining arithmetically the quantitative value. The real output value $Y_r$ derived through the inference is determined by calculating the position of the centroid. In the following, operation of the tool 4 will be described in detail by taking as example three-dimensional processing, because four- or more-dimensional processing can not be illustrated on paper.

Figure 28:
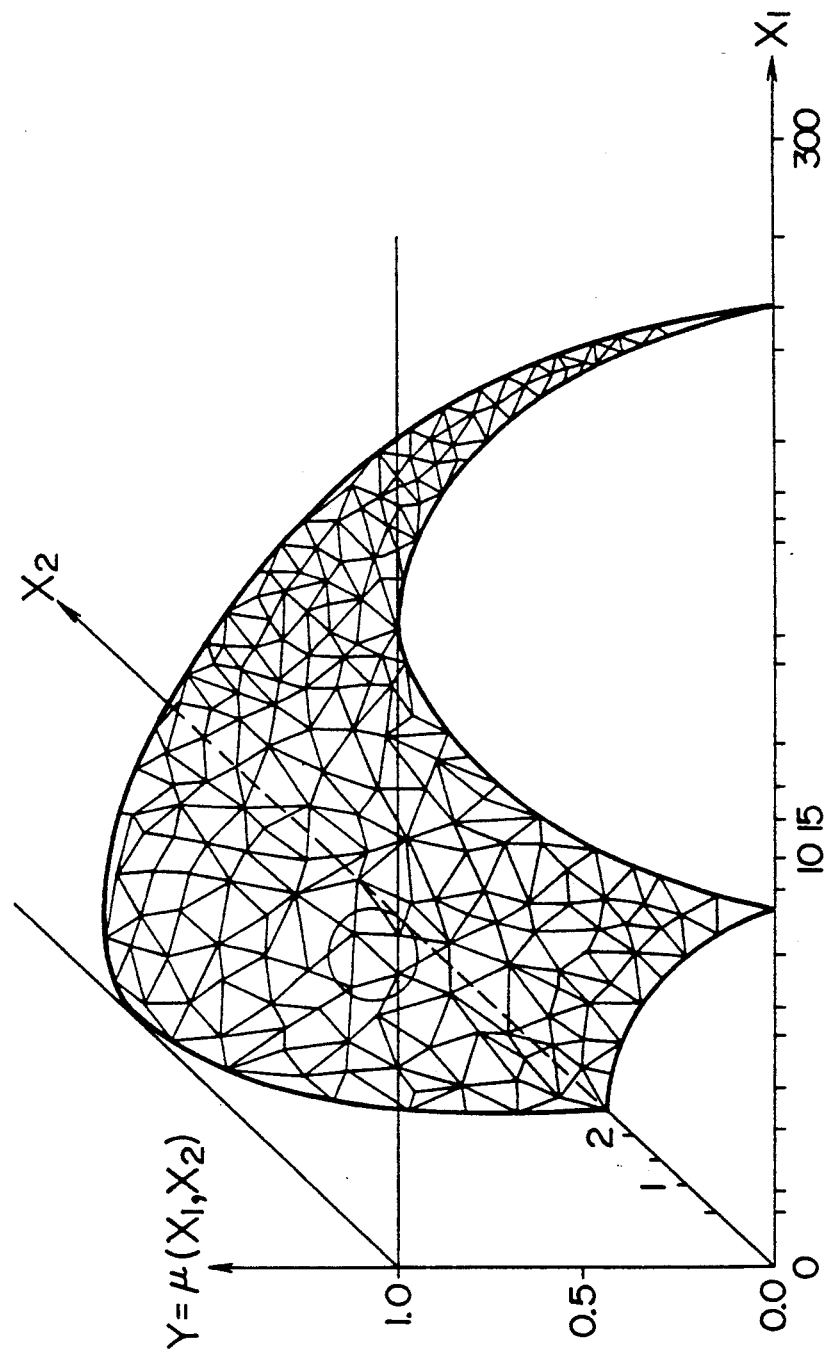

FIG. 28 is a view showing a M curved surface extracted from three complex fuzzy fitness curved surfaces shown in FIG. 26. In view of the nature of knowledge acquisition based on the empirical rules for fitness evaluation, the curved surface of concern can be approximated by surfaces generated by sets of discrete points. By taking advantage of this, the fitness-optimal approximate solution can be determined by the tool 4 from the given factor data through the procedure mentioned below.

Figure 29:
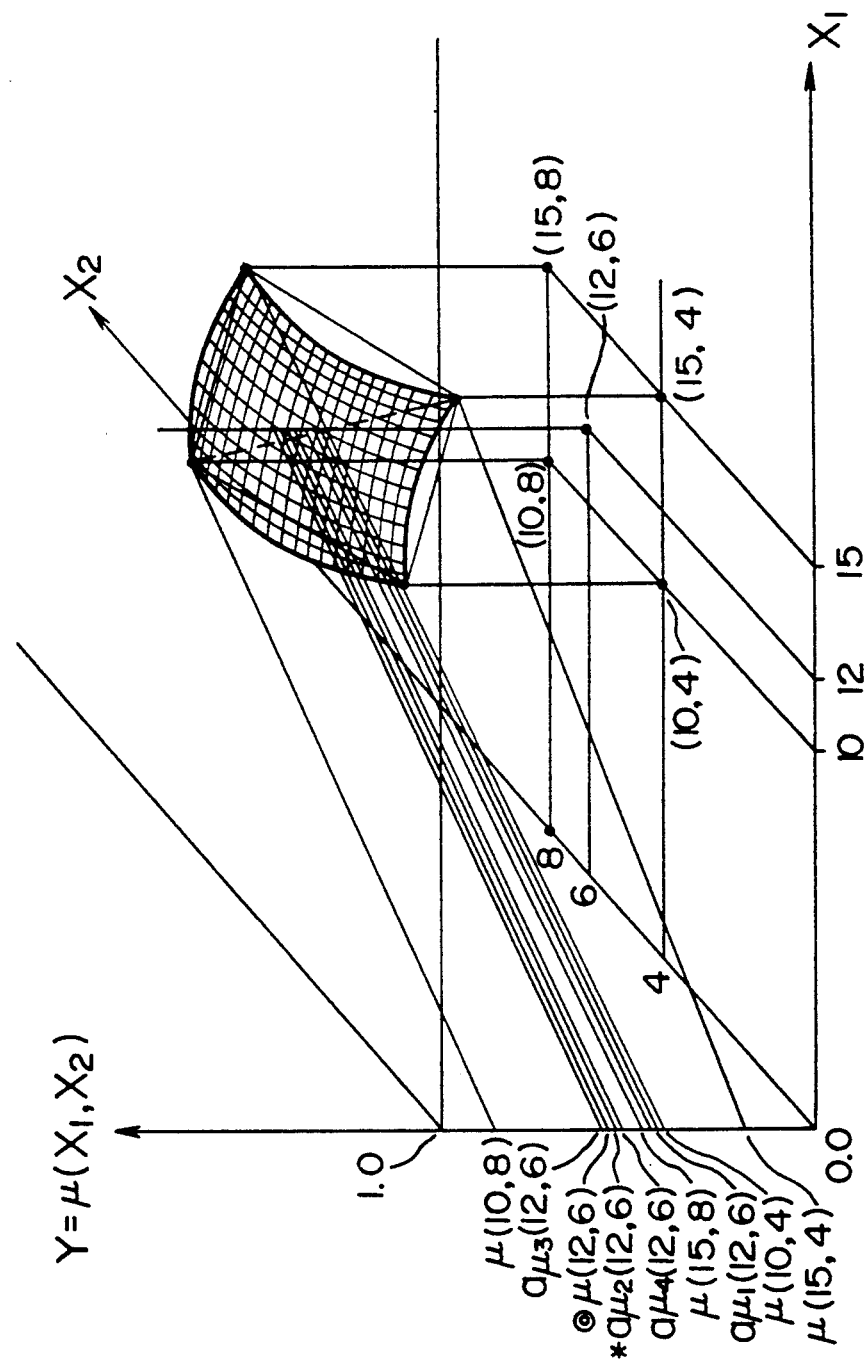

FIG. 29 is a view showing a part of FIG. 28 on an enlarged scale. It is assumed that the following values are given for the fitness of the curved surface M to determine $Y=\mu(12, 6)$.

$Y_1=\mu(10, 4)=\mu(X_1, X_2)$
$Y_2=\mu(10, 8)$
$Y_3=\mu(15, 4)$
$Y_4=\mu(15, 8)$

The function $\mu$ is a complex fuzzy membership function M for the evaluation of Y.

Referring to FIG. 29, assuming that the real curved surface defined by the function $\mu$ is represented by $P_r$, an intersection of a straight line parallel to Y as determined by $(X_1, X_2)=(12, 6)$ with the real curved surface $P_r$ represents the true fitness $\mu(12, 6)$. Further, since the straight line $(X_1, X_2)=(12, 6)$ is included in a space enclosed by $\{(X_1, X_2)^2\}=\{(10, 4), (10, 8), (15, 4), (15, 8)\}$, there is no alternative than the straight line intersects a tetrahedron at one or two points or overlaps one side of the tetrahedron which is defined as follows:

$$\{(Y, X_1, X_2)\} = \{(\mu(10, 4), 10, 4),$$
$$(\mu(10, 8), 10, 8),$$
$$(\mu(15, 4), 15, 4),$$
$$(\mu(15, 8), 15, 8)\}$$

In case the straight line intersects the tetrahedron, $\mu(X_1, X_2)$ is the true fitness value since the intersection represents the point for which the fitness value is already given. In the case where the straight line overlaps one side of the tetrahedron, this means that the fitness Y can not be determined and hence application of the membership function is erroneous. Accordingly, the second mentioned case is excluded from the consideration. The problem arises when the straight line intersects the tetrahedron at two points. In this case, it is required to determine which of the two points represents the most approximate solution. In this conjunction, it is noted that the linear approximation can not be performed for a curved surface having no constraints (regularity). In the case of the fitness curved surface under consieration, all the straight lines contacting the curved surface must exist outside of the curved surface. In other words, the surface must be curved inwardly. Under this constraint, the general nature of the curved surface is maintained. Due to this constraint, there exist four approximate solutions $a\mu_1(12, 6)$, $a\mu_2(12, 6)$, $a\mu_3(12, 6)$ and $a\mu_4(12, 6)$ in the vicinity of the true value $\bigcirc\mu(12, 6)$, of which the two points $a\mu_2$ and $a\mu_4$ represent intersections with the tetrahedron. Under the constraint mentioned above, the solution $a\mu_2$ can be ultimately determined as the approximate solution. This can be expressed quantitatively as follows:

Conditions

As discrete values on the complex fuzzy fitness evaluation curved surface, the undermentioned values are given:

$Y_1=\mu(X_{11}, X_{21})$
$Y_2=\mu(X_{11}, X_{22})$
$Y_3=\mu(X_{12}, X_{21})$
$Y_4=\mu(X_{12}, X_{22})$

Under the conditions, a complex fuzzy fit value defined by $X_1$ and $X_2$ as mentioned below is determined.

Solution

The curved surface is approximated by linear expression:

$$Y=aX_1+bX_2+C$$

(i) Each face of the tetrahedron is determined:

$$Y_1=aX_{11}+bX_{21}+C \qquad (35)$$

$$Y_2=aX_{11}+bX_{22}+C \qquad (36)$$

$$Y_3=aX_{12}+bX_{21}+C \qquad (37)$$

$$Y_4=AX_{12}+bX_{22}+C \qquad (38)$$

Of the four expressions, the three are selected to prepare simultaneous linear equations, which are then solved to determine four combinations of the coefficients a, b and c:

$(Y_1, Y_2, Y_3) \rightarrow (a_1, b_1, c_1)$ $(Y_1, Y_2, Y_4) \rightarrow (a_2, b_2, c_2)$ $(Y_1, Y_3, Y_4) \rightarrow (a_3, b_3, c_3)$ $(Y_2, Y_3, Y_4) \rightarrow (a_4, b_4, c_4)$ In this way, the four surfaces are defined:

$$Y=a_1X_1+b_1X_2+C_1 \qquad (39)$$

$$Y=a_2X_1+b_2X_2+C_2 \qquad (40)$$

$$Y=a_3X_1+b_3X_2+C_3 \qquad (41)$$

$$Y=a_4X_1+b_4X_2+C_4 \qquad (42)$$

(ii) Within this three-dimensional space, the points defined by $a\mu_1(x_1, x_2)$ $a\mu_2(x_1, x_2)$ are determined at which the straight line $(X_1, X_2)=(x_1, x_2)$ intersect the surfaces (39), (40), (41) and (42). Two points which do not intersect the surface are eliminated as imaginary solutions.

(iii) The intersection with the upper face for the fitness Y is assumed as the closest approximate solution a $\mu(x_1, x_2)$.

The above is the procedure for inferring compositely one fitness. Generalization of this procedure results in the tool or mechanism 4 shown in FIG. 27.

Input (i) Actually measured value of factors:

$(X_1, X_2, X_3, \ldots X_n)=(x_1, x_2, x_3, \ldots x_n)$ (ii) Complex fuzzy membership function $CF_m$.

Arithmetic Processing (i) For the dimensions $X_i$ (where $i=1, 2, \ldots, n$) corresponding to all the factors, the coordinate points giving close discrete values are determined through retrieval of $CF_m$.

$$Y_1 = \mu (X_{11}, X_{21}, X_{31}, \ldots, X_{n1})$$
$$Y_2 = \mu (X_{11}, X_{21}, X_{31}, \ldots, X_{n2})$$
$$\vdots$$
$$Y_{2n} = \mu (X_{12}, X_{22}, X_{32}, \ldots, X_{n2})$$

(ii) Simultaneous linear approximation equation solving logic (36)

Approximation is made with $$Y = a_1 X_1 + a_2 X_2 + a_3 X_3 + \ldots + a_n X_n + a_{n+1}$$

whereon simultaneous equations having the unknown $$a_{1j}, a_{2j}, a_{3j}, \ldots, a_{nj}, a_{n+1j}$$

are prepared in a number of $_{2n}C_{n+1}$ and solved individually to thereby prepare the following approximate expressions in a number of $_{2n}C_{n+1}$ $$Y = a_{11}X_1 + a_{21}X_2 + a_{31}X_3 + \ldots + a_{n1}X_n + a_{n+11}$$
$$Y = a_{12}X_1 + a_{22}X_2 + a_{32}X_2 + \ldots + a_{n2}X_n + a_{n+12}$$
$$\vdots$$
$$Y = a_{1m}X_1 + a_{2m}X_2 + a_{3m}X_3 + \ldots + a_{nm}X_n + a_{n+1m}$$

where $m = _{2n}C_{n+1}$ (iii) Optimal approximate solution extracting logic (37)

The linear approximate expression in the number of $_{2n}C_{n+1}$ are placed with $(x_1, x_2, \ldots, x_n)$ to thereby output the maximum value in the region of concern as the closest approximate solution.

As is understood from the above, with the aid of the complex or composite fuzzy inference mechanism 4 including the logics 35, 36 and 37, the evaluation value for one item to be evaluated can be directly inferred or estimated from n factors.

Figure 30:
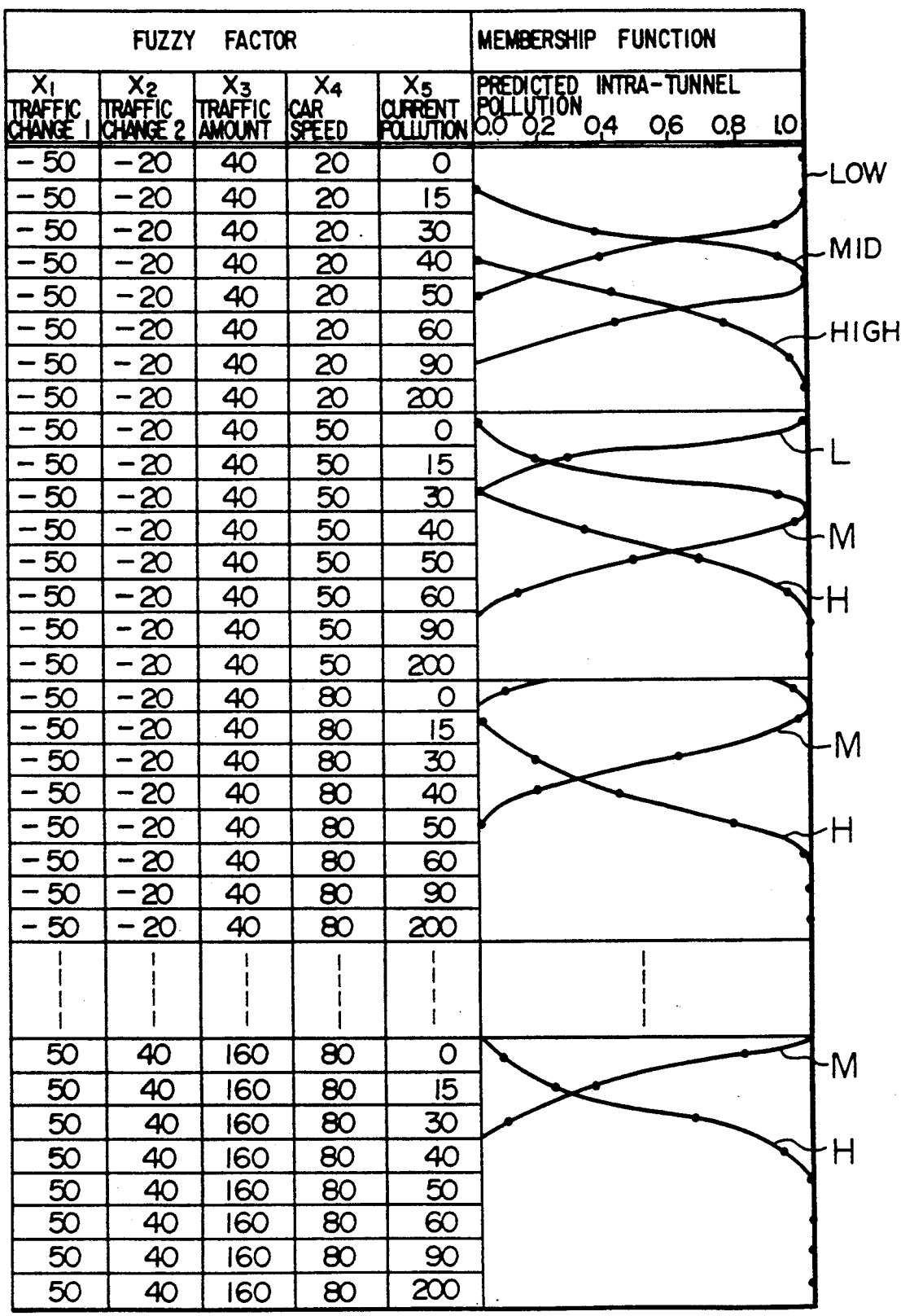
Figure 31:
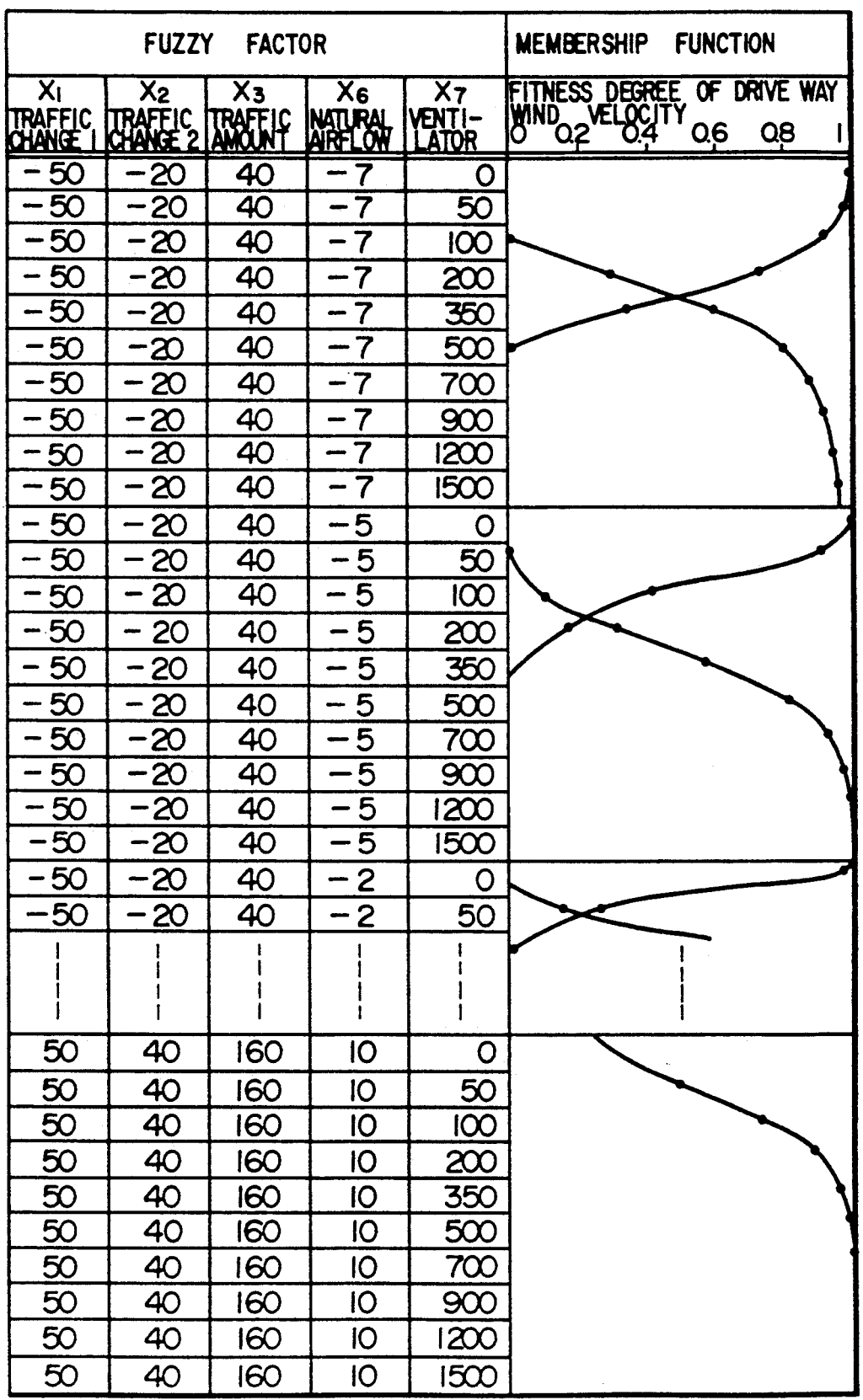

FIGS. 30 and 31 show concrete examples of the complex (composite) fuzzy inference membership function $CF_m$ which are referenced by the complex (composite) fuzzy inference mechanism 4.

In FIG. 30, there are plotted discrete values for a fitness curve under the condition that the factors $X_1$, $X_2$, $X_3$ and $X_4$ are fixed with the factor $X_5$ being changed stepwise on the basis of the factor network shown in FIG. 24 for the purpose of inferring to intra-tunnel polution level $Y_1$ from the five factors $X_1$, $X_2$, $X_3$ and $X_4$ and $X_5$, wherein $X_1$ represents the first traffic flow change rate 1, $X_2$ represents the second traffic flow change rate 2, $X_3$ represents the current traffic amount $X_3$, $X_4$ represents car speed and $X_5$ represents the current pollution level. In this FIG. 30, the discrete values are interconnected by curves for facilitating the understandability. When the fitness discrete value have been defined for all the knowledge acquired for $X_5$, then $X_4$ is changed by one step to thereby plot the evaluation for $X_5$. As a practical matter, it is not always possible to collect finely the expert's empirical rules in this manner. However, it is possible to determine the practical complex fuzzy membership function by handling, for example, $X_1$ in terms of the concept of the external disturbance as in the case of the hitherto known system and limiting the change of $X_1$ to three to five steps.

By performing the fuzzy inference having the fitness data as the input thereto for the intra-tunnel predicted pollution $Y_1$ and predicted ventilation $Y_2$ derived by the complex fuzzy inference mechanism 4, the fitness of the predicted pollution value Z is obtained. Subsequently, the determined value is transformed by a centroid method to obtain a quantitative value. When the qualitative prediction inference for the process exhibits many-faceted behaviors has been completed in this way, the rule group r3 outputs the predicted pollution as the interim hypothesis.

(r4): Synthetic Decision Rule Group for Predicted Values

This synthetic decision rule group r4 serves to make decision for the interim hypothesis (r1 and r3 or r1, r2 and r3) in consideration of various situations of the process to thereby select the most proper interim hypothesis.

Figure 32:
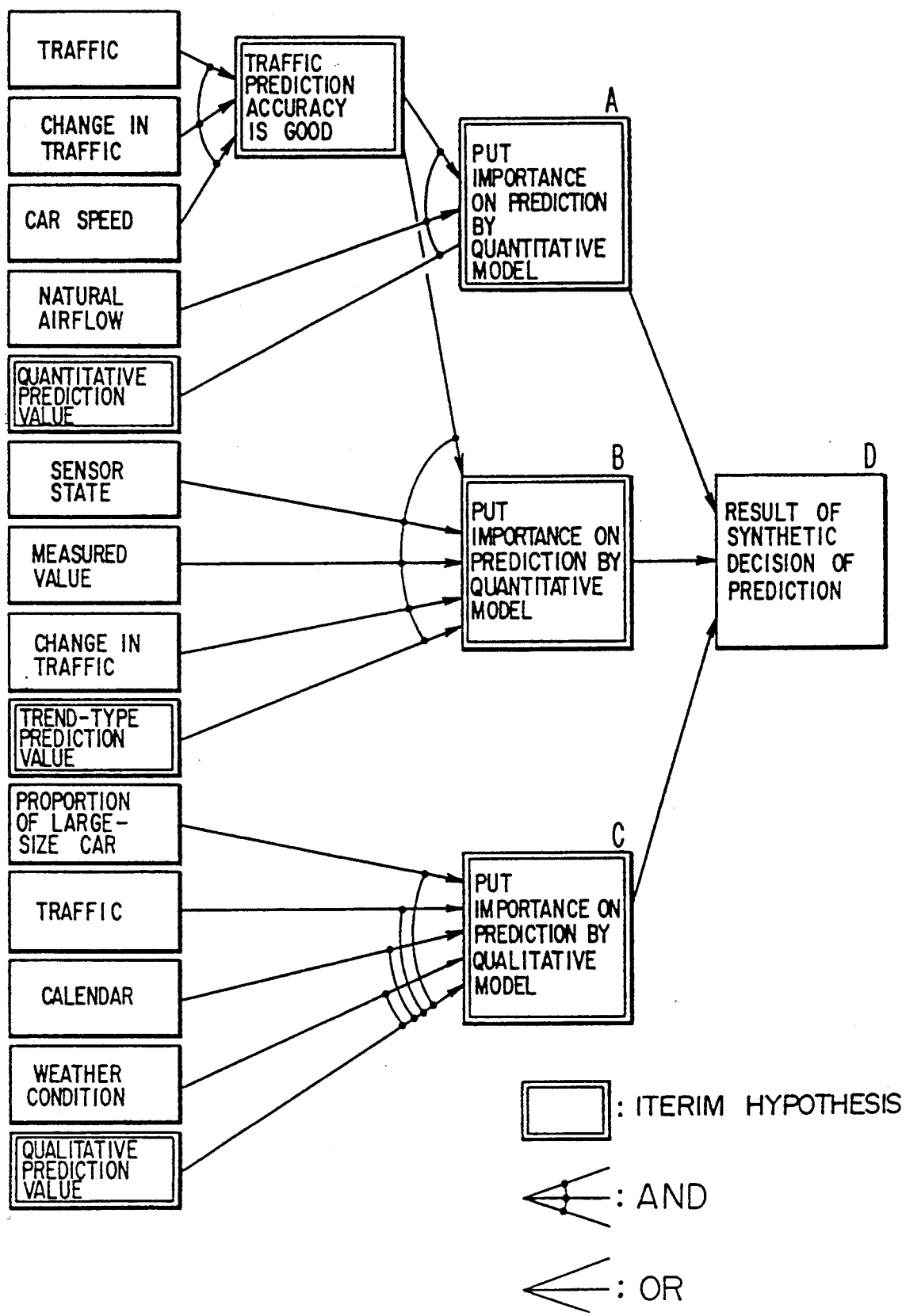
Figure 35:
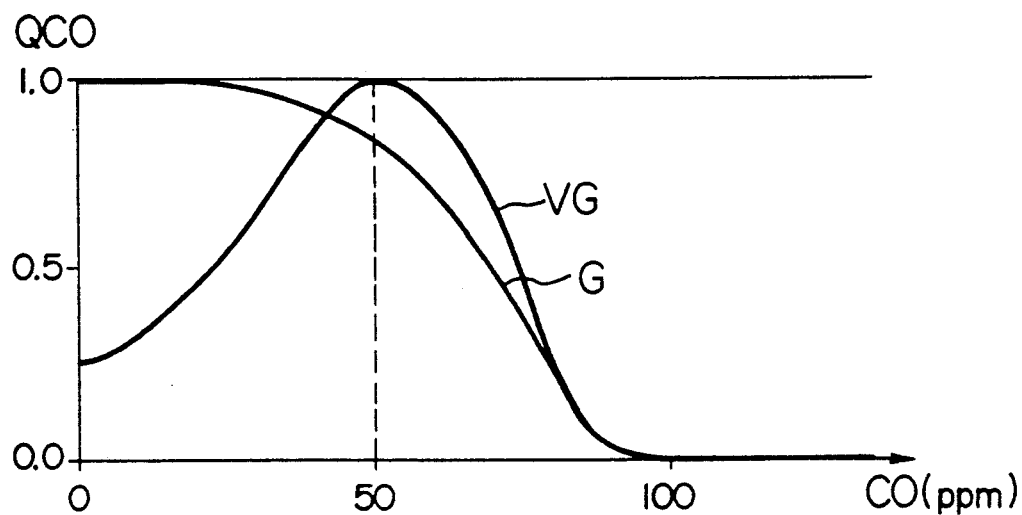

FIG. 32 is an AND/OR tree diagram for illustrating the inference performed by the synthetic decision rule group r4. The factors for the synthetic decision may generally be classified into two types, i.e. ones obtained through the behavior evaluation for each of various factors of each model and the others incapable of being grasped on the basis of the individual factors only and exerting influence to the whole process behavior. In conjunction with the former, it should be recalled that the accuracy of the traffic prediction made by the qualitative pollution predicting rule group assumes a great importance. In other words, the problems are eventually whether the change or transition in the traffic amount is linear or not. On the other hand, the latter includes, for example, influence of weather conditions to the tunnel ventilation process. In the light of the above, the following are considered as the interim hypothesis for the decision which is of concern at present.

(1) The accuracy of the traffic prediction is good.
(2) Put importance on the predicted value by the quantitative model.
(3) Put importance on the predicted value by the trend-type mode.
(4) Put importance on the predicted value by the qualitative model.

In the case of the process control system, difficulty is encountered in adopting the conclusion-type rules as employed in the conventional knowledge-based systems, since the objective model of the process control systems changes continuously. Accordingly, a fuzzy forward inference is adopted, which will be described below. It should first be mentioned that the "fuzzy forward inference" differs from the "fuzzy inference" in that the decision rule group of the knowledge base system for the process control itself has certainty (conviction or confidence), wherein the final decision is made through accumulative evaluation about the certainty. This method well simulate the decision procedure of the operator of high skill.

Figure 13:
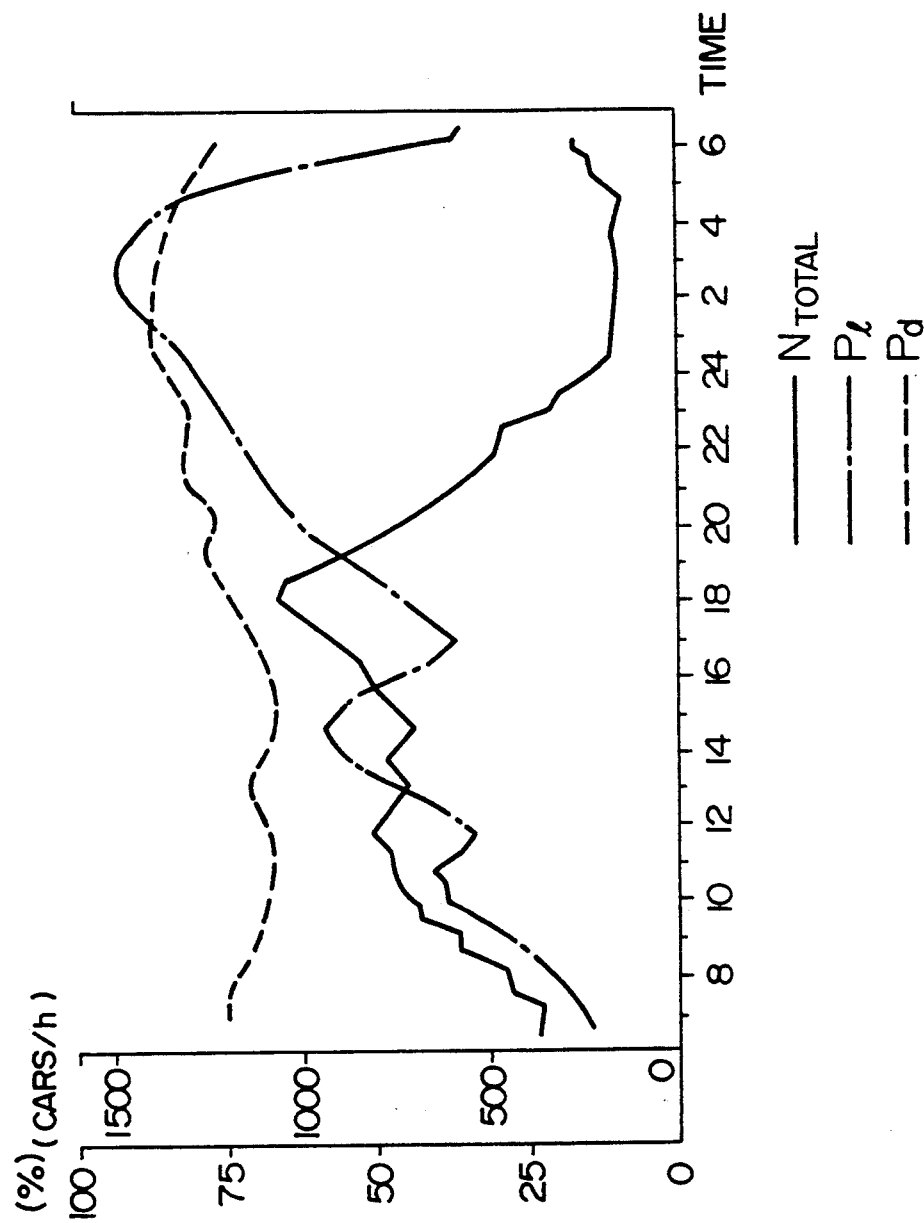
FIGS. 13 and 14 are views showing inter-factor correlations in the pollution and the ventilation.
Figure 14:
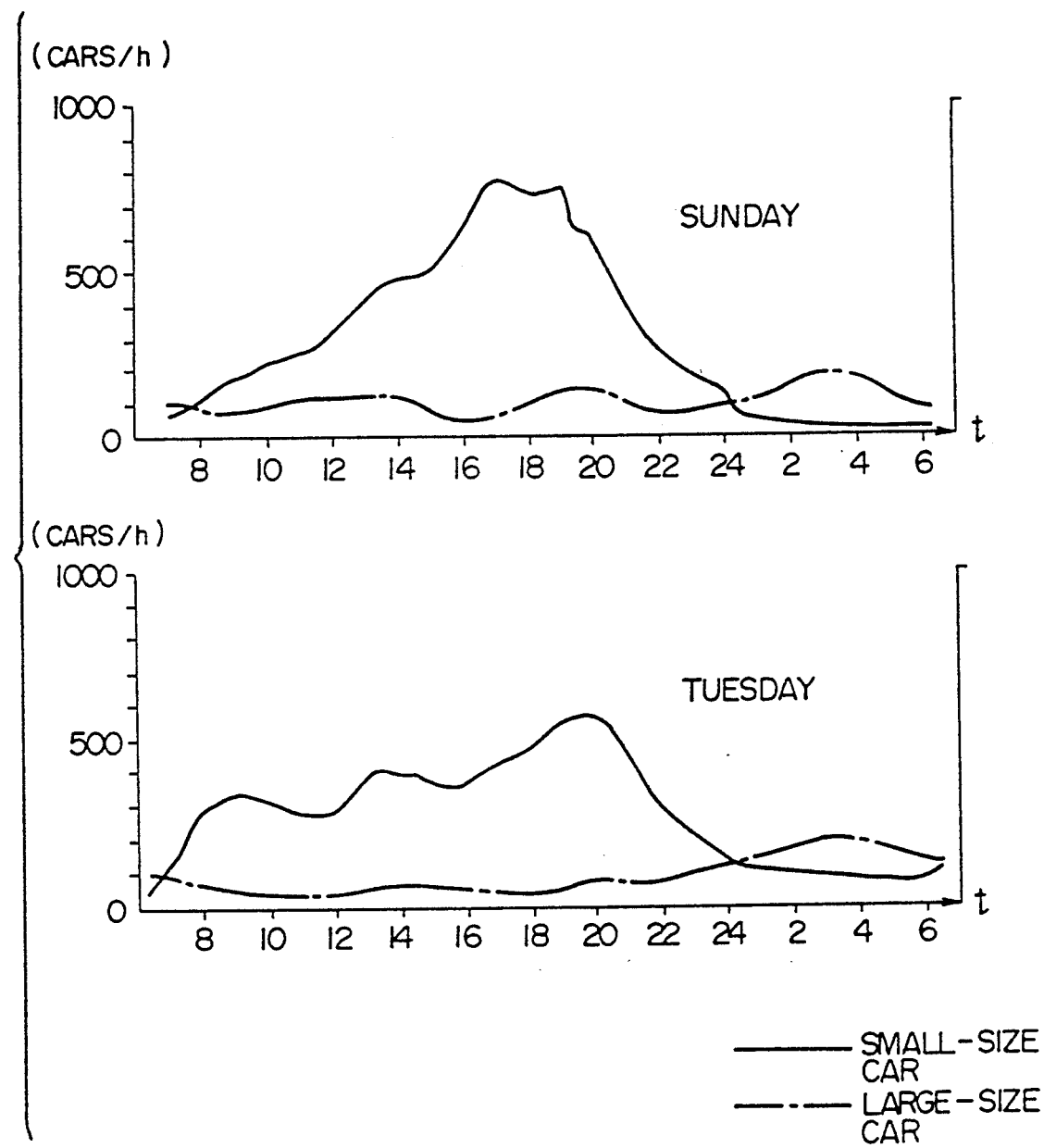

FIG. 33 shows, by way of example, the individual production rules in the synthetic prediction decision rule r4. The rule No. 1 as shown is derived from the result of actual measurements made under the various situations such as illustrated in FIGS. 13 and 14. As will be seen in FIG. 33, the conditional part of the rule No. 1 indicates that the traffic flow changes approximately linearly, while the conclusion part indicates that the accuracy of the traffic prediction at that time is good, as represented by the confidence or certainty (confidence) can be represented by consecutive values of $-1.0$ to $+1.0$, wherein the rule having the certainty level closer to $+1.0$ is considered to have correspondingly higher certainty. Reversely, the certainty level close to $-1.0$ indicates that the rule is less certain.

In contrast to the rule No. 1 for evaluating the linearity, the rule No. 2 evaluates the non-linearity on the basis of the knowledge of the operator obtained empirically. The conditional part of the rule No. 2 indicates that traffic snarl is taking place within the tunnel, while the conclusion part indicates that the accuracy of the traffic prediction is good with the certainty level of about $-0.5$, which in turn means that the accuracy is not good.

In the case of the illustrated example shown in the AND/OR tree chart of FIG. 3, 122 empirical rules are employed each being assigned with the certainty (confidence) level. The interim hypothesis which are temporal knowledge as generated in the course of inference make appearance on a memory for temporal storage referred to as view note, whereby the certainty levels C1 and C2 which the interim hypotheses may take are updated with the aid of a contradiction function $F_{cont}$ and a combine function $F_{comb}$ in the manner elucidated below. The contradiction function $F_{cont}$ serves to evaluate the meaning or implication in the calculation of the certainty level and make decision as to whether contradiction is present or not among a plurality of conclusions.

Updated or new certainty level C3 is given by $$C3 = \begin{cases} F_{comb}(C1, C2) & \ldots \text{(when } F_{cont}(C1, C2) \leq 0.8) \\ \text{contradiction (error)} & \ldots \text{(when } F_{cont}\ C1, C2) > 0.8) \end{cases}$$

where $$F_{cont}(C1, C2) = \begin{cases} 0.0 & \ldots \text{(when } C1 \times C2 \geq 0.0) \\ |C1| + & \ldots \text{(when } |C1| + |C2| - \\ |C2| - & 1.0 > 0.8 \\ 1.0 & \text{and } C1 \times C2 < 0.0) \\ 0.0 & \ldots \text{(when } |C1| + |C2| - \\ & 1.0 > 0.0 \text{ and} \\ & C1 \times C2 < 0.0) \end{cases}$$

and $$F_{comb}(C1, C2) =$$

-continued $$\begin{cases} C1 + C2 - & \ldots \text{(when } C1 \geq 0, \\ C1 \times C2 & C2 \geq 0) \\ C1 + C2 + & \ldots \text{(when } C1 \leq 0, \\ C1 \times C2 & C2 \leq 0) \\ (C1 + C2)/(1 - & \ldots \text{(when } C1 \times C2 < 0.0 \text{ and} \\ \min(|C1|, |C2|)) & C1 \times C2 \neq 1.0) \\ 0.0 & \ldots \text{(when } C1 \times C2 = -1.0) \end{cases}$$

Assuming now that the conditional part of the rule No. 3 is satisfied with presence of "Put importance on predicted value by quantitative model: 0.7"

on the view note and that the same conclusion is obtained from other rule with the certainty level of 0.6, then an updated certainty level of $$C3 = 0.7 + 0.6 - 0.7 * 0.6$$
$$= 0.88$$

is obtained because $0.7 = \geq 0.0$ and $0.6 \geq 0.0$. As the result, the view note is rewritten as follows:

"Put importance on predicted value by qualitative model: 0.88"

This means that the certainty level is raised.

On the other hand, assuming that the conditional part of the rule No. 2 is satisfied under the condition that the conditional part of the rule No. 1 is satisfied with presence of "Accuracy of traffic prediction is good: 0.8" on the view note, the certainty levels of $-0.5$ and 0.8 are updated by calculation as follows:

From $0.8 * (-0.5) \leq 0$ and $0.8 * (-0.5) \neq 1.0$,
$$C3 = (0.8 - 0.5)/(1 - \min(|0.8|, |-0.5|))$$
$$= 0.3/1.5$$
$$= 0.2$$

Thus, the view note reads as follows:

"Accuracy of traffic prediction is good: 0.2"

This means that the certainty or confidence level is lowered.

Upon completion of the condition matching of the empirical knowledge group including the rules No. 1 to No. 122, there makes appearance on the view note at least an interim hypothesis in the form of "Put importance on predicted value by ? model: n"

where the mark "?" represents a model of either quantitative, trend or qualitative type, and n represents the certainty level.

The rule No. 123 evaluates the certainty levels of these interim hypothesis and then selects the model of the highest certainty level when two or more models having desired certainty levels are present to output a new hypothesis:

"Adopt the predicted value by ? model: 1.0"

In this manner, the rule group r4 decides synthetically the process behaviors and the reliability of the individual model to determine the predicted pollution level having the highest accuracy.

The quantitative type control quantity determining rule group r5 and the situation-adaptive type control quantity determining rule group r6 serve for arithmetically determine the amount of ventilation with reference to the aimed at value for the control corresponding to the difference $\Delta X(k+1)$ between the predicted pollution level and the desired or target value as determined by the rule group r4, to thereby determine the optimum control command.

(r5): Quantitative Control Quantity Determining Rule Group

The quantitative control quantity determining rule group (r5) determines arithmetically the amount of ventilation as required in accordance with the difference between the predicted pollution level and the control target value (desired value) for thereby determining the combination of ventilator operations in accordance with a linear programming method such that the electric power consumption is minimized.

Assuming, by way of example, that the target (desired) value of the VI control is 50% while the result of the VI predicting decision shows 45% after lapse of a predetermined time, the difference therebetween is $-5\%$, which means that the desired value cannot be attained. It is thus necessary to increase the ventilation output. Accordingly, the rule group r5 calculates the required airflow in consideration of the configuration of the tunnel and characteristics of the ventilation equipment. In case the ventilation, for example, of 100 m$^3$/s is required, such a combination of the ventilators is determined in accordance with a linear programming method.

which can assure the ventilation of 100 m$^3$/s with the minimum power consumption in accordance with the linear programming method. In this manner, the minimum power consumption for a given control sectional area of the tunnel can be assured. For the reason described above, the operation program by the rule group r5 can always be adopted when the ventilation equipment is to be started from the rest state.

A disadvantage of the present system can be seen in the fact that frequency of start/stop of the ventilators is increased because of the set-point control nature, whereby efficient operation cannot be assured over a long period.

(r6): Situation-Adaptive Control Quantity Determining Rule Group

The situation-adaptive control quantity determining rule group r6 is based on the prediction fuzzy control procedure. The main function of this rule group r6 is to determine the most satisfactory operation combination for the given combination of the control effectors by evaluating and examining the pollution level, power consumption, necessity or non-necessity for changeover of the ventilator after lapse of a predetermined time on the basis of the process situations prevailing at the times of control. By virtue of the function of this rule group r6, high processing capability can be realized. In conjunction with operation of a plurality of the ventilators, the number of combination programs is countless, particularly when the quantity to be controlled is a continuous quantity such as the output flow of the dust collectors. By way of example, assuming that the maximum output flow of a given dust collector is 300 m$^3$/s, the dust collector operation may be effectuated at sixty steps ($+0, +5, +10, \ldots, +300$) at maximum. In that case, a number of combinations of the dust collector operations amounts to $60^3 = 216{,}000$.

If the fuzzy inference operation were to be made for these combinations, untolerably enormous processing time is required, making it impossible to realize the control system on which the high-speed requirement is imposed.

Under the circumstances, it is taught according to the invention to make use of the resonance property in the characteristics of the membership functions for the fuzzy evaluation to thereby minimize the time required for determining the optimal combination. Accordingly, the concept of the present invention can find application for a wide variety of control systems which require high-speed processing.

The primary object of the ventilation control is to minimize the power consumption of the ventilation system while maintaining the environment standards concerning the pollution. The effectors for the ventilation control include the ventilating machines such as jet fans, dust collectors and others. The ultimate object of the rule group r6 is to determine how to operate these jet fans, the dust collectors and the like at optimum and hence the performance of the control system.

It must be mentioned that the purpose of the present control system can not be limited to the safety (i.e. maintenance of the pollution level lower than the environment standard value) and the economy. Further, it is noted that different evaluation indexes exist for one control target, as exemplified by that the lower concentration of CO closer to 0 ppm is better or alternatively the concentration closer to the target value is better. In general, seven target evaluation indexes mentioned below can be enumerated in conjunction with the intra-tunnel ventilation control as follows:

(1) Quality of CO Ventilation Control

Hereinafter, an abridgement QCO. VG (quality of CO, very good) is adopted for representing the evaluation index for the target (desired) value.

(2) Quality of Absolute Concentration of CO

Hereinafter, an abridgement QCO. G (quality of CO, good) is used for representing the evaluation index of the absolute concentration of CO.

(3) Quality of VI Ventilation Control

Hereinafter, abridgement QVI. VG (quantity of VI, very good) is adopted for representing the evaluation index for the target value.

(4) Quality of VI Absolute Value

Hereinafter, abridgement QVI. G (quality of VI, good) is used for representing the evaluation index for the absolute smog transmissivity.

(5) Steady Electric Power Consumption

Hereinafter, abridgement P is adopted for indicating that the evaluation index for the energy consumption is in the steady state.

(6) Excessive Electric Power Consumption

Hereinafter, abridgement QC (quality of control) is adopted as the evaluation index for the number of times the machines are turned on/off and the transient energy consumption involved therein. This information provides evaluation of abrasion of the machines.

(7) Balance of Ventilation (Uniformity)

Hereinafter, abridgement BP (balance of pressure) is employed for indicating the index for intra-tunnel pressure balance. The effect of the ventilation power to the intra-tunnel pollution is closely related to a time lag involved in this process. It is observed that the uniform pressure balance can reduce the time, as the result of which quality of the control can be improved. Thus, the BP is an important element for the control.

FIG. 34 shows a configuration of a prediction fuzzy inference mechanism implemented according to the teaching of the present invention. This mechanism 5 is supplied as the input thereto with n value data ($X_1$, $X_2$, ..., $X_n$) as the control quantities (deviations from the quantities which are currently effective for the operation) at a given time point, the regions of values the data may assume and discrimination of discrete/continuous quantities, the predicted item values obtained through the aforementioned fuzzy inference or quantitative arithmetic and the fuzzy-evaluated member function for a plurality of control objectives to thereby output a combination of control quantities ($\Delta X_1$, $\Delta X_2$, ..., $\Delta X_n$) optimal for the control equipment of concern.

Evaluation of the control objectives for the case of the tunnel ventilation control is defined in the manner mentioned below.

(1) The aforementioned QCO. VG is a membership function curve for the evaluation of ventilation quality as viewed from the standpoint of the control and the QCO. G is a membership function curve for the absolute evaluation close to the evaluation made by human being. Assuming that the target or goal value for the control is 50 ppm and that the concentration limit is 100 ppm, the QCO. VG curve has the fitness (i.e. goodness of fit) of 1.0 at 50 ppm with evaluation becoming lower on both sides thereof and the fitness is of 0.0 at 100 ppm and remains at 0.0 for higher concentrations. The QCO. G curve is same as the QCO. VG curve in respect to the evaluation for 100 ppm and higher concentration with the fitness being 0.0. As the concentration approaches to 0 ppm from 100 ppm, the fitness (i.e. goodness of fit) is improved and assumes the value of 1.0 at 0 ppm. It should be noted that the QCO. VG curve is not derived from the QCO. G curve and that they are considered to be two membership functions in view of the constraints imposed on the control and permissibility of variation due to peculiarities of individual processes to be controlled.

Figure 36:
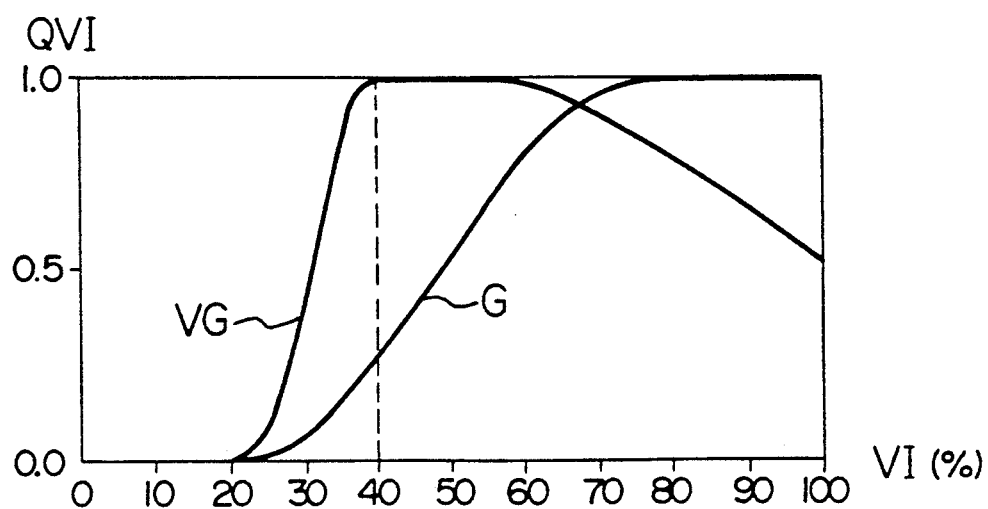

FIG. 36 illustrates two evaluation functions for the VI, wherein a curve QVI. VG represents the quality of the ventilation control as viewed from the standpoint of the control, while a curve QVI. G represents the absolute evaluation, as in the case of the CO control mentioned above.

Figure 37:
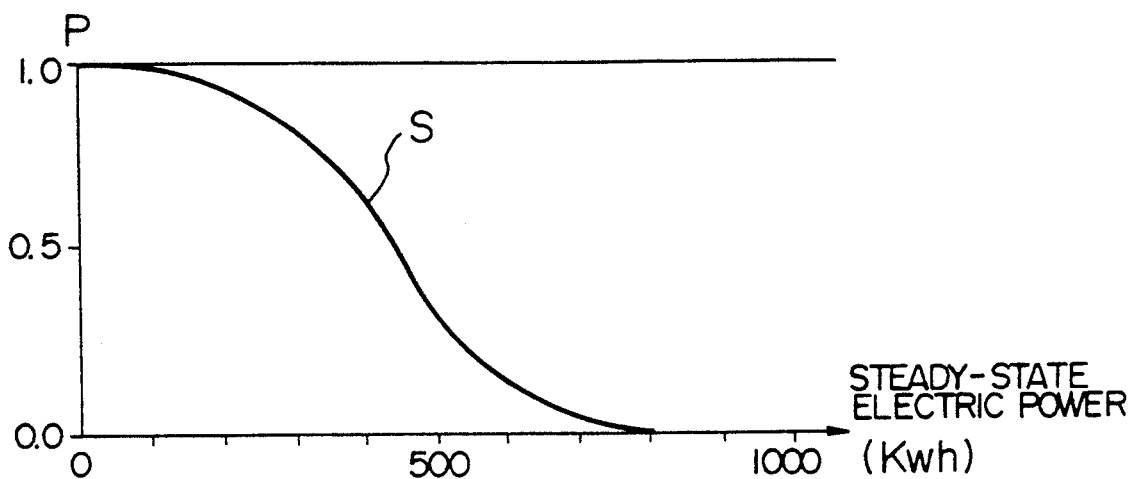

FIG. 37 shows a membership function for littleness S of the steady-state electric power P for the situations mentioned above.

Figure 38:
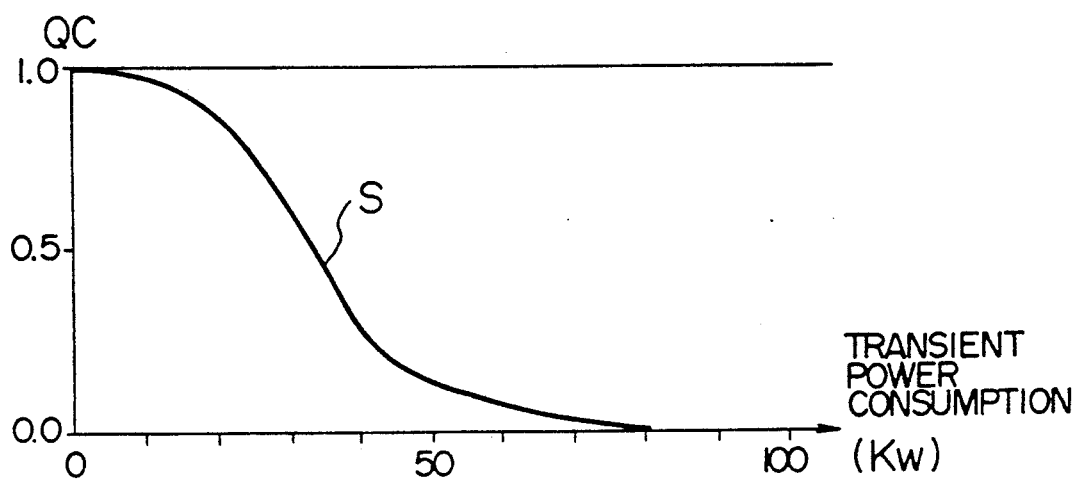

FIG. 38 shows a membership function for littleness S of the transient power consumption due to turning on/off of the control machines.

Figure 39:
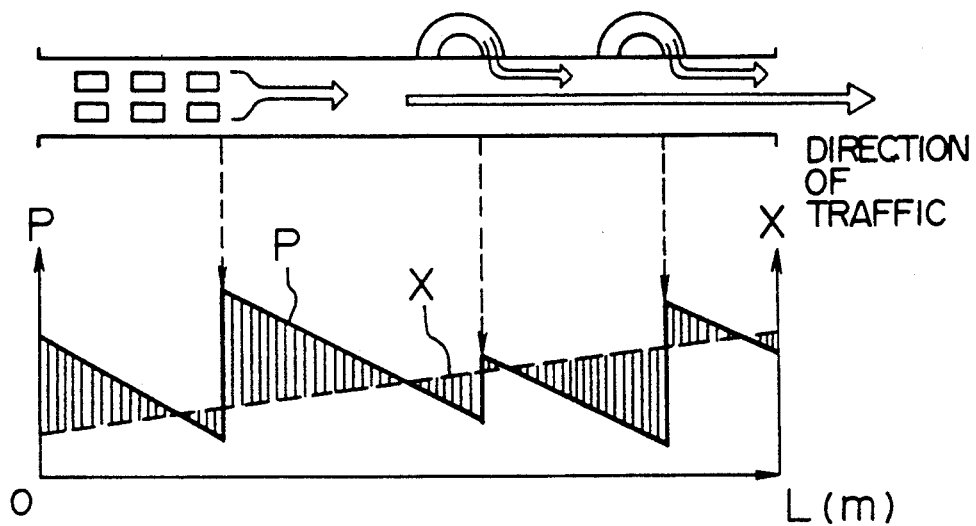

FIG. 39 shows a distribution of pollution (X) and a distribution of pressure (P) due to ventilation and others within the tunnel. In order to realize the uniform balance of pressure, it is required that the pressure distribution is uniform for the distribution of pollution along the longitudinal direction of the tunnel. Accordingly, deviation of P for X and variance $\delta$ thereof along the longitudinal direction of the tunnel are taken into consideration, wherein the control for making these values to be zero is adopted as one of the objectives for the control.

Figure 40:
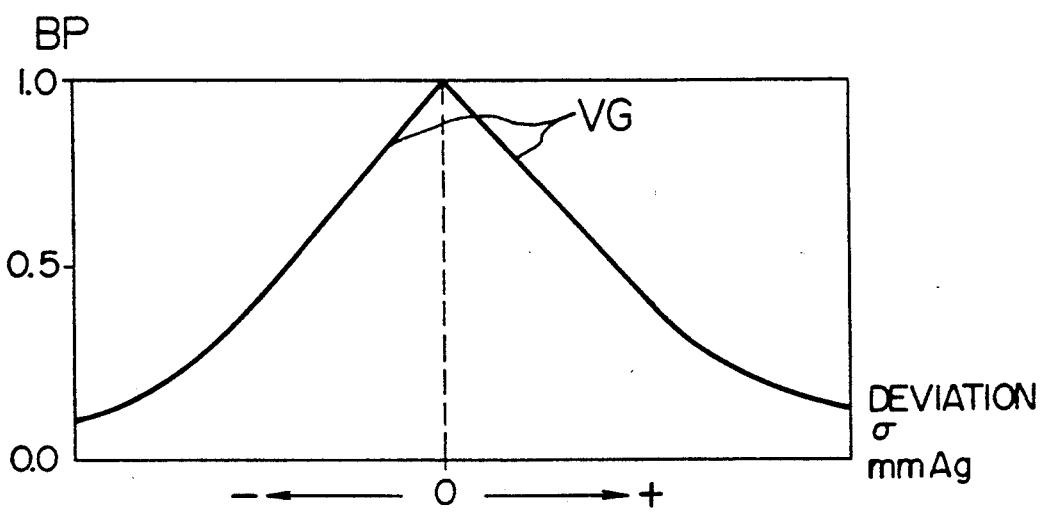

FIG. 40 shows such membership function BP, VG adopted as the evaluation function in which the fitness assumes a value of 1.0 when the above-mentioned variance $\delta$ is zero, with the fitness progressively approaching to 0.0 on both sides of the value 1.0.

The prediction fuzzy inference mechanism 5 includes a preprocessor 38 having the inputs supplied with the data ($X_1$, $X_2$, ..., $X_m$) and the range ($X_1$, $X_2$, ..., $X_n$) to subdivide each of the control quantities in consideration of the current operation state of the control machines and the prospective range information for thereby generating a set $S_f^p$ of combinations of controllable digital operation quantities equivalent to a set $AS_f^p$ of combinations of controllable analogue operation quantities (an infinite set of elements representing combinations which $\Delta X_1$, $\Delta X_2$, ..., $\Delta X_n$ may assume within finite ranges), a recursive range division logic 39 having the input supplied with the set $S_f^p$ or a reduced set $S_f^s$ generated by a satisfaction evaluation logic 41 mentioned below to recursively subdivided the input set for thereby outputting $S_f^i$, a satisfaction arithmetic logic (satisfaction grade calculator) 40 having the input supplied with the predicted values of the items mentioned hereinbefore, objective quantity fuzzy-evaluating membership functions ($Of_1$, $Of_2$, ..., $OF_1$) and the set $S_f^i$ to thereby execute calculation for the prediction for all the combinations of the control quantities included in the set $S_f^i$, evaluates the fitness thereof for each of the plural objectives and determines arithmetically the synthetic satisfaction grades on the basis of the results of the evaluation, to thereby output a set $S_c^i$ of the satisfaction grades, and the above-mentioned satisfaction grade evaluation logic (grade evaluator) having the input supplied with the sets $S_\delta^i$ and $S_c^i$ for observing the satisfaction grade resonances in a number of l at most on the n-dimensional space formed by the above-mentioned sets to thereby output the combination of the control operation quantities ($\Delta X_1$, $AX_2$, ..., $\Delta X_n$) included in the set $S_f^i$ having the highest satisfaction grade at the l resonance points if the range division level is lower than the minimum resolution power of the control accuracy. At this juncture, it is to be mentioned that the phrase "minimum resolution power of the control accuracy" means the minimum effect quantity unit of the control effector effective to the process of concern. On the other hand, unless the range division level is smaller than the above-mentioned minimum resolution power, each resonance range is reduced to the plane for the evaluation of satisfaction grades, to thereby activate the recursive range division logic 39.

For the purpose of facilitating the understandability, it is assumed in the following description that the control operation quantities include analogue quantities $\Delta X_1$ and $\Delta X_2$, that the corresponding objective evaluating membership functions are $Of_1$, $Of_2$ and $Of_3$ and that the overall or synthetic satisfaction grade is represented by $S_g(\Delta X_1, \Delta X_2)$ The satisfaction grade $S_g$ is defined as follows:

$$S_g(\Delta X_1, \Delta X_2) = \sum_{i=1}^{3} (C_i * OF_i(\Delta X_1, \Delta X_2))$$

where $C_i$ represents a weight coefficient for each of the control objectives which is given by $$\sum_{i=1}^{3} C_i = 1.0$$

The satisfaction grade $S_g$ assumes a value in a range of 0.0 to 1.0.

It is assumed that each of the membership functions $Of_1$, $Of_2$ and $Of_3$ includes a single point of resonance (i.e. has a signal-peak characteristic). On these conditions, calculation of the satisfaction grade performed at a given time point with the control quantities $X_1$ and $X_2$ being assumed to be constant while considering $\Delta X_1$ and $\Delta X_2$ as continuous quantities will give rise to a graphic representation shown in FIG. 41.

Figure 41:
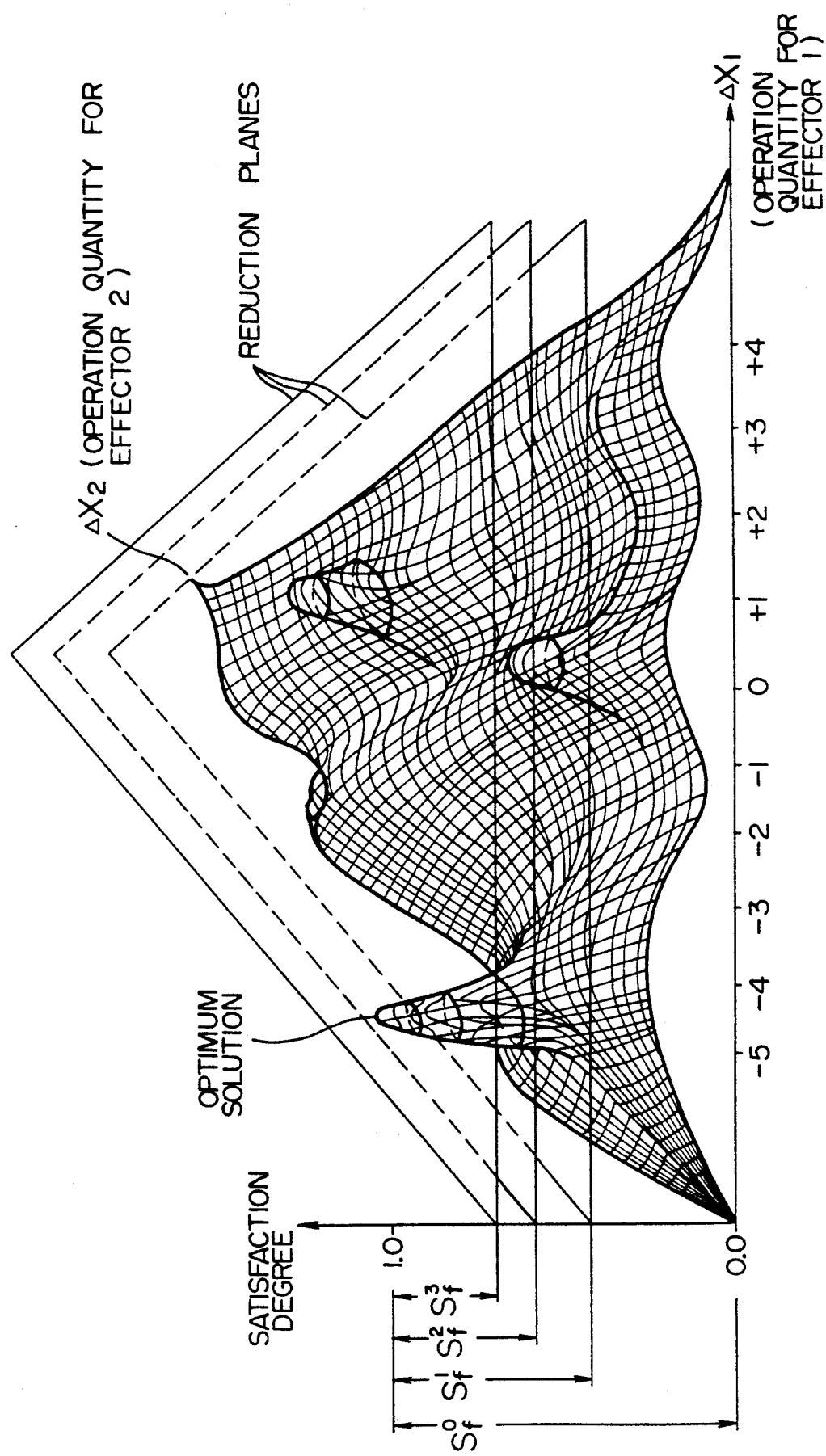

In FIG. 41, the control or operation quantity $\Delta X_1$ is taken along a first axis with the control (operation) quantity $\Delta X_2$ being defined along a second axis. The satisfaction grade $S_g(\Delta X_1, \Delta X_2)$ is taken along a third axis. Projections making appearance on the surface plotted on the three-dimensional space are attributable to the resonance characteristics of the objective evaluating membership functions. It will be readily understood that the range of the projection becomes narrower as the resonance of each membership functions becomes steeper. Further, it is apparent that the maximum satisfaction grade to be determined is one of the vertexes or peaks of the resonances. The best method to this end will be such that the satisfaction grade $S_g(\Delta X_1, \Delta X_2)$ is calculated for all the combinations of analogue values which $\Delta X_1$ and $\Delta X_2$ can assume, to thereby find out the maximum value, which however requires an infinite amount of time. For this reason, the present invention teaches that the maximum satisfaction grade be determined through converging calculation procedure which allows a high-speed processing. This procedure is as follows:

Input

Data $(X_1, X_2, \ldots, X_n)$,
Range $(X_1, X_2, \ldots, X_n)$,
Predicted item values, and
Objective evaluating membership function $(Of_1, Of_2, \ldots Of_l)$ Procedure Step 1: Preprocess (38)

From
$i = 0$ (degree of reduction),
$S_{gmax} = 0.0$ (maximum satisfaction grade value memory),
data $(X_1, X_2, \ldots, X_n)$ and
$(X_1, X_2, \ldots, X_n)$, the ranges for $(\Delta X_1, \Delta X_2, \ldots, \Delta X_n)$ are determined.
$\rightarrow AS_f^0$ Procedure Step 2: Recursive Range Division (39)

The range determined for each control operation quantities is divided by m to generate a set of combinations of the control operation quantities possible for each of the ranges. $\rightarrow S_f^i$ Procedure Step 3: Determination of Satsifaction Grade (40)

Goodnesses of fit of $Of_1, Of_2, \ldots, Of_l$ are arithmetically determined for all the combinations $(\Delta X_1, X_2, \ldots, \Delta X_n)$ included in the set $S_f^{ji}$ to generate the set of satisfaction grades. $S_c^i$ Procedure Step 4 Evaluation of Satisfaction Grade (41)

In $mS_g = S_g \{(\Delta X_1, \Delta X_2, \ldots, \Delta X_n) | \text{maximum value in } S_c^i\}$, if $m\, S_g > S_{gmax}$,
then $m\, S_g \rightarrow S_{gmax}$
  Where the combination at that time is represented by max $(\Delta X_1, \Delta X_2, \ldots, \Delta X_n)$
and
if resolution < minimum control resolution,
then max $(\Delta X_1, \Delta X_2, \ldots, \Delta X_n)$ is outputted as the optimum combination,
  (stop)
Else $$r_p(\text{reduction plane}) = \left( \left( \sum_{j=1}^{P} S_g^{ij} \right) / P \right)$$

where $S_g^i\, j \in S_g^i$ with P being element number of $S_g^i$. Although binary division is adopted in the case of the illustrated example, it should be understood that the reduction plane is determined in dependence on the processing speed and the accuracy. Subsequently, the resonance ranges in number 1 at most as determined by the reduction plane $r_p$ are determined. $\rightarrow$(procedure step 2).

Figure 42:
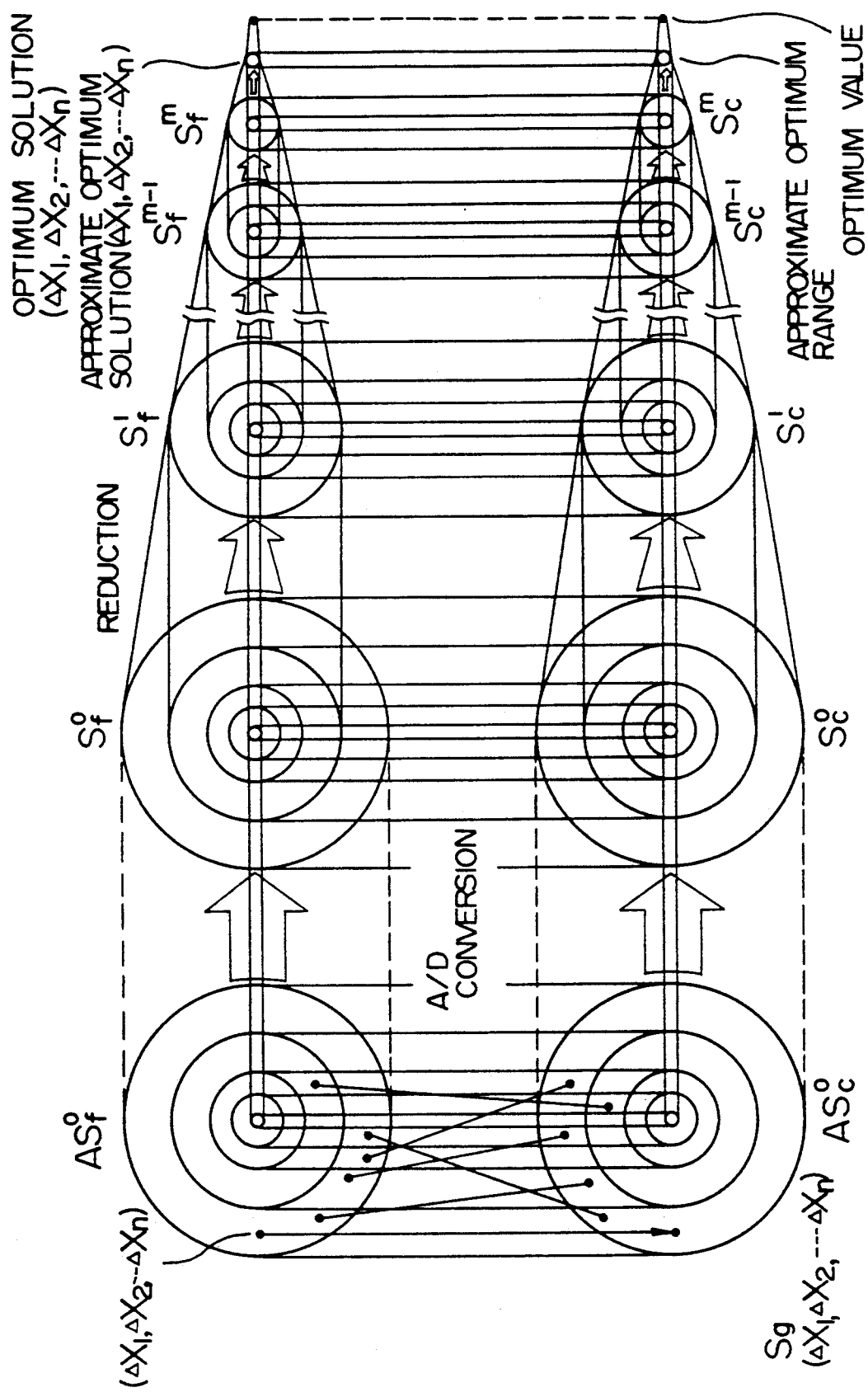

FIG. 42 illustrates the inference mechanism described above in the form of stepwise reduction of the set. Referring to the figure, the set $AS_f^0$ of analogue control quantities for infinite elements within a finite range is shown to be in one-to-one correspondence relation with the infinite element set $AS_3^0$ for the satisfaction grades. Analogue-to-digital conversion is then performed by the converter 39, whereby $AS_f^0$ is mapped onto $S_f^0$. Next, the set $S_c^0$, is generated from $S_f^0$ by the device 40. On the basis of $S_c^0$, the set $S_f^0$ undergoes a range division so as to be reduced by 41, whereupon $S_f^0$ is mapped onto $S_f^1$. By repeating this procedure recursively, there can be finally determined the approximately optimal combination of the control operation quantities given by $(\Delta X_1, \Delta X_2, \ldots, \Delta X_n) \approx $ optimal, where the following relation applies valid:

$AS_f^0 \quad S_f^0 \quad S_f^1 \quad S_f^2 \quad \ldots \quad S_f^{m-1} \quad S_f^m$ It will be seen that at least the range of values of $S_f^m$ includes the optimal solution. When a permissible neighborhood value $\Delta \epsilon$ is defined as the minimum resolution of the control accuracy, the quasi-optimum solution represents the optimum solution in the system of concern, if $\Delta \epsilon >$ resolution range. This can be easily understood by considering that $\Delta \epsilon$ presents a variable which is meaningful for the control.

FIGS. 43 and 44 illustrate operation of the prediction fuzzy inference mechanism 5 on the assumption that the fuzzy inference is applied to the tunnel ventilation control.

Assumption is made as follows:

The number JF of the jet fans operating at a given time is three. Thre airflow CL1 of the dust collector 1 is 70 m$^3$/s. The airflow CL2 of the dust collector 2 is 40 m$^3$/s. The number JF is 0 at minimum and 10 at maximum, and the control quantity $\Delta$ JF therefor is discrete. The airflow of the dust collector 1 is 0 m$^3$/s at minimum and 150 m$^3$/s at maximum with the control quantity $\Delta$ CL1 thereof being continuous. The airflow of the dust collector 2 is 0 m$^3$/s at minimum and 95 m$^3$/s at maximum with the control quantity $\Delta$ CL2 therefor being continuous. The evaluated satisfaction grade $S_g$ is defined by the following expressions:

$$Sg(\Delta JF, \Delta CL1, \Delta CL2) = 0.20 * QCO \cdot VG + 0.05 * QCO \cdot G + 0.20 * QVI \cdot VG + 0.05 * QVI \cdot G + 0.40 * P + 0.05 * QC + 0.05 * BP$$

The weight coefficient of 40% is assigned to the safety and the economy, respectively, while the weight coefficient of 5% is attached to other elements or factors, respectively.

In FIG. 43, the leftmost three columns contain the control operation quantities $\Delta$ JF, $\Delta$ CL1 and $\Delta$ CL2, respectively. The seventh column counted from the left contains the fitness values (goodnesses of fit) of the objective evaluating membership function. The rightmost column contains the satisfaction grades and the trends thereof. Symbol "*" represents the operation which is impossible to perform and is excluded from the objectives for evaluation. When $\Delta$ CL2 = +70, by way of example, the current value of CL2 is equal to 40. Accordingly, when the CL2 is incremented by this value, then $$CL2 + \Delta CL2 = 110 > 95 = max$$

This means that the actual operation is impossible (evaluation is "inop").

Further, although the expression Sg = "*" does not mean "inop", the corresponding satisfaction grade is excluded from the objectives for evaluation, because the evaluation for the safety is out of the permissible range. By way of example, although $\Delta JF = -2$
$\Delta A\ CL1 = -70$
$\Delta CL2 = -20$ can be effectuated, the evaluated fitness of VG and G for evaluating the concentration of CO then assume the value of 0.0, indicating the dangerous state.

In the possible combination set $S_i^0$ of the control quantities, the number of divisions for $\Delta$ CL1 and $\Delta$ CL2 is selected to be 15. Accordingly, calculation of the satisfaction grade is performed for a number of times corresponding to the number of combination of the elements:

$\Delta$ JF + (+10, +9, ..., ±0, −1, ..., −10)

$\Delta$ CL1 = (+70, +60, ..., +0, −10, ..., −70)

$\Delta$ CL2 = (+70, +60, ..., +0, −10, ..., −70)

In the FIG. 43, the state are shown for $\Delta$ JF = +2, $\Delta$ CL1 = +70 ~ +50 and a part of $\Delta$ CL2 = +70 ~ −70, and $\Delta$ JF = −2, $\Delta$ CL1 = −70 and a part of $\Delta$ CL2 = −20 ~ −70.

The objective evaluation membership functions shown in FIGS. 36 to 41 are employed.

Referring to FIG. 43, when the quantities $\Delta$ JF and $\Delta$ CL1 are fixed at +2 and +70, respectively, and when the quantity $\Delta$ CL2 is controlled within a range of +70 to −70, it can be seen that the maximal point makes appearance when $\Delta$ CL2 is +10 and that the corresponding satisfaction grade Sg is 0.462. Similarly, the maximal point makes appearance at $\Delta$ CL1 = +30 when JF = +2 and $\Delta$ CL1 = 50. The corresponding satisfaction grade is then 0.485. It will be seen that so far as the examples illustrated in FIG. 43 are concerned, $Sg_{max}$ is 0.485, because 0.485 is the maximum value of Sg.

Next, 0.4 is selected for the reduction plane, whereon the resonance range makes appearance at $$\begin{cases} \pm 0 \leq \Delta JF \leq +2 \\ +40 \leq \Delta CL1 \leq +70 \\ +1 \leq \Delta CL2 \leq +40, \text{ and} \end{cases}$$

$$\begin{cases} +4 \leq \Delta JF \leq +5 \\ -10 \leq \Delta CL1 \leq +20 \\ -30 \leq \Delta CL2 \leq -10 \end{cases}$$

When the number of division is selected to be 12, the set $S_j$ shown in FIG. 44 is generated from the set $S_j^0$. In the case of the examples shown in FIG. 44, two maximal points are observed when $\Delta$ JF = +2, $\Delta$ CL1 = +70, $\Delta$ CL2 = +13 and Sg = 0.484 and when $\Delta$ JF = +2, $\Delta$ CL1 = +67, $\Delta$ CL2 = +16 and Sg = 0.502. When the permissible neighborhood value $\Delta \epsilon$ for the optimum solution is 4, the combination of the control operation quantities which can maximize the satisfaction grade is determined to be $(\Delta JF, \Delta CL1, \Delta CL2,) = (+2, +67, +16)$.

The resonance projections on the n-dimensional space described so far corresponds to a set of candidates for the satisfaction grades as evaluated when a person makes decision about something, wherein the projection of the greatest height is ultimately selected. Accordingly, it may be considered that the mechanism of the decision made by a person is expressed qualitatively. Needless to say, availability of well refined and sharp membership function can assure appropriate decision at a high speed.

As will be appreciated from the above description, by virtue of the predicting fuzzy mechanism adopted in the rule group r6, the combination of plural continuous control quantities which satisfy simultaneously a plurality of objective controls can be determined at a high speed in a facilitated manner.

(r7): Synthetic Control Quantity Decision Rule Group

This rule group r7 serves to examine and make decision through the fuzzy forward inference for the two interim control quantity hypotheses obtained through the procedure described above for thereby output signals capable of controlling optimally the respective control machines. This rule group r7 may include, for example, the following rules.

(Rule 1): If the current operation quantity is 0 ($m^3/s$), and the predicted VI value is smaller than 40%, then importance is put on the control program by r5.

(Rule 2): If the current operation quantity is more than 100 ($m^3/s$) and the predicted VI value is between 40% and 60%, then importance is put on the control program by r6.

(Rule 3): If the current traffic is less than 20 (cars/5 min) the current operation quantity is other than 0 ($m^3/s$) and the predicted VI value is more than 70%, then all the ventilators are stopped.

The above-mentioned rule 1 is adopted when the ventilators are started from the state where all the ventilators are at rest and on the basis of the knowledge taking into consideration the advantage provided by the rule group r5, i.e. minimum power consumption at the initial start of the ventilators. The rule 2 is adopted when the ventilators are being driven and when the VI value subjected to the control lies within the desired range. This rule 2 is derived from the knowledge that the rule group r6 can ensure more flexible operation than the rule group r5. The rule 3 is the forcible stop rule for forcibly stopping all the ventilators on the basis of judgment of the situations prevailing in the process independent of the results derived from the models. This rule 3 is based on the operator's knowledge obtained empirically and provides contribution to the economy.

As will now be appreciated, the rule group r7 examines to select the flexible control commands to be outputted as the control signals.

(r8): Self-Evaluation Rule Group

This rule group is employed for evaluating the accuracies with which the rule groups described above has performed inferences for prediction for various situation as well as the optimality of the decision made by the rule groups and refines its own knowledge by repeating the evaluation.

In the foregoing, the present invention has been described in conjunction with the tunnel ventilation control. Since the system according to the invention incorporates the mathematical models known heretofore, it is apparent that better results can be obtained at the least when compared with the conventional process control system. Besides, according to the teachings of the present invention, more significant improvement can be realized for such processes which include a greater number of non-linear components or elements.

Figure 45:
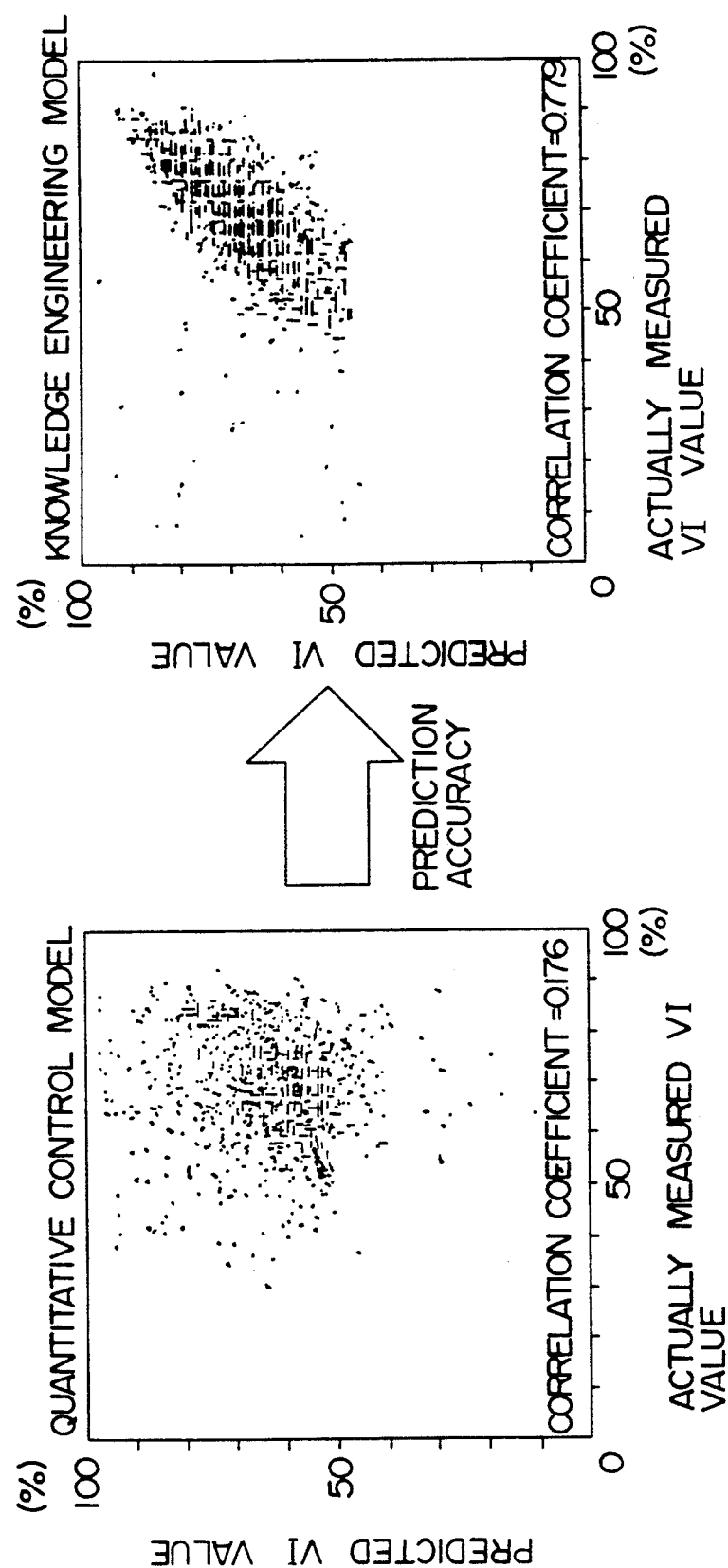

FIGS. 45 to 47 illustrate the results of the control according to the invention comparatively with the results of the control performed by a linear regulator known heretofore.

In FIG. 45, the predicted VI pollution value is taken along the ordinate with the actually measured value being taken along the abscissa. With the model known heretofore, dispersion is observed over a wide range. In contrast, the result of the control according to the invention is satisfactory. It will be seen that the measured value follows the predicted value with an improved accuracy. The advantage of the present invention over the prior art is made clear quantitatively by comparing the values of the correlation coefficients.

FIG. 46 shows graphically the operation state of the ventilators, wherein the airflow of the dust collector and the number of the jet fans are taken along the ordinate with the time being taken along the abscissa. In the case of the prior art system, the start/stop is repeated at a very high frequency. In contrast, the result of the control according to the invention is characterized by flexibility and smoothness. As the result of this, the electric power consumption can be decreased about 30%.

FIG. 47 shows graphically transition in the VI pollution, wherein the actually measured VI (%) is taken along the ordinate with the time taken along the abscissa. In the prior art control system, the VI value undergoes remarkable variations and lies below the environmental standards (40%). On the other hand, according to the control of the invention, the VI values are stable within a range of 40 to 70%.

The tunnel ventilation control system according to the present invention provides advantageous effects mentions below.

(1) Even when the traffic can not linearly be predicted during the middle of the night, on a holiday and for other reasons, appropriate decision can be made in correspondence to the situations, whereby wasteful ventilator operation can be avoided.

(2) Since the absolute pollution value, the transient electric power consumed upon turn-on/off of the ventilators and the ventilation power distribution (pressured distribution) are adopted in addition to the requirements of lower pollution than a predetermined level and minimum power consumption for coping with the intra-tunnel pollution, wherein these various quantities are evaluated in terms of fuzzy quantities with the evaluated prediction values being adopted for the control, not only the pollution can be maintained at a proper level with the minimum power consumption but also the much extended life-time of the ventilators as well as homogeneous ventilation effect can be realized.

(3) Since the updating is effectuated by learning the traffic flow and the pollution generation coefficients, changes in the traffic flow, the car types and car size and the objective world in a tunnel of concern can be grasped over an extended period, whereby the prediction for the traffic flow and the generation of pollution can be performed constantly with an improved accuracy.

(4) Owing to the high accuracy prediction and the flexible ventilator operation control mentioned above, the environmental standards can be maintained while reducing the energy consumption.

The invention can find numerous application such as a group control for elevator cars installed in large buildings, a route control for a large-scale computer network where the standby state occurs frequently in a particular time zone.

By way of example, the elevator control principally involves therein mutually contradicting requirements that the objective subjected to the control should exhibit a predetermined transportation capability at a minimum electric power consumption and includes may non-linear factors which exert influence to the elevator process behavior. In this conjunction, it is obvious for those skilled in the art to apply the concept of the present invention to the process control of the elevator system by replacing the prediction of the traffic flow by that of the passenger flow while utilizing the transition from the current operation states of many elevator cars as the control quantities, and considering the electric power required for moving the elevators as the steady-state electric power consumption with the sense of the passengers for the waiting time (queue) being dealt with as the quality of the control, wherein the various quantities mentioned above are evaluated with the respective fuzzy quantities.

The process control system according to the invention can enjoy a wide variety of applications and universality.

In more general terms, the process control according to the invention brings about the advantageous effects mentioned below.

(1) Through the complex fuzzy inference, a single conclusion can be obtained directly from a plurality of different factors by simulating well the sense of the expert, whereby the accuracy of prediction can be enhanced.

(2) Through the decision by the forward fuzzy inference, linearity/non-linearity of the process behavior can be correctly determined with such a high reliability which is comparable to the sense of the expert to thereby make it possible to select dynamically the control model fitting the process behavior of concern, whereby process control can be accomplished substantially independent of factors of linearity and non-linearity.

(3) By virtue of the predicting fuzzy inference, a plurality of digital/analogue control quantities capable of satisfying synthetically the control adjective can be determined at a high speed.

(4) In contrast to the conventional process control which can operate properly only for a process in which the linear behavior or alternatively the non-linear behavior make appearance, the process control system according to the invention can realize the optimum automatic control throughout various time zones due to the advantageous features (1) to (3) mentioned above.

(5) Owing to the features (1) to (4) mentioned above, operation requiring a minimum energy consumption can be ensured throughout all time zones (improvement of the economy).

(6) The number of operators and persons for maintenance can be reduced to a minimum.

We claim:

1. A method of performing process control in accordance with a target value of a controlled object with a transition of the process being predicted, comprising the steps of:
   inputting process information;
   determining whether a process behavior at a current control timing is linear based on an evaluation rule for evaluating linearity of the process behavior;
   in response to a determination indicating a linear behavior in said determining step, predicting a control quantity of the controlled object a predetermined period of time after the current control timing, using means for performing a quantitative arithmetic operation which simulates the process in a linear relation;
   in response to a determination indicating no linear behavior in said determining step, predicting the control quantity of the controlled object a predetermined period of time after the current control timing, using means for performing a qualitative arithmetic operation which simulates the process in a fuzzy rule relation;
   determining a manipulation quantity of a control effector from a difference between a predicted value obtained in a selected one of said predicting steps and the target value; and
   controlling the process using the determined manipulation quantity.

2. The method according to claim 1, wherein said step of inputting process information includes inputting at least one of time-series data including past values and current values in said quantitative arithmetic operation means and differential data between the current value and the most recent value in said qualitative arithmetic operation means.

3. The method according to claim 1, further comprising the steps of operating said quantitative arithmetic operation means and said qualitative arithmetic operation means in parallel to obtain the values of said predicted control quantity.

4. The method according to claim 1, wherein said evaluation rule is composed of a set of production rules which evaluate linearity or non-linearity of the process behavior based on empirical knowledge, and further including representing a conclusion portion determined from an inference based on input information as an assumption portion by a certainty on which the significance of the quantitative arithmetic operation and the qualitative arithmetic operation depends, and performing a conditional matching operation for adjusting conflicting conclusions between the rules to determine whether the process behavior is linear or non-linear.

5. A method of performing a process control in accordance with a plurality of controlled objects with a transition of a process being predicted, comprising the steps of:
   using input process information and an assumed manipulation quantity for arithmetically operating on predicted values of control quantities for the plurality of controlled objects a predetermined period of time after a current control timing by using means for performing a quantitative arithmetic operation which simulates the process in a linear relation and means for performing a qualitative arithmetic operation which simulates the process in a fuzzy rule relation, respectively;
   determining whether a process behavior at the current control timing is linear based on an evaluation rule which evaluates the linearity of the process behavior;
   selecting one of the predicted values obtained by the quantitative arithmetic operation means and obtained by said qualitative arithmetic operation means based on a result of said determining step;
   determining the grade of satisfaction in which said plurality of controlled objects are as a whole satisfied with respective predicted values selected by said selecting step; and
   if said determined satisfaction grade meets a predetermined reference, controlling the process using the assumed manipulation quantities.

6. The method according to claim 5, wherein said satisfaction grade determining step includes determining said satisfaction grade in accordance with weights predetermined for respective controlled objects and sum-of-product operations of said predicted values.

7. The method according to claim 5, wherein, when a manipulation quantity is outputted which is a combination of manipulation quantities of a plurality of control effectors exhibiting the highest satisfaction grade, arithmetically operating on said predicted values based on a combination of assumed manipulation quantities.

8. A process control system, including a computer system, for controlling a manipulation quantity of a control effector in accordance with a target quantity of a controlled object with a transition of a process being predicted, comprising:

quantitative arithmetic operation means for simulating a process in a linear relation to predict a control quantity of the controlled object a predetermined period of time after inputting of process information;

qualitative arithmetic operation means for simulating a process in a fuzzy rule relation to predict a control quantity of the controlled object a predetermined period of time after inputting of process information;

process behavior inference means, having a set of production rules which evaluate linearity of non-linearity of a process behavior based on empirical knowledge, for determining whether the process behavior is linear or non-linear from the process information at a current timing;

manipulation quantity output means, responsive to a determination by said process behavior inference means, for selecting one of said quantitative arithmetic operation means and said qualitative arithmetic operation means and for outputting a determined manipulation quantity, based on a difference between said predicted value and said target quantity; and control means for controlling the process on the basis of said determined manipulation quantity.

9. The process control system according to claim 8, wherein said qualitative arithmetic operation means includes means providing a plurality of fuzzy rules presenting a relation between process information and a controlled object in the form of a production rule, a membership function evaluating the process information and the controlled object, respectively, in an assumption portion and a conclusion portion in said rules, for making an inference to said conclusion portion based on a minimum value in a result of evaluation of said assumption portion and predicting a control quantity of said controlled object based on a maximum value in a result of evaluation of the conclusion portion of each rule.

10. A process control system, including a computer system, for controlling manipulation quantities of a plurality of control effectors for a process in accordance with a plurality of controlled objects while a transition of the process is being predicted, comprising:

manipulation quantity candidate generation means for generating candidates on combination of predetermined manipulation quantities which are changeable from a current combination of manipulation quantities;

prediction means including quantitative arithmetic operation means for simulating the process in a linear relation and qualitative arithmetic operation means for simulating the process in a fuzzy rile relation, and for parallelly arithmetically operating on a control quantity of each of the controlled objects a predetermined period of time after a current time based on input process information and candidates on the combination of manipulation quantities;

process behavior inference means, including a set of production rules based on empirical knowledge evaluating the degree of linearity or the degree of non-linearity of the process behavior, for determining whether the process behavior is linear based on predetermined process information at a relevant timing;

manipulation quantity output means for selecting predicted values of one of said quantitative arithmetic operation means and said qualitative arithmetic operation means in accordance with a determination result of said process behavior inference means, and outputting said candidates on the combination of manipulation quantities to a plurality of corresponding control effectors when the degree of satisfaction obtained by the selected predicted values to thereby satisfy the plurality of controlled objects collectively meets a predetermined reference; and means for controlling the process on the basis of said manipulation quantities.

* * * * *